United States Patent
Aoki et al.

(10) Patent No.: US 9,288,472 B2
(45) Date of Patent: *Mar. 15, 2016

(54) IMAGE PROCESSING DEVICE AND METHOD, AND IMAGE CAPTURING DEVICE

(71) Applicant: FUJIFILM Corporation, Tokyo (JP)

(72) Inventors: Takashi Aoki, Saitama (JP); Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,343

(22) Filed: Nov. 6, 2014

(65) Prior Publication Data

US 2015/0054926 A1 Feb. 26, 2015

Related U.S. Application Data

(63) Continuation of application No. PCT/JP2013/062749, filed on May 2, 2013.

(30) Foreign Application Priority Data

May 9, 2012 (JP) ................................. 2012-107858

(51) Int. Cl.
*H04N 13/02* (2006.01)
(52) U.S. Cl.
CPC ....... *H04N 13/0225* (2013.01); *H04N 13/0217* (2013.01)
(58) Field of Classification Search
CPC . H04N 5/3656; H04N 5/357; H04N 13/0025; H04N 5/23296; H04N 5/23212; H04N 13/0015; H04N 5/23229; G06T 5/50; G06T 5/40; G06T 5/30; G06T 5/10; G06T 5/20; G03B 35/10

See application file for complete search history.

(56) References Cited

U.S. PATENT DOCUMENTS 5,588,948 A * 12/1996 Takahashi et al. ............ 600/111
8,933,995 B2 * 1/2015 Endo ............................... 348/49
(Continued)

FOREIGN PATENT DOCUMENTS

JP 2011-29700 A 2/2011
JP 2011-199502 A 10/2011
(Continued)

OTHER PUBLICATIONS

International Search Report, issued in PCT/JP2013/062749, dated Jun. 4, 2013.
(Continued)

*Primary Examiner* — Young Lee
*Assistant Examiner* — Neil Mikeska
(74) *Attorney, Agent, or Firm* — Birch, Stewart, Kolasch & Birch, LLP

(57) ABSTRACT

An image processing device comprising: an image acquisition device; a parallax acquisition device; a first data transform device; an operation processing device; and a second data transform device transforming third frequency component data and fourth frequency component data respectively corresponding to the third image and the fourth image calculated by the operation processing device into data on a real space and for respectively selecting pixels at positions corresponding to the target pixels as one pixel of the third image and one pixel of the fourth image.

24 Claims, 30 Drawing Sheets

(56) References Cited

U.S. PATENT DOCUMENTS

| | | |
|---|---|---|
| 2002/0109701 A1* | 8/2002 | Deering .................. 345/581 |
| 2005/0190258 A1* | 9/2005 | Siegel et al. ............... 348/47 |
| 2008/0218611 A1 | 9/2008 | Parulski et al. |
| 2011/0018969 A1 | 1/2011 | Tanaka |
| 2011/0064327 A1* | 3/2011 | Dagher et al. ............ 382/263 |
| 2012/0113287 A1 | 5/2012 | Johnson et al. |
| 2012/0249750 A1* | 10/2012 | Izzat et al. ................ 348/47 |
| 2012/0301012 A1* | 11/2012 | Kakishita et al. .......... 382/154 |
| 2012/0314908 A1* | 12/2012 | Hirasawa et al. .......... 382/106 |
| 2013/0010078 A1 | 1/2013 | Aoki |
| 2013/0010086 A1 | 1/2013 | Iwasaki |
| 2013/0033578 A1 | 2/2013 | Wajs |
| 2013/0107019 A1 | 5/2013 | Ooshima et al. |
| 2013/0120543 A1* | 5/2013 | Chen et al. ................ 348/51 |
| 2013/0182082 A1 | 7/2013 | Hayashi |
| 2013/0195347 A1* | 8/2013 | Okada et al. ............. 382/154 |
| 2013/0215105 A1* | 8/2013 | Yonezu .................... 345/419 |
| 2014/0168206 A1 | 6/2014 | Barenbrug |
| 2014/0270485 A1 | 9/2014 | Kauff et al. |
| 2015/0015677 A1 | 1/2015 | Izawa et al. |

FOREIGN PATENT DOCUMENTS

| | | |
|---|---|---|
| JP | 2011-211551 A | 10/2011 |
| JP | 2011-259211 A | 12/2011 |
| WO | WO 2011/118077 A1 | 9/2011 |
| WO | WO 2011/118089 A1 | 9/2011 |
| WO | WO 2012/002071 A1 | 1/2012 |
| WO | WO 2012/032826 A1 | 3/2012 |

OTHER PUBLICATIONS

Written Opinion of the International Searching Authority, issued in PCT/JP2013/062749, dated Jun. 4, 2013.
International Search Report (Form PCT/ISA/210) for International Application No. PCT/JP2013/055373, dated Apr. 16, 2013, with an English translation.
U.S. Office Action for U.S. Appl. No. 14/499,933, dated Jun. 17, 2015.
Written Opinion of the International Searching Authority (Form PCT/ISA/237) for International Application No. PCT/JP2013/055373, dated Apr. 16, 2013, with an English translation.

* cited by examiner

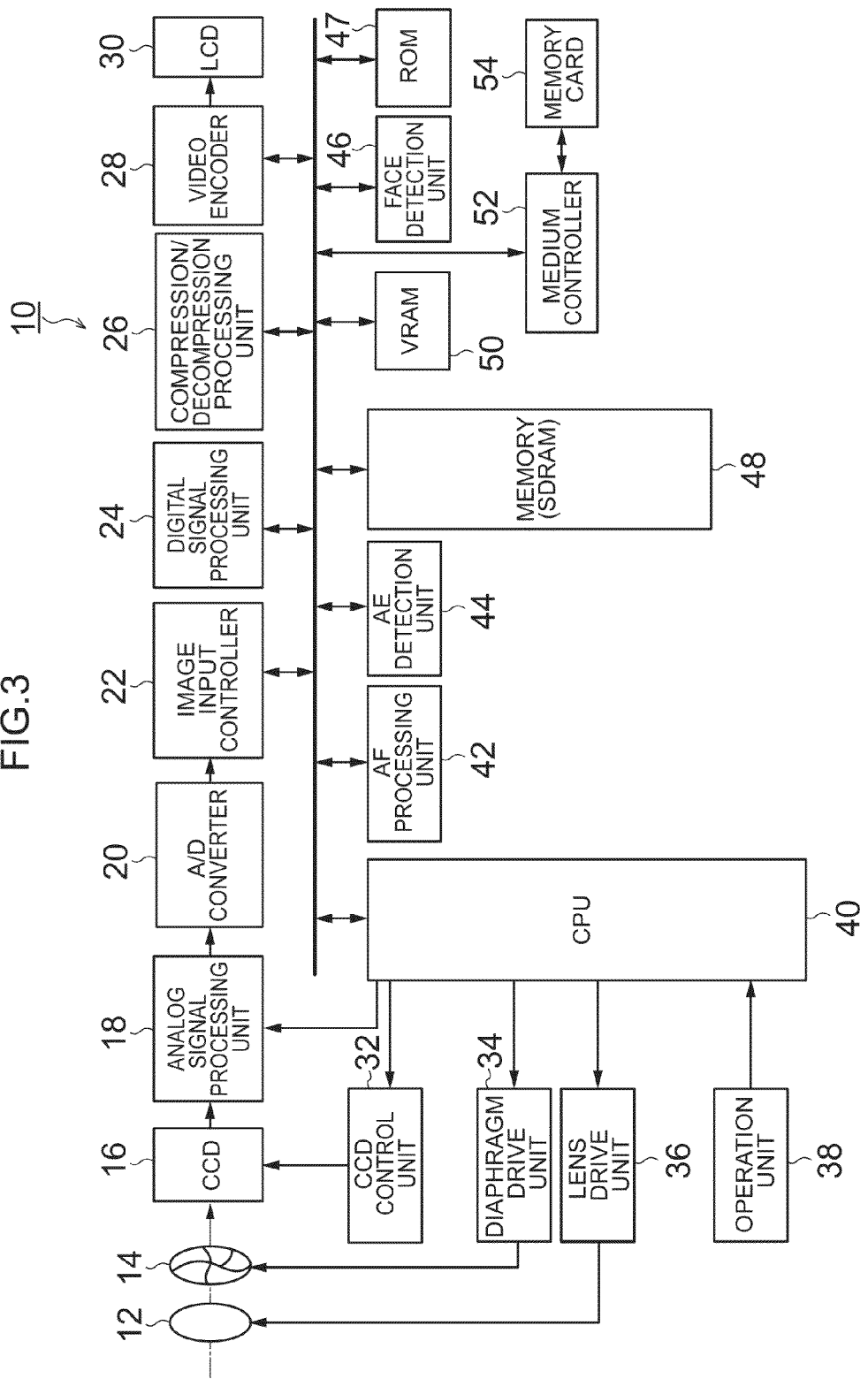

SENSITIVITY CHARACTERISTICS IN X DIRECTION

SENSITIVITY CHARACTERISTICS IN Y DIRECTION

SENSITIVITY CHARACTERISTIC FOR EACH ANGLE

SEMILUNAR FILTER

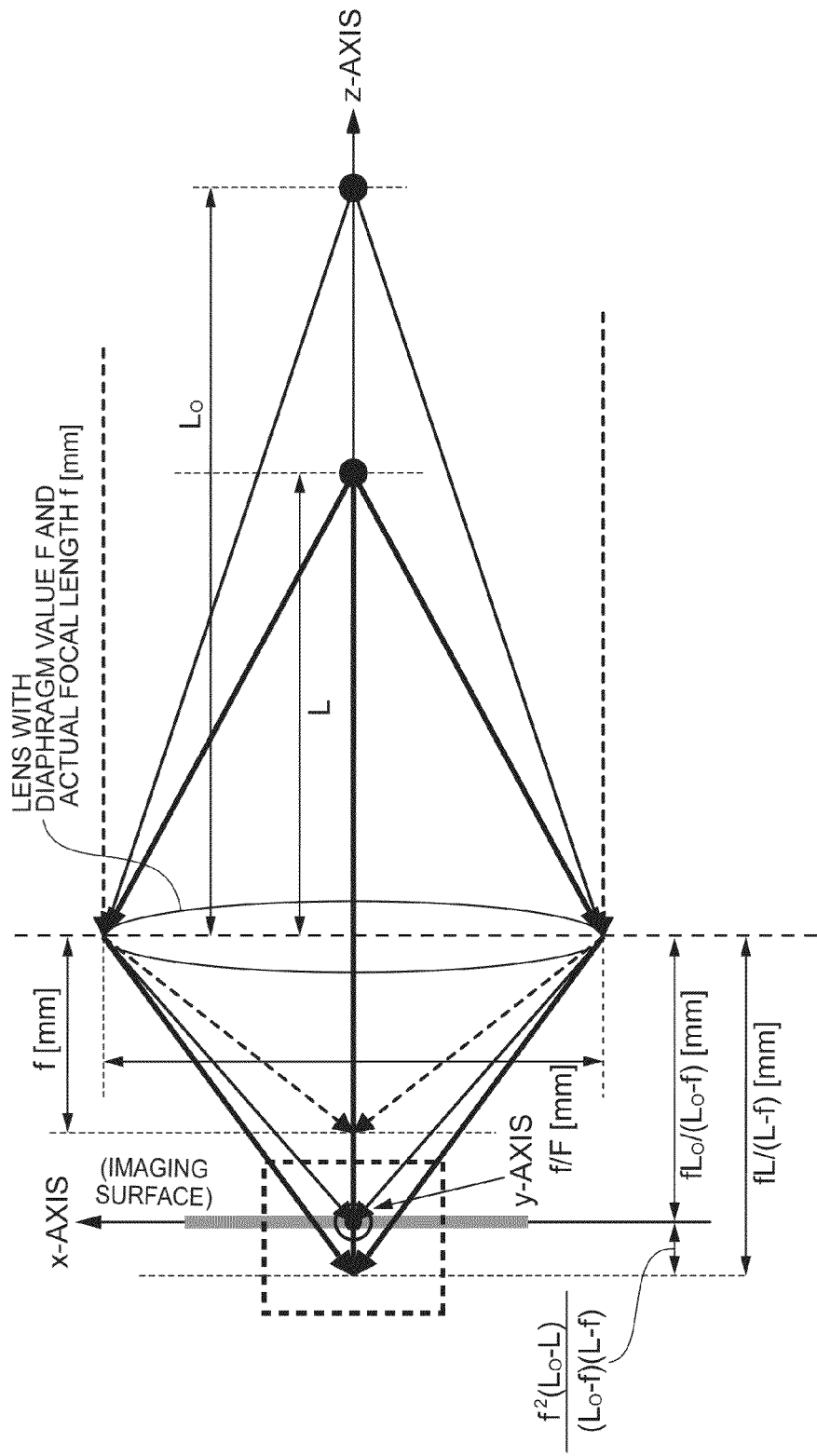

EXAMPLE OF FILTERS APPLIED TO LEFT-EYE IMAGE

EXAMPLE OF FILTERS APPLIED TO RIGHT-EYE IMAGE $$\Delta D = \frac{\rho(F)|L_O-L|f^2}{(L_O-f)L}$$

$$R = \frac{|L_O-L|f^2}{(L_O-f)LF}$$

CURRENTLY APPLIED SEMILUNAR FILTER $$\Delta D = 4\frac{\rho(F)|L_O-L|f^2}{(L_O-f)L}$$

$$R = 4\frac{|L_O-L|f^2}{(L_O-f)LF}$$

SEMILUNAR FILTER TO BE DESIGNED IN THE EXAMPLE (GENERATE PARALLAX AND BLUR
WHEN FOCAL LENGTH f IS CHANGED BY 2-FOLD)

CURRENTLY APPLIED SEMILUNAR FILTER

SEMILUNAR FILTER TO BE DESIGNED IN THE EXAMPLE
(GENERATE PARALLAX AND BLUR
WHEN F-VALUE IS CHANGED TO HALF)

$$\Delta D = \frac{\rho(F) \, |L_o - L| \, f^2}{(L_o - f)L}$$

$$R = \frac{|L_o - L| \, f^2}{(L_o - f)LF}$$

CURRENTLY APPLIED SEMILUNAR FILTER $$\Delta D = 2.25 \, \frac{\rho(F) \, |L_o - L| \, f^2}{(L_o - f)L}$$

$$R = 2.25 \, \frac{|L_o - L| \, f^2}{(L_o - f)LF}$$

SEMILUNAR FILTER TO BE DESIGNED IN THE EXAMPLE
(GENERATE PARALLAX AND BLUR
WHEN IMAGING ELEMENT SIZE IS CHANGED BY 1.5-FOLD)

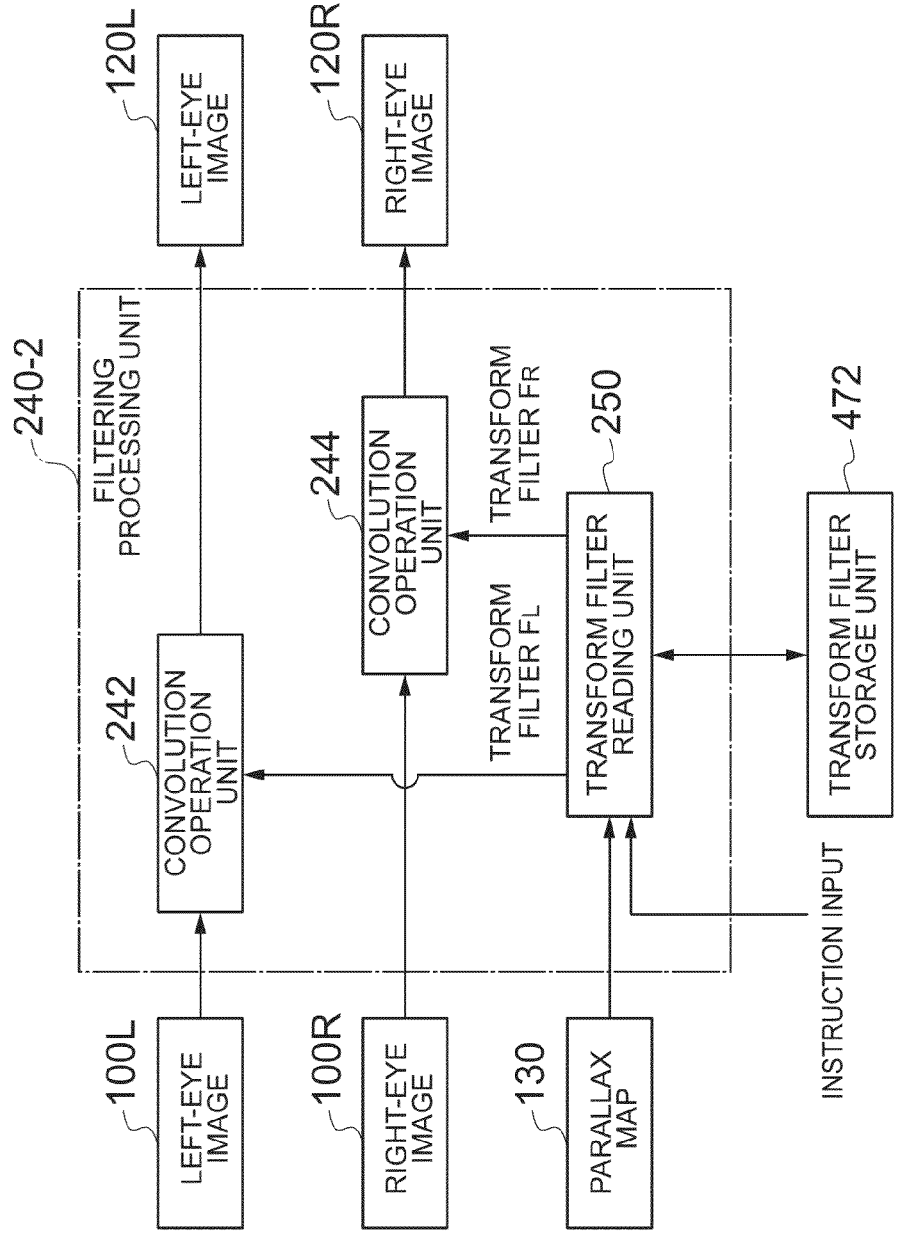

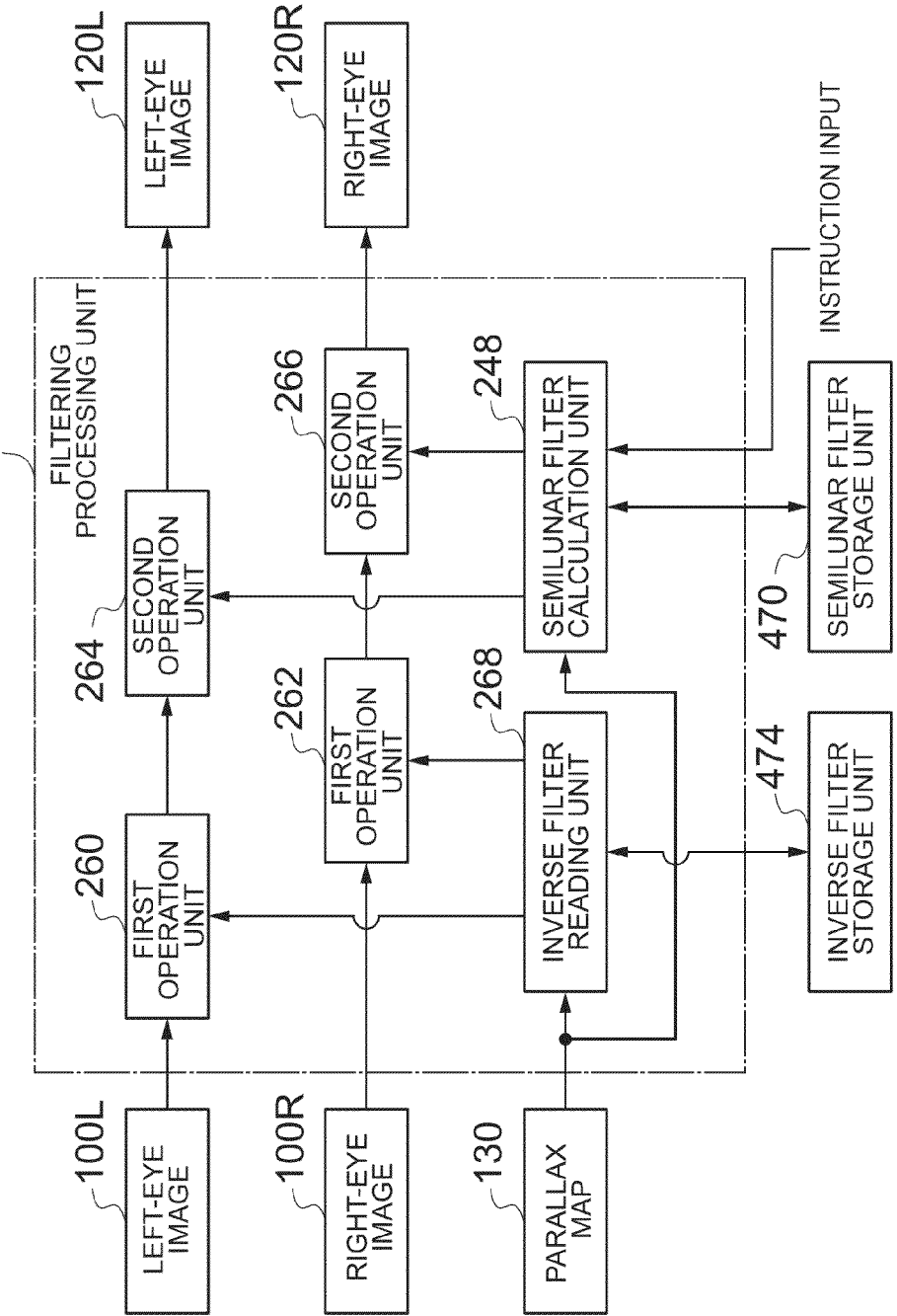

$$\Delta D = \frac{\rho(F) |L_O - L| f^2}{(L_O - f)L}$$

$$R = \frac{|L_O - L| f^2}{(L_O - f)LF}$$

CURRENTLY APPLIED SEMILUNAR FILTER $$\Delta D = \frac{\rho'(F) |L_O - L| f^2}{(L_O - f)L}$$

$$R = \frac{|L_O - L| f^2}{(L_O - f)LF}$$

SEMILUNAR FILTER TO BE DESIGNED IN THE EXAMPLE (GENERATE PARALLAX AND BLUR
WHEN SENSITIVITY CHARACTERISTIC OF IMAGING ELEMENT IS CHANGED)

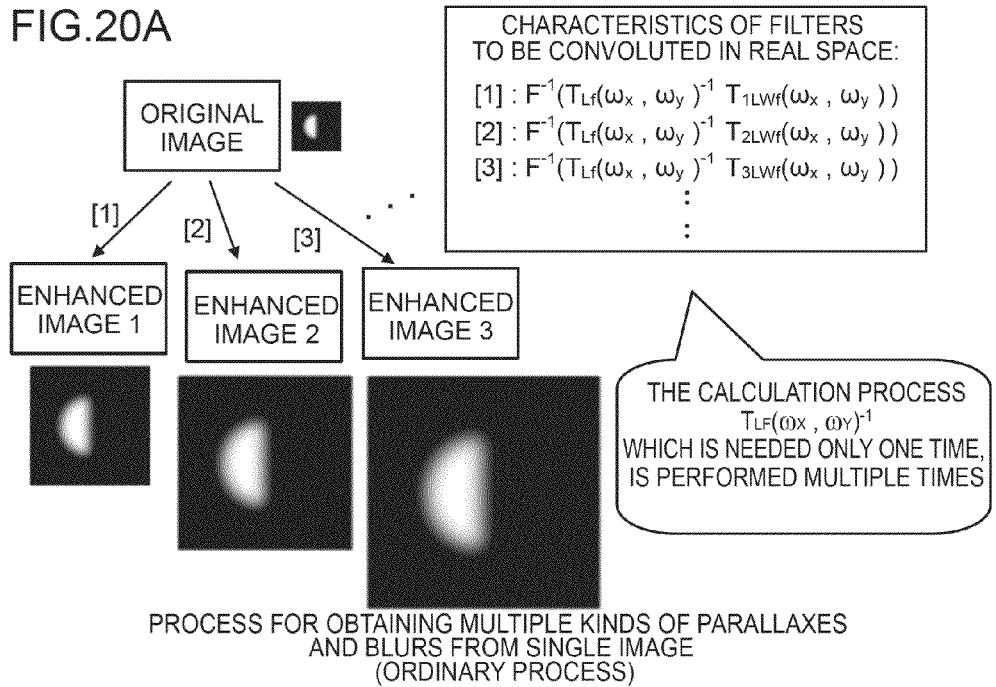
FIG.20A PROCESS FOR OBTAINING MULTIPLE KINDS OF PARALLAXES AND BLURS FROM SINGLE IMAGE (ORDINARY PROCESS)
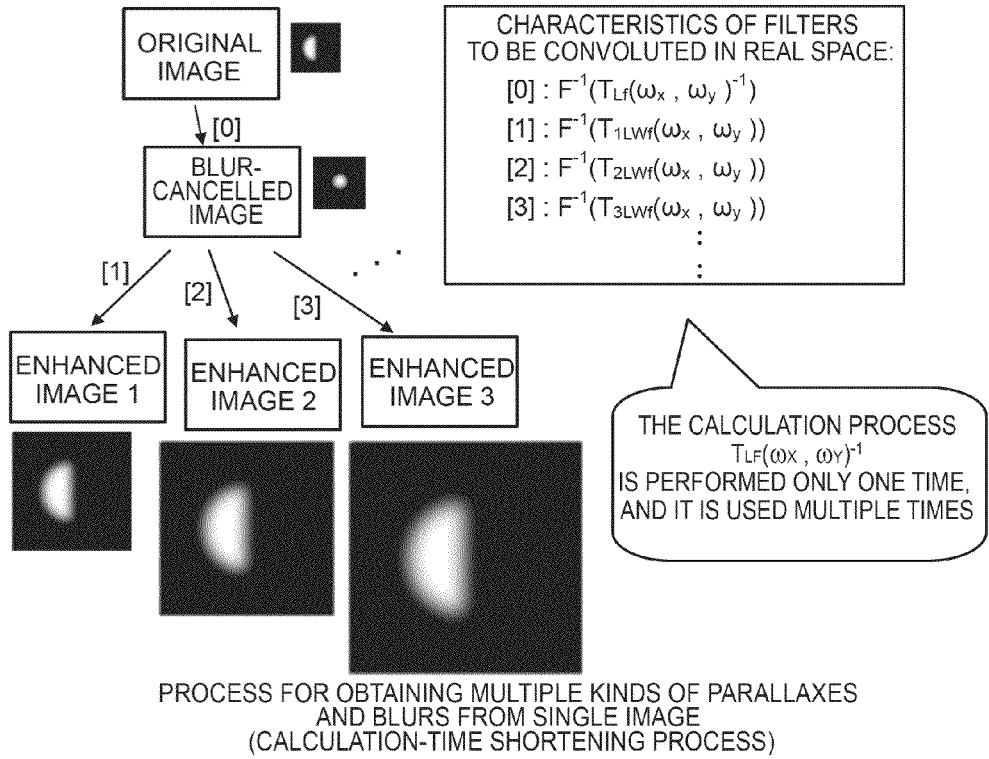
FIG.20B PROCESS FOR OBTAINING MULTIPLE KINDS OF PARALLAXES AND BLURS FROM SINGLE IMAGE (CALCULATION-TIME SHORTENING PROCESS)

IMAGE PROCESSING DEVICE AND METHOD, AND IMAGE CAPTURING DEVICE

CROSS-REFERENCE TO RELATED APPLICATIONS

This application is a Continuation of PCT International Application No. PCT/JP2013/062749 filed on May 2, 2013, which claims priority under 35 U.S.C §119(a) to Japanese Patent Application No. 2012-107858 filed on May 9, 2012. Each of the above application(s) is hereby expressly incorporated by reference, in its entirety, into the present application.

BACKGROUND OF THE INVENTION

1. Field of the Invention

The present invention relates to an image processing device and method, and an image capturing device, and particularly, relates to a technology for adjusting a parallax of an image for stereovision that is picked up through a single image-taking lens and that has a parallax.

2. Description of the Related Art

Conventionally, a monocular 3D imaging device in which a phase-difference CCD performs, by pupil division, the forming of respective subject images having passed through left-right-directionally different regions of a single image-taking lens and performs photoelectric conversion of the respective subject images having passed through the regions, and that acquires a left-eye image and a right-eye image (monocular 3D images) having a parallax to each other depending on the focus deviation amount, is known (PTL 1: Japanese Patent Application Laid-Open No. 2011-199502). The stereoscopic imaging device described in PTL 1 adjusts the parallax for the monocular 3D left-eye image and right-eye image, by the F-value of a diaphragm.

An image processing device described in PTL 2 calculates the parallax amount for pixels corresponding to each other between left and right viewpoint images, generates an initial parallax map indicating the distribution of the parallax amount, compares a partial region in the parallax map and a parallax template from previously determined multiple parallax templates indicating external shapes and parallax amount distributions. Thereby, the image processing device described in PTL 2 (Japanese Patent Application Laid-Open No. 2011-211551) selects a parallax template corresponding to the partial region and generates multi-viewpoint images in which the number of viewpoints is larger than the left and right viewpoint images, based on a parallax map replaced with the selected parallax template. Further, paragraph [0048] in PTL 2 describes that the technology described in PTL 2 can be applied to monocular 3D images.

PTL 3 (Japanese Patent Application Laid-Open No. 2011-29700) describes a technology of adjusting the parallax between a left-eye image and a right-eye image by mutually shifting the left-eye image and right-eye image that are picked up by a compound-eye imaging device and that have a parallax.

SUMMARY OF THE INVENTION

In the monocular 3D imaging device described in PTL 1 adjusts the parallax for monocular 3D images by adjusting the F-value of the diaphragm. However, the adjustment of the parallax can be performed only at the time of image capturing by the monocular 3D imaging device. That is, the monocular 3D imaging device described in PTL 1 cannot generate monocular 3D images different in parallax (F-value) by executing image processing of the monocular 3D images.

The invention described in PTL 2 can generate a left-eye image and right-eye image different in parallax, by performing an image process of monocular 3D images. However, the generated left-eye image and right-eye image are not monocular 3D images.

Here, the monocular 3D image is an image in which the blur increases as the parallax increases. As one of the advantages, there is an advantage that a double image hardly appears even when viewed through a 3D television with 3D-dedicated glasses taken off (advantage that it can be viewed as a 2D image).

The left-eye image and right-eye image described in PTL 3 are images picked-up by the compound-eye imaging device, and are not monocular 3D images. Also, the images in which the parallax has been adjusted by mutually shifting the left-eye image and the right-eye image are not monocular 3D images.

The present invention, which has been made in view of such circumstances, has an object to provide an image processing device and method, and an imaging device that make it possible to generate intended images for stereovision in which the parallax amount and the blurring amount have been adjusted in conjunction, from monocular 3D images picked-up by a monocular 3D imaging device.

For achieving the object, an aspect of the present invention provides an image processing device comprising: an image acquisition device acquiring a first image and a second image that are captured through a single image-taking optical system and that have a parallax to each other after a pupil division by a pupil-division device; a parallax acquisition device acquiring a parallax between corresponding pixels of the acquired first image and second image; a first data transform device transforming predetermined regions based on the target pixel into first frequency component data and second frequency component data, respectively, for each target pixel of processing of image data of the acquired first image and image data of the acquired second image; an operation processing device performing a multiplication process for each of the frequency component data of the acquired first image and second image by using a first frequency filter group and a second frequency filter group for respectively transforming the transformed first frequency component data and second frequency component data in a frequency space and for transforming the acquired first image and second image to a third image and a fourth image in which a parallax amount and a blur amount of the acquired first image and second image have been altered, the first frequency filter and the second frequency filter corresponding to the parallax of the target pixels acquired by the parallax acquisition device; and a second data transform device transforming third frequency component data and fourth frequency component data corresponding to the third image and the fourth image calculated by the operation processing device into data on a real space and for respectively selecting pixels at positions corresponding to the target pixels as one pixel of the third image and one pixel of the fourth image.

According to the aspect of the present invention, for each target pixel of processing of the image data of the first image and the image data of the second image, the predetermined regions based on the target pixels are transformed into the first frequency component data and the second frequency component data, respectively. The first frequency component data and the second frequency component data are multiplied by the first frequency filter and the second frequency filter corresponding to the parallax of the target pixels, and the multiplication results are transformed into data on the real space. Then, the pixels at the positions corresponding to the target pixels are selected as one pixel of the third image and one pixel of the fourth image, and the third and fourth images are obtained in which both of the parallax amount and the blur amount are adjusted in conjunction from the first and second images.

In the image processing device according to an alternative aspect of the present invention, it is preferable that the operation processing device use a first frequency filter and a second frequency filter that increase the blur amount with an increase in the parallax of the target pixels acquired by the parallax acquisition device. Thereby, the third and fourth images can be stereoscopically viewed by a 3D display. Further, a double image hardly appears even when being viewed with 3D-dedicated glasses taken off.

The image processing device according to a further alternative aspect of the present invention further includes: a digital filter storage device storing a first digital filter group and a second digital filter group for each parallax corresponding to transform characteristics by which light entering the single image-taking optical system is transformed into the first image and the second image; and a frequency filter calculation device calculating the first frequency filter group and the second frequency filter group based on the stored first digital filter group and second digital filter group and based on a third digital filter group and a fourth digital filter group for each parallax corresponding to transform characteristics by which light entering the single image-taking optical system is transformed into the third image and the fourth image, wherein for each pixel of the acquired first image and second image, the operation processing device selects the first frequency filter and the second frequency filter corresponding to the parallax from the calculated first frequency filter group and second frequency filter group based on the parallax of the pixels acquired by the parallax acquisition device and uses the selected first frequency filter and second frequency filter to perform the multiplication process.

The digital filter storage device stores the first digital filter group and second digital filter group for each parallax that correspond to the transform characteristic by which the light entering the single image-taking optical system is transformed into the first image and the second image. These first digital filter group and second digital filter group can be previously acquired from the characteristics of the image-taking optical system, the pupil-division device, the imaging element and the like, by simulation or by a survey of a point image. The frequency filter calculation device calculates the first and second frequency filter groups for transforming the first and second images into the third and fourth images on the frequency space based on the first and second digital filter groups and the third and fourth digital filter groups.

In the image processing device according to a further alternative aspect of the present invention, it is preferable that the frequency filter calculation device calculate the first and second frequency filters $G(\omega_x, \omega_y)$ by using the following formula $$G(\omega_x,\omega_y)=T_{wf}(\omega_x,\omega_y) \cdot T_f(\omega_x,\omega_y)^{-1},$$

wherein any one digital filter of the first digital filter group and the second digital filter group stored in the digital filter storage device is $T(x, y)$, the digital filter $T(x, y)$ to which Fourier transform has been performed is $T_f(\omega_x, \omega_y)$, a digital filter corresponding to the digital filter $T(x, y)$ of the third digital filter group and the fourth digital filter group is $T_w(x, y)$, and the digital filter $T_w(x, y)$ to which Fourier transform has been performed is $T_{wf}(\omega_x, \omega_y)$.

An image processing device according to a further alternative aspect of the present invention, preferably should include: a specification device specifying a transform characteristic for the third image and fourth image that are to be generated by the transform; and a digital filter calculation device calculating the third digital filter group and fourth digital filter group corresponding to the specified transform characteristic, in which the frequency filter calculation device calculates the first frequency filter group and the second frequency filter group, using the first digital filter group and second digital filter group stored in the digital filter storage device, and the third digital filter group and fourth digital filter group calculated by the digital filter calculation device.

The image processing device according to a further alternative aspect of the present invention further includes a frequency filter storage device storing the first frequency filter group and the second frequency filter group for each parallax calculated based on the first digital filter group and the second digital filter group for each parallax corresponding to the transform characteristics by which the light entering the single image-taking optical system is transformed into the first image and the second image and based on the third digital filter group and the fourth digital filter group for each parallax corresponding to the transform characteristics by which the light entering the single image-taking optical system is transformed into the third image and the fourth image, wherein for each pixel of the acquired first image and second image, the operation processing device reads the first frequency filter and the second frequency filter corresponding to the parallax from the stored first frequency filter group and second frequency filter group based on the parallax of the pixels acquired by the parallax acquisition device and uses the read first frequency filter and second frequency filter to perform the multiplication process.

According to this, it is unnecessary to calculate the first and second frequency filter groups, and the operation process for generating the third and fourth images from the first and second images can be speeded up. On the other hand, it is necessary to previously store the first and second frequency filter groups for each of the third and fourth images.

In the image processing device according to a further alternative aspect of the present invention, the frequency filter storage device stores the first and second frequency filters $G(\omega_x, \omega_y)$ calculated by the following formula $$G(\omega_x,\omega_y)=T_{wf}(\omega_x,\omega_y) \cdot T_f(\omega_x,\omega_y)^{-1},$$

wherein any one digital filter of the first digital filter group and the second digital filter group is $T(x, y)$, the digital filter $T(x, y)$ to which Fourier transform has been performed is $T_f(\omega_x, \omega_y)$, the digital filter corresponding to the digital filter $T(x, y)$ of the third digital filter group and the fourth digital filter group is $T_w(x, y)$, and the digital filter $T_w(x, y)$ to which Fourier transform has been performed is $T_{wf}(\omega_x, \omega_y)$.

An image processing device according to a further alternative aspect of the present invention includes a specification device specifying a transform characteristic for the third image and fourth image that are to be generated by the transform, in which the frequency filter storage device stores the first frequency filter group and second frequency filter group for each transform characteristic that are calculated based on a first digital filter group and second digital filter group for each parallax and a third digital filter group and fourth digital filter group for each parallax, the first digital filter group and the second digital filter group corresponding to a transform characteristic by which light entering the single image-taking optical system is transformed into a first image and a second image, the third digital filter group and the fourth digital filter group corresponding to a transform characteristic by which the light entering the single image-taking optical system is transformed into a third image and a fourth image and supporting multiple transform characteristics that can be specified by the specification device, and the operation processing device reads the first frequency filter group and second frequency filter group corresponding to the transform characteristic specified by the specification device, from the frequency filter storage device, and uses the first frequency filter group and the second frequency filter group.

The image processing device according to a further alternative aspect of the present invention further comprises an inverse filter storage device storing a first inverse filter group and a second inverse filter group that are inverse filters of frequency component data of the first digital filter group or the second digital filter group for each parallax corresponding to the transform characteristics by which the light entering the single image-taking optical system is transformed into the first image or the second image, wherein the operation processing device uses, as the first frequency filter group and the second frequency filter group, the stored first and second inverse filter groups and a third frequency filter group and a fourth frequency filter group that are frequency component data of the third digital filter group and the fourth digital filter group for each parallax corresponding to the transform characteristics by which the light entering the single image-taking optical system is transformed into the third image and the fourth image.

The inverse filter for each parallax of pixel is applied to each pixel of the first image or the second image to thereby generate an image in which the parallax amount and the blur amount are canceled on the frequency space. Then, the frequency component data of the third digital filter and the fourth digital filter for each parallax is applied to the image. Thereby, the third image and the fourth image in which the parallax amount and the blur are emphasized on the frequency space can be obtained.

An image processing device according to a further alternative aspect of the present invention includes: a specification device specifying a transform characteristic for the third image and fourth image that are to be generated by the transform; and a digital filter calculation device calculating the third digital filter group and fourth digital filter group corresponding to the specified transform characteristic, in which the operation processing device uses the third digital filter group and fourth digital filter group calculated by the digital filter calculation device.

In an image processing device according to a further alternative aspect of the present invention, the transform characteristic for the third image and fourth image to be specified by the specification device is at least one of a focal length, a diaphragm value, an imaging element size and a sensitivity characteristic of the image-taking optical system, the focal length, the diaphragm value, the imaging element size and the sensitivity characteristic being different from the first image and the second image.

Thereby, although the third and fourth images are not actually picked up, it is possible to generate the third and fourth images that are obtained in the case of altering at least one of the focal length, diaphragm value, imaging element size and sensitivity characteristic when the first and second images are picked up.

In an image processing device according to a further alternative aspect of the present invention, it is preferable that the third digital filter group and the fourth digital filter group have similar shapes to which the first digital filter group and the second digital filter group are scaled. The third and fourth images respectively transformed based on the third digital filter group and the fourth digital filter group can be stereoscopically viewed by the 3D display, and the third and fourth images are images in which a double image hardly appears even when being viewed with the 3D-dedicated glasses taken off (monocular 3D images captured by monocular 3D image capturing device).

In an image processing device according to a further alternative aspect of the present invention, the third digital filter group and the fourth digital filter group may be digital filter groups in which each filter has a circular shape and a point-symmetric filter coefficient. In this case, when being viewed with 3D-dedicated glasses taken off, a double image appears. However, even when the corresponding between pixels is difficult for human eyes (the stereovision is difficult), for example, even when the blur is large, it is possible to generate the third and fourth images that make the stereovision easy.

In the image processing device according to a further alternative aspect of the present invention, it is preferable that to acquire the third image and the fourth image with multiple transform characteristics, the operation processing device perform a first operation of applying an inverse filter of frequency component data of a first filter digital filter or a second digital filter corresponding to the parallax of each pixel to each pixel of the acquired first image or second image and apply frequency component data of a third digital filter and a fourth digital filter corresponding to the third image and the fourth image with multiple transform characteristics to the result of the first operation, respectively.

An image in which the parallax and the blur are canceled is generated on the frequency space by the first operation. Then, the frequency component data of the third digital filter and the fourth digital filter respectively corresponding to the third image and the fourth image with multiple transform characteristics are applied to each pixel of the image to generate the third image and the fourth image. Thereby, the first operation is needed only one time, and the calculation time can be shortened.

In an image processing device according to a further alternative aspect of the present invention, it is preferable that, as the first digital filter group and second digital filter group, a first digital filter group and second digital filter group having left-right symmetry to each other at a center of an image and changing the left-right symmetry depending on an image height in a pupil-division direction be used.

Here, the first and second digital filter groups are filters for each parallax corresponding to the transform characteristics by which the light entering the single image-taking optical system is transformed into the first and second images. Accurately comprehending what filters are applied to the first and second images is important to obtain appropriate first and second frequency filters (intended third and fourth images). Then, the sensitivities in the first and second images acquired after the pupil division vary depending on the incident angle. Therefore, although the first and second digital filters have left-right symmetry to each other at the center of the image, the left-right symmetry changes according to the image height in the pupil-division direction. Accordingly, it is preferable to use different first and second digital filters according to the image height.

In an image processing device according to a further alternative aspect of the present invention, it is preferable that, as the first digital filter group and second digital filter group, a first digital filter group and second digital filter group having shapes into which an opening shape of a diaphragm is divided be used, the diaphragm being included in the image-taking optical system, the opening shape of the diaphragm being an shape when the first image and the second image are acquired.

The first and second digital filter groups are comparable to blur images of a point image (blur images that vary according to the parallax) after the pupil division and have shapes obtained by dividing the opening shape of the diaphragm of the lens. The first and second digital filter groups have, for example, shapes obtained by dividing a circular shape into two when the diaphragm opening has a circular shape and have shapes obtained by dividing a polygonal shape into two when the diaphragm opening has a polygonal shape. Therefore, it is preferable that the first and second digital filter groups be adapted to the opening shape of the diagram at the time of image capturing of monocular 3D images.

In an image processing device according to a further alternative aspect of the present invention, it is preferable that the first image and the second image be color images that are output from a color imaging element and that have three primary colors, and as the first digital filter group and second digital filter group, first digital filter groups and second digital filter groups that are different for each color, corresponding to a sensitivity characteristic for each color of the color imaging element be used.

The first and second sensitivities for the incidence angle of the light entering the color imaging element are different for each color of the three primary colors. Accordingly, it is preferable that the first and second digital filters, which are designed based on these sensitivities, be designed for each color.

In an image processing device according to a further alternative aspect of the present invention, it is preferable that, as the third digital filter group and fourth digital filter group, a third digital filter group and fourth digital filter group corresponding to a particular color of the three primary colors of the color images be used. Thereby, it is possible to eliminate the influence of the difference in the picture shape for each color, and to achieve the improvement of the image quality.

In an image processing device according to a further alternative aspect of the present invention, it is preferable that the first image and the second image be color images that are output from a color imaging element and that have three primary colors, the parallax acquisition device calculate the parallax between the corresponding pixels of the acquired first image and second image, for each color, and the operation processing device perform the operation process for the acquired first image and second image, for each color.

Since the lens has a chromatic aberration, the blur (the parallax) is different for each color. Accordingly, it is preferable to acquire the parallax between corresponding pixels of the first and second images, for each color, and to transform the first and second images into the third and fourth images, based on the parallax that is different for each color. Thereby, it is possible to eliminate the influence of the chromatic aberration of the three primary colors, and to achieve the improvement of the image quality.

An image capturing device according to a further alternative aspect of the present invention includes: a single image-taking optical system; an imaging element on which subject images are formed respectively, the subject images being images having passed through a first region and a second region and being images after a pupil division, the first region and the second region being different regions in the image-taking optical system, the imaging element performing a photoelectric conversion of the subject images having passed through the first region and the second region and outputting a first image and a second image, respectively; an image acquisition device acquiring the first image and second image output from the imaging element; and any image processing device described above.

A further alternative aspect of the present invention provides an image processing method including: an image acquisition step of acquiring a first image and a second image that are captured through a single image-taking optical system and that have a parallax to each other after a pupil division by a pupil-division device; a parallax acquisition step of acquiring a parallax between corresponding pixels of the acquired first image and second image; a first data transform step of transforming predetermined regions based on the target pixel into first frequency component data and second frequency component data, respectively, for each target pixel of processing of image data of the acquired first image and image data of the acquired second image; an operation processing step of performing a multiplication process for each of the frequency component data of the acquired first image and second image by using a first frequency filter group and a second frequency filter group for respectively transforming the transformed first frequency component data and second frequency component data in a frequency space and for transforming the acquired first image and second image to a third image and a fourth image in which a parallax amount and a blur amount of the acquired first image and second image have been altered, the first frequency filter and the second frequency filter corresponding to the parallax of the target pixels acquired in the parallax acquisition device; and a second data transform step of transforming third frequency component data and fourth frequency component data corresponding to the third image and the fourth image calculated in the operation processing step into data on a real space and for selecting pixels at positions corresponding to the target pixels as one pixel of the third image and one pixel of the fourth image, wherein the first data transform step, the operation processing step, and the second data transform step are repeatedly executed for each pixel while shifting the positions of the target pixels.

An image processing method according to a further alternative aspect of the present invention further includes: a step for preparing a digital filter storage device storing a first digital filter group and a second digital filter group for each parallax, the first digital filter group and the second digital filter group corresponding to a transform characteristic by which light entering the single image-taking optical system is transformed into the first image and the second image; and a frequency filter calculation step for calculating the first frequency filter group and the second frequency filter group, based on a third digital filter group and a fourth digital filter group for each pixel, the third digital filter group and the fourth digital filter group corresponding to a transform characteristic by which the light entering the single image-taking optical system is transformed into the third image and the fourth image, in which, in the operation processing step, for each pixel of the acquired first image and second image, based on the parallax for a pixel acquired by the parallax acquisition step, the first frequency filter and second frequency filter corresponding to the parallax are selected from the calculated first frequency filter group and second frequency filter group, and then the multiplication process is performed using the selected first frequency filter and second frequency filter.

An image processing method according to a further alternative aspect of the present invention further includes a step for preparing a frequency filter storage device storing the first frequency filter group and second frequency filter group for each parallax that are calculated based on a first digital filter group and second digital filter group for each parallax and a third digital filter group and fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image, in which, in the operation processing step, for each pixel of the acquired first image and second image, based on the parallax for a pixel acquired by the parallax acquisition step, the first frequency filter and second frequency filter corresponding to the parallax are read from the stored first frequency filter group and second frequency filter group, and then the multiplication process is performed using the read first frequency filter and second frequency filter.

The image processing method according to a further alternative aspect of the present invention further includes a step of preparing an inverse filter storage device storing a first inverse filter group and a second inverse filter group that are inverse filter groups of frequency component data of the first digital filter group or the second digital filter group for each parallax corresponding to the transform characteristics by which the light entering the single image-taking optical system is transformed into the first image or the second image, wherein in the operation processing step, the stored inverse filter groups and a third frequency filter group and a fourth frequency filter group that are frequency component data of the third digital filter group and the fourth digital filter group for each parallax corresponding to the transform characteristics by which the light entering the single image-taking optical system is transformed into the third image and the fourth image are used as the first frequency filter group and the second frequency filter group.

According to the present invention, it is possible to generate intended third and fourth images for stereovision in which the parallax amount and the blurring amount have been adjusted in conjunction, from a first image and second image (monocular 3D images) having a parallax to each other, for which the pickup through a single image-taking optical system and the pupil division by a pupil-division device have been performed. Further, by specifying, for the intended third and fourth images, at least one of the focal length, diaphragm value, imaging element size and sensitivity characteristic of the image-taking optical system, which is different from the first and second images, it is possible to generate the third and fourth images that are obtained in the case of altering at least one of the focal length, diaphragm value, imaging element size and sensitivity characteristic when the first and second images are picked up, although the third and fourth images are not actually picked up.

BRIEF DESCRIPTION OF THE DRAWINGS

FIG. 3 is a block diagram showing an embodiment of the internal configuration of the image capturing device shown in FIG. 1.

FIG. 6 is a diagram to be used for explaining a creation method of a semilunar filter.

FIG. 16 is a principal part block diagram showing a second embodiment of the image processing device according to the present invention.

FIG. 17 is a principal part block diagram showing a third embodiment of the image processing device according to the present invention.

FIG. 20A is a conceptual diagram showing an ordinary process and a calculation-time shortening process when multiple second monocular 3D images are generated from a first monocular 3D image.

FIG. 20B is a conceptual diagram showing an ordinary process and a calculation-time shortening process when multiple second monocular 3D images are generated from a first monocular 3D image.

DETAILED DESCRIPTION OF THE PREFERRED EMBODIMENTS

Hereinafter, embodiments of an image processing device and method and an image capturing device according to the present invention are explained with reference to the accompanying drawings.

[Image Capturing Device]

Figure 1:
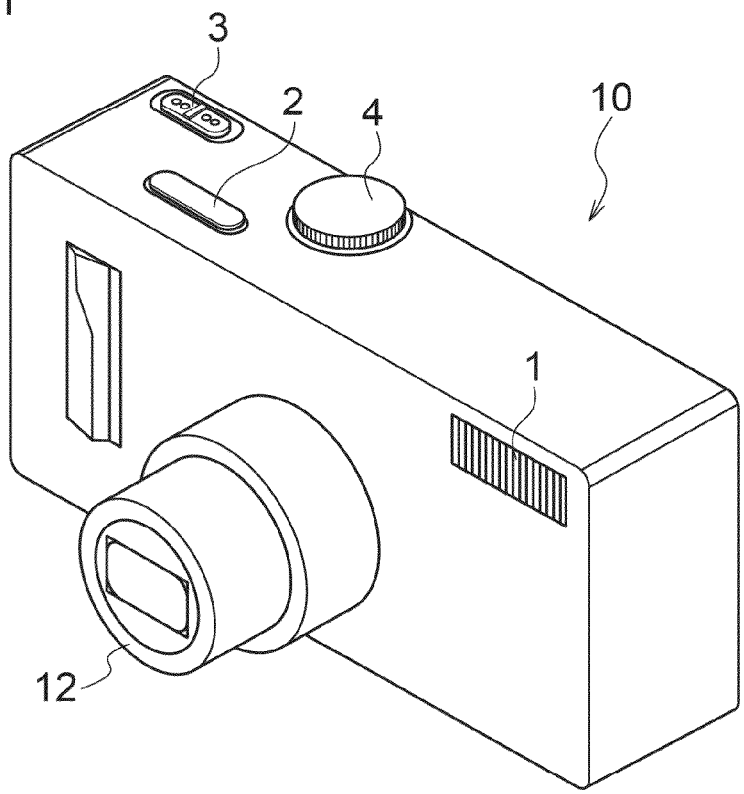
FIG. 1 is a perspective view showing an embodiment of an image capturing device according to the present invention.
Figure 2:
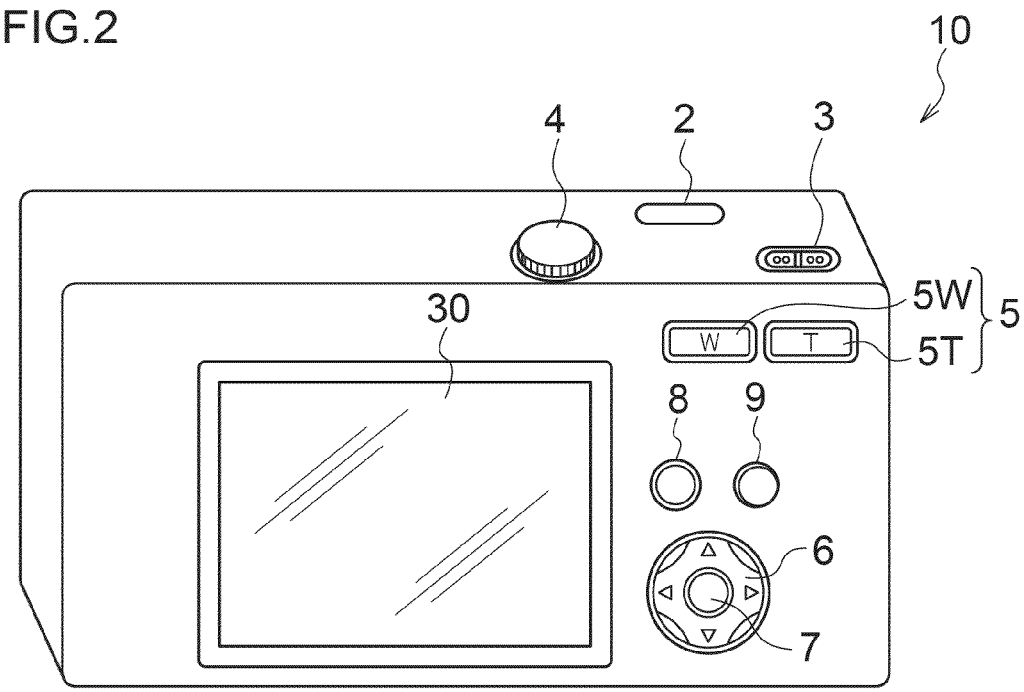
FIG. 2 is a back view of the image capturing device shown in FIG. 1.

FIG. 1 and FIG. 2 are a perspective view and a back view showing an embodiment of an image capturing device according to the present invention, respectively. This image capturing device 10 is a digital camera that receives the light having passed through a lens with an imaging element, transforms it into a digital signal, and records it in a recording medium, and is a monocular 3D image device that can pick up a monocular 3D image and a 2D image.

As shown in FIG. 1, the image capturing device 10 includes an image-taking lens (image-taking optical system) 12, a flash emitting unit 1, and the like provided on the front surface and includes a shutter button 2, a power/mode switch 3, a mode dial 4, and the like provided on the top surface. Meanwhile, as shown in FIG. 2, a 3D liquid crystal monitor 30 for 3D display, a zoom button 5, a cross button 6, a MENU/OK button 7, a playback button 8, a BACK button 9, and the like are provided on the back surface of the image capturing device 10.

The image-taking lens 12 is constituted by a collapsible zoom lens and is extended from the camera body by setting the mode of the camera to an image-taking mode through the power/mode switch 3. The flash emitting unit 1 emits light toward a main subject.

The shutter button 2 is constituted by a two-step stroke type switch including so-called "half-push" and "full-push". When the image capturing device 10 is driven in the image-taking mode, the image capturing device 10 executes an imaging preparation process (AE (Automatic Exposure), AF (Automatic Focus), and the like) by the "half-push" of the shutter button 2 and executes image taking by the "full-push". When the image capturing device 10 is driven in the image-taking mode, the image capturing device 10 executes image taking by the "full-push" of the shutter button 2.

The power/mode switch 3 has both of a function of a power switch for turning on/off the power of the image capturing device 10 and a function of a mode switch for setting the mode of the image capturing device 10, and the power/mode switch 3 is provided to be able to slide among an "OFF position", a "playback position", and an "image-taking position". In the image capturing device 10, the power is turned on when the power/mode switch 3 is slid and placed to the "playback position" or the "image-taking position", and the power is turned off when the power/mode switch 3 is placed to the "OFF position". Then, when the power/mode switch 3 is slid and placed to the "playback position", the "playback mode" is set, and when it is placed to the "image-taking position", the "image-taking mode" is set.

The mode dial 4 functions as an image-taking mode setting device setting the image-taking mode of the image capturing device 10, and depending on the setting position of this mode dial, the image-taking mode of the image capturing device 10 is set to various modes. For example, there are a "plane image taking mode" for taking a plane image (2D image), a "stereoscopic image taking mode" for taking a stereoscopic image (3D image), a "moving image taking mode" for taking a moving image, and the like.

A 3D liquid crystal monitor (LCD: Liquid Crystal Display) 30 is a stereoscopic display device that can display a stereovision image (a left-eye image and a right-eye image) with a parallax barrier, as oriented images having predetermined orientations respectively. When a stereovision image is input to the 3D liquid crystal monitor 30, a parallax barrier having a pattern in which light transmitting parts and light blocking parts are alternately arrayed at a predetermined pitch is generated on a parallax barrier display layer of the 3D liquid crystal monitor 30, and strip-shaped image fragments showing the left and right pictures are alternately arranged and displayed on an image display surface of the lower layer. In the case of being utilized as a display panel for a plane image or a user interface, nothing is displayed on the parallax barrier display layer, and a single piece of image is displayed with no change on the image display surface of the lower layer. Note that the form of the 3D liquid crystal monitor 30 is not limited to this, and as long as the left-eye image and the right-eye image can be recognized and displayed as stereoscopic images, a lenticular lens may be used, or dedicated glasses, such as polarization glasses and liquid-crystal shutter glasses, may be applied to individually view the left-eye image and the right-eye image.

The zoom button 5 functions as a zoom instruction device instructing zooming. The zoom button 5 includes a tele-button 5T for instructing zooming to the telescopic-side and a wide-button 5W for instructing zooming to the wide-side. In the image capturing device 10, when the tele-button 5T and the wide-button 5W are operated in the image-taking mode, the focal length of the image-taking lens 12 is changed. Further, when the tele-button 5T and the wide-button 5W are operated in the playback mode, the playing image is magnified or demagnified.

The cross button 6 is an operation unit for inputting instructions for four directions: the upward direction, the downward direction, the leftward direction and the rightward direction, and functions as a button (cursor-movement operation device) for selecting an item from a menu screen, or for giving instructions of selections of various setting items from each menu. The left/right key functions as a frame advance (forward directional/backward directional advance) button in the playback mode.

The MENU/OK button 7 is an operation key having both of a function as a menu button for commanding the display of a menu on the screen of the 3D liquid crystal monitor 30 and a function as an OK button for commanding the decision and execution of the selected content, or the like.

The playback button 8 is a button for the switching to the playback mode, in which a still image or moving image of a taken and recorded stereoscopic image (3D image) or plane image (2D image) is displayed on the 3D liquid crystal monitor 30.

The BACK button 9 functions as a button for giving an instruction of the cancel of an input operation or the restoration to the last operation state.

[Internal Configuration of Image Capturing Device]

FIG. 3 is a block diagram showing an embodiment of the internal configuration of the above image capturing device 10. The image capturing device 10 records a picked-up image in a memory card 54, and the operation of the whole device is integrally controlled by a central processing unit (CPU) 40.

The image capturing device 10 is provided with an operation unit 38 including the shutter button 2, the power/mode switch 3, the mode dial 4, the playback button 8, the MENU/OK button 7, the cross button 6, the zoom button 5, and the BACK button 9. A signal from the operation unit 38 is input to the CPU 40. Based on the input signal, the CPU 40 controls each circuit of the image capturing device 10, and performs, for example, the lens drive control, the diaphragm drive control, the image-taking operation control, the image processing control, the recording/playing control of image data, the display control of the 3D liquid crystal monitor 30, and the like.

When the power of the image capturing device 10 is turned on by the power/mode switch 3, a power unit, which is not shown in the figure, supplies electricity to each block and the drive of the image capturing device 10 starts.

The light flux having passed through the image-taking lens 12, a diaphragm 14 and the like forms an image on the imaging element 16 (image capturing device, image acquisition device) that is a phase-difference image sensor, and signal charges are accumulated in the imaging element 16.

Here, the imaging element 16 can acquire a left-eye image and a right-eye image (monocular 3D images) different in parallax depending on the defocus amount. The imaging element 16 can also add the left-eye image and the right-eye image to acquire a 2D image. Note that the details of the imaging element 16 are described later. Further, although the imaging element 16 of this embodiment is a CCD (Charge Coupled Device) image sensor, the imaging element 16 is not limited to this, and the imaging element 16 may be a CMOS (Complementary Metal Oxide Semiconductor) type image sensor.

The signal charges for the left-eye image and right-eye image accumulated in the imaging element 16 are read as a voltage signal corresponding to the signal charges, based on a reading signal to be given from a timing generator (not shown in the figure). The voltage signal read from the imaging element 16 is given to an analog signal processing unit 18. The CCD control unit 32 controls reading of an image signal from the imaging element 16.

The analog signal processing unit 18 performs, to the voltage signal output from the imaging element 16, a correlated double sampling process (a process for obtaining accurate pixel data by acquiring the difference between the level of feed through components and the level of pixel signal components contained in the output signal for each pixel of the imaging element 16, with the aim of reducing noises (particularly, thermal noises) and the like contained in the output signal of the imaging element 16). Thereby, the R (Red), G (Green) and B (Blue) signals for each pixel are sampled and held, and, after amplification, are given to an A/D converter 20. The A/D converter 20 sequentially converts the input R, G and B signals into R, G and B digital signals, and outputs them to an image input controller 22.

To the digital image signals input through the image input controller 22, a digital signal processing unit 24 performs predetermined signal processes such as an offset process, a white balance correction, a gain control process including a sensitivity correction, a gamma correction process, a demosaic process, a YC process and an edge enhancement process.

Further, the digital signal processing unit 24 includes a parallax acquisition device acquiring the parallax between corresponding pixels of the left-eye image and the right-eye image, a parallax map acquisition device creating a parallax map from the acquired parallax, a filtering processing device altering both of the parallax amount and blur amount of the monocular 3D images in conjunction, from the acquired left-eye image and right-eye image (first monocular 3D images) and the acquired parallax map, and generating an intended left-eye image and right-eye image (second monocular 3D images). The detail of an image processing method for generating the intended second monocular 3D images from the first monocular 3D images acquired at the time of pickup is described later.

The 2D or 3D image data processed by the digital signal processing unit 24 are input to a VRAM (Video Random Access Memory) 50. The VRAM 50 includes an A region and a B region for recording image data each of which shows a 2D or 3D image for one frame. In the VRAM 50, the image data showing a 2D or 3D image for one frame are rewritten alternately in the A region and the B region. The written image data are read from the region other than a region in which image data are being rewritten, of the A region and B region in the VRAM 50.

The 2D or 3D image data read from the VRAM 50 are encoded in a video encoder 28, and then, are output to the 3D liquid crystal monitor 30 provided on the back surface of the camera. Thereby, 2D or 3D subject images are continuously displayed on the display screen of the 3D liquid crystal monitor 30.

When the first-step push (half-push) of the shutter button 2 of the operation unit 38 is performed, the CPU 40 starts the AF operation and the AE operation, moves the focus lens of the image-taking lens 12 in the optical axis direction through the lens drive unit 36, and performs such a control that the focus lens comes to the focusing position.

The AF processing unit 42 is a part for performing a contrast AF process or a phase-difference AF process. In the case of performing the contrast AF process, for at least one image of the left-eye image and the right-eye image, high frequency components of the image in a predetermined focus region are extracted, and an AF evaluation value indicating a focusing state is calculated by integrating the high frequency components. The focus lens in the image-taking lens 12 is moved to such a lens position that the AF evaluation value is maximized, and thereby, the AF control (contrast AF) is performed.

In response to the zoom command from the zoom button 5, the CPU 40 advances or retreats the zoom lens in the optical axis direction through the lens drive unit 36, and alters the focal length.

Further, at the time of the half-push of the shutter button 2, the image data output from the A/D converter 20 are taken in an AE detection unit 44.

The AE detection unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the subject based on the integrated value input from the AE detection unit 44. The CPU 40 controls the diaphragm drive unit 34, and based on the image-taking Ev value, determines the F-value of the diaphragm 14 and the electronic shutter (shutter speed) of the imaging element 16 according to a predetermined program chart.

Note that, in FIG. 3, reference numeral 46 designates a known face detection circuit for detecting the face of a person in an image-taking angular filed and setting an area containing the face as an AF area and an AE area (for example, Japanese Patent Application Laid-Open No. 9-101579).

Further, reference numeral 47 designates a ROM (EE-PROM: Electronically Erasable and Programmable Read Only Memory) (digital filter storage device, transform filter storage device and inverse filter storage device) in which an image processing program for generating the second monocular 3D images according to the present invention, first and second semilunar filter groups (first and second digital filter groups) to be used for generating the second monocular 3D images, first and second transform filter groups for transforming the first monocular 3D images into the second monocular 3D images, first and second inverse filter groups that are inverse filters of the first and second semilunar filter groups, and the like are stored in addition to a camera control program, the defect information of the imaging element 16, and various parameters or tables to be used for image processes and the like. Note that the details of the image processing program, the filter groups and the like according to the present invention are described later.

When the AE operation and AF operation by the half-push of the shutter button 2 is finished and the second-step push (full-push) of the shutter button is performed, in response to the push, and that are output from the A/D converter 20 are input from the image input controller 22 to a memory (SDRAM: Synchronous Dynamic Random Access Memory) 48, and are temporarily stored.

The digital signal processing unit 24 appropriately reads the image data temporarily stored in the memory 48. Then, the digital signal processing unit 24 applies, to the image data read from the memory 48, predetermined processing including a demosaic process (a process of calculating all color information for each pixel from a mosaic image corresponding to the color filter arrangement in the single-plate color imaging element. A process of calculating color information of all of RGB for each pixel in the present embodiment), image processing of edge enhancement, and a YC process (generation process of luminance data and color difference data of image data), and the image data (YC data) after the YC process is stored again the memory 48.

The YC data stored in the memory 48 are output to a compression/decompression processing unit 26, and, after the execution of a predetermined compression process such as JPEG (Joint Photographic Experts Group), are stored in the memory 48, again. From the YC data (compressed data) stored in the memory 48, an image file is generated. The image file is read by a medium controller 52, and is recorded in a memory card 54.

The image capturing device 10 with the above configuration has an image processing function to generate intended 3D images (the second monocular 3D images) from picked-up 3D images (the first monocular 3D images), at the time of the pickup or playback of the 3D images. The other parts are the same as the conventional one.

[First and Second Digital Filter Groups (First and Second Semilunar Filter Groups)]

Next, the monocular 3D images and the first and second digital filter groups (the first and second semilunar filter groups) to which an image processing method according to the present invention is applied are explained with reference to FIGS. 4A to 4C and FIG. 5.

Figure 4B:
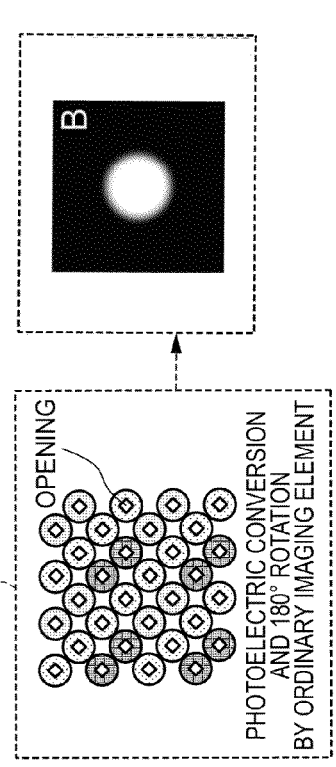
FIG. 4B is a diagram to be used for explaining an image that is picked up by an ordinary imaging element, and a left-eye image and right-eye image that are picked up by a monocular 3D imaging element.
Figure 4C:
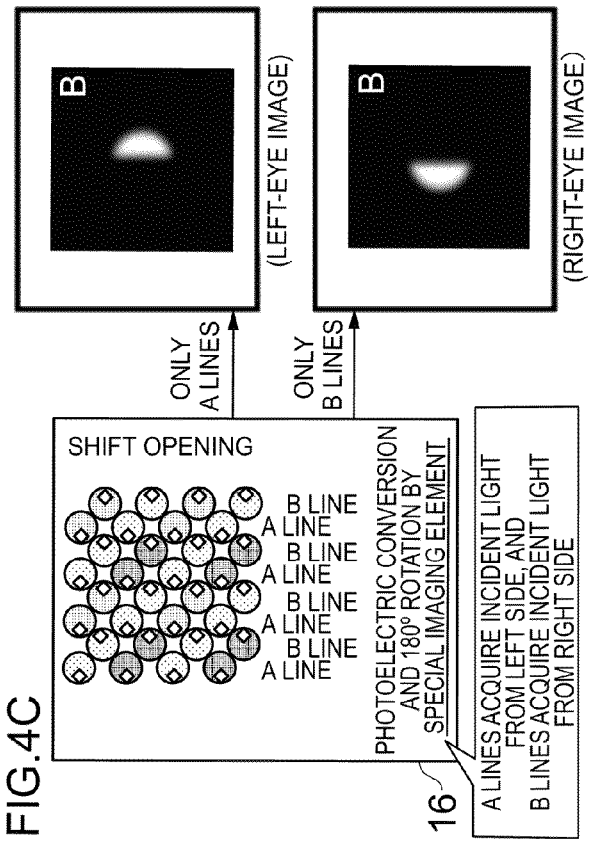
FIG. 4C is a diagram to be used for explaining an image that is picked up by an ordinary imaging element, and a left-eye image and right-eye image that are picked up by a monocular 3D imaging element.
Figure 4A:
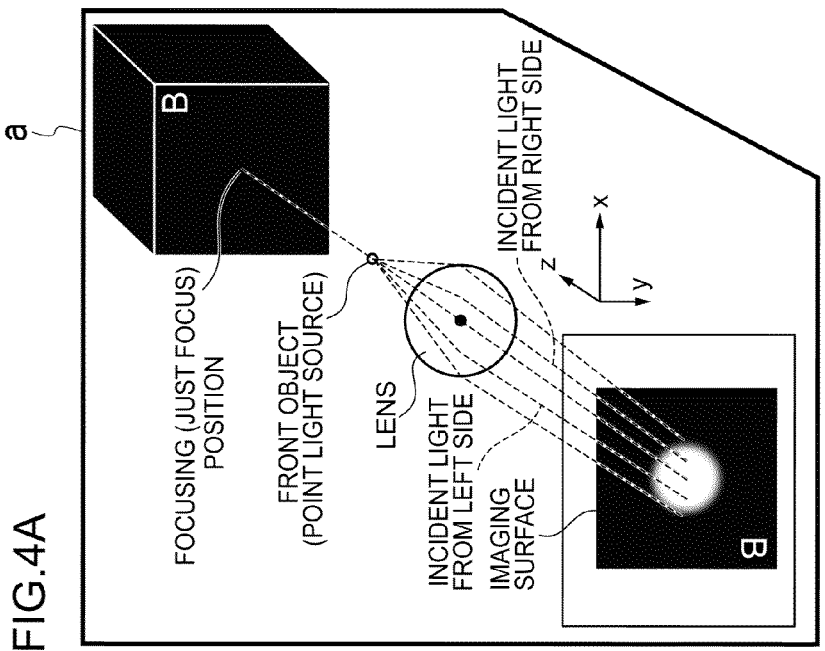
FIG. 4A is a diagram to be used for explaining an image that is picked up by an ordinary imaging element, and a left-eye image and right-eye image that are picked up by a monocular 3D imaging element.

FIGS. 4A to 4C are diagrams showing how an object (point light source) in front of the focus position is imaged, with the focus of a lens adjusted on the front surface of an object a. FIG. 4B shows an image captured by an ordinary imaging element 200. FIG. 4C shows a left-eye image and a right-eye image captured by the special imaging element (monocular 3D imaging element) 16. Note that in the imaging elements 200 and 16 of FIG. 4B and FIG. 4C, light receiving surfaces viewed from the subject side are shown, respectively.

The imaging element 200 shown in FIG. 4B includes pixels of odd lines (main-pixels, also called A-plane pixels) and pixels of even lines (sub-pixels, also called B-plane pixels) arranged in a matrix that are disposed so as to be deviated from each other by one-half pitches in the horizontal and vertical directions. An image (A-plane image) composed of the A-plane pixels and an image (B-plane image) composed of the B-plane pixels each have color filters in the Bayer array. From these A-plane image and B-plane image, a single piece of high-resolution image can be generated. Note that openings to be entered by light, which are provided so as to correspond to the A-plane pixels and B-plane pixels of the imaging element 200, are formed at the centers of the respective pixels. Further, micro-lenses not shown in the figure are provided on the respective pixels.

The image of the point light source in front of the focus position that is obtained from the imaging element 200 involves a rear-focus, and forms a circle with a diameter equivalent to the blur amount.

On the other hand, in the imaging element 16 shown in FIG. 4C, openings formed on the A-plane pixels and openings formed on the B-plane pixels are biased in the left and right directions, respectively. The light having passed through the left-side region of the lens enters the A-plane pixels, and the light having passed through the right-side region of the lens enters the B-plane pixels.

An image (A-plane image) composed of the A-plane pixels of the monocular 3D imaging element 16 having the above configuration is a left-eye image, and an image (B-plane image) composed of the B-plane pixels is a right-eye pixel.

The image of the point light source in front of the focus position that is obtained from the imaging element 16 involves a rear-focus, and the left-eye image and the right-eye image have semilunar shapes with diameters equivalent to the respective blur amounts. Then, the deviation amount between the centroid of the semilunar left-eye image and the centroid of the right-eye image is the parallax amount of the image of the point light source. That is, as for the image of the point light source in front of the focus position, if the characteristic (the sensitivity for each angle) of the imaging element 16 is already known, it is possible to know what left-eye and right-eye filters (the above-described first digital filter and second digital filter) are convoluted to the point light source. Note that the above first digital filter and second digital filter have semilunar shapes, and therefore, are referred to as the "first semilunar filter and second semilunar filter", hereinafter.

Figure 5A:
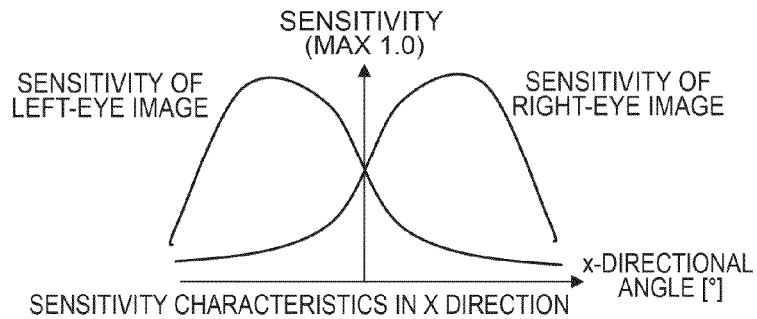
FIG. 5A is a diagram showing sensitivity characteristics of the monocular 3D imaging element and a semilunar created according to the sensitivity characteristics.
Figure 5B:
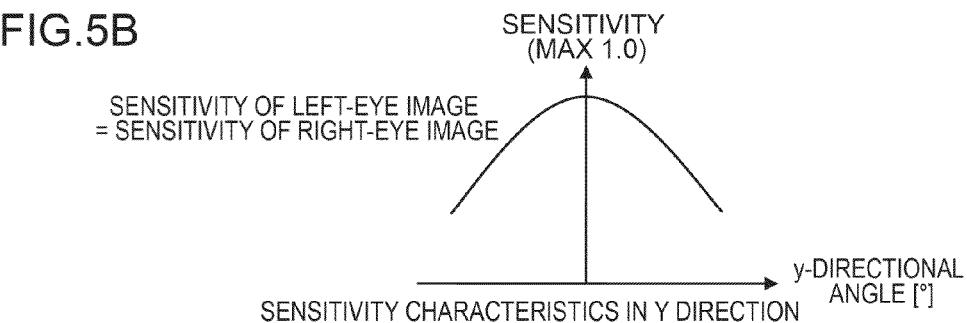
FIG. 5B is a diagram showing sensitivity characteristics of the monocular 3D imaging element and a semilunar created according to the sensitivity characteristics.

Now, FIG. 4C shows an example of the sensitivities of the left-eye image and right-eye image for an x-directional angle [°] of the light that enters the monocular 3D imaging element 16 through the lens shown in FIG. 5A, and FIG. 5B shows an example of the sensitivities of the left-eye image and right-eye image for a y-directional angle [°].

As shown in FIG. 5A, the sensitivities of the left-eye image and right-eye image for the x-directional angle [°] have a rough symmetry centered on an angle of zero, and the peak positions of the sensitivities are deviated. Further, as shown in FIG. 5B, the sensitivities of the left-eye image and right-eye image for the y-directional angle [°] coincide, and the peak positions of the sensitivities are at an angle of zero.

Figure 5C:
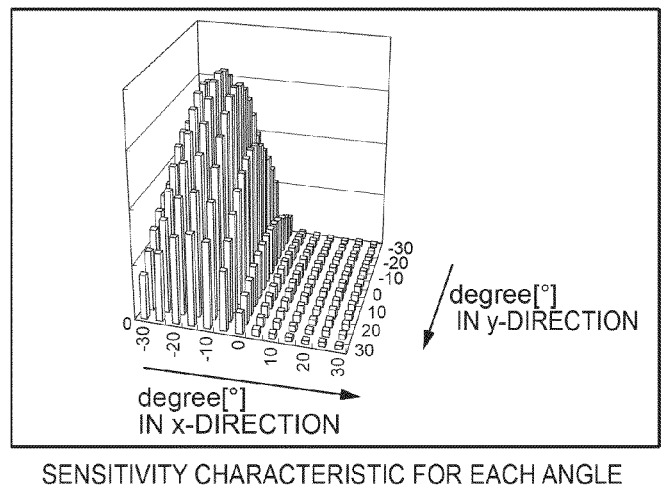
FIG. 5C is a diagram showing sensitivity characteristics of the monocular 3D imaging element and a semilunar created according to the sensitivity characteristics.

When combining the x-directional and y-directional sensitivity characteristics shown in FIG. 5A and FIG. 5B, the sensitivity characteristic for each of the x-directional and y-directional angles of the light entering the imaging element 16 is obtained as shown in FIG. 5C. Note that FIG. 5C shows the sensitivity characteristic corresponding to the left-eye image of the imaging element 16.

Figure 5D:
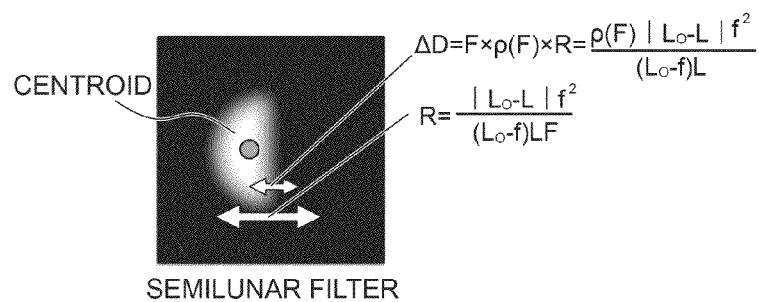
FIG. 5D is a diagram showing sensitivity characteristic of the monocular 3D imaging element and a semilunar created according to the sensitivity characteristics.

Next, as shown in FIG. 5D, assuming that only a range with a certain diameter R on the imaging element 16 that corresponds to the blur amount of a point image is exposed to light, the angles are converted into coordinates with respect to the x-axis (lateral direction) and y-axis (longitudinal direction) of the imaging element 16. In this case, the length between the centroids of the left and right semilunar filters (that is, the parallax $\Delta D$), and the diameter R of the semilunar filters can be expressed by the following formulas, respectively.

$$\Delta D = \frac{\rho(F)|L_o - L|f^2}{(L_o - f)L} \quad \text{[Formula 1]}$$

$$R = \frac{|L_o - L|f^2}{(L_o - f)LF} \quad \text{[Formula 2]}$$

Here, in [Formula 1] and [Formula 2], as shown in FIG. 6, f [mm] represents the actual focal length, F represents the diaphragm value, $L_o$ [mm] represents the focusing length to the just focus position, and L [mm] represents the length to a subject. Further, $\Delta D$ can be expressed as a predetermined ratio to R, using $\rho(F)$, which is a function in terms of F. Therefore, if $\Delta D$ is known, it is possible to know the value of R and the radius and distribution of a currently applied semilunar filter.

Figure 7:
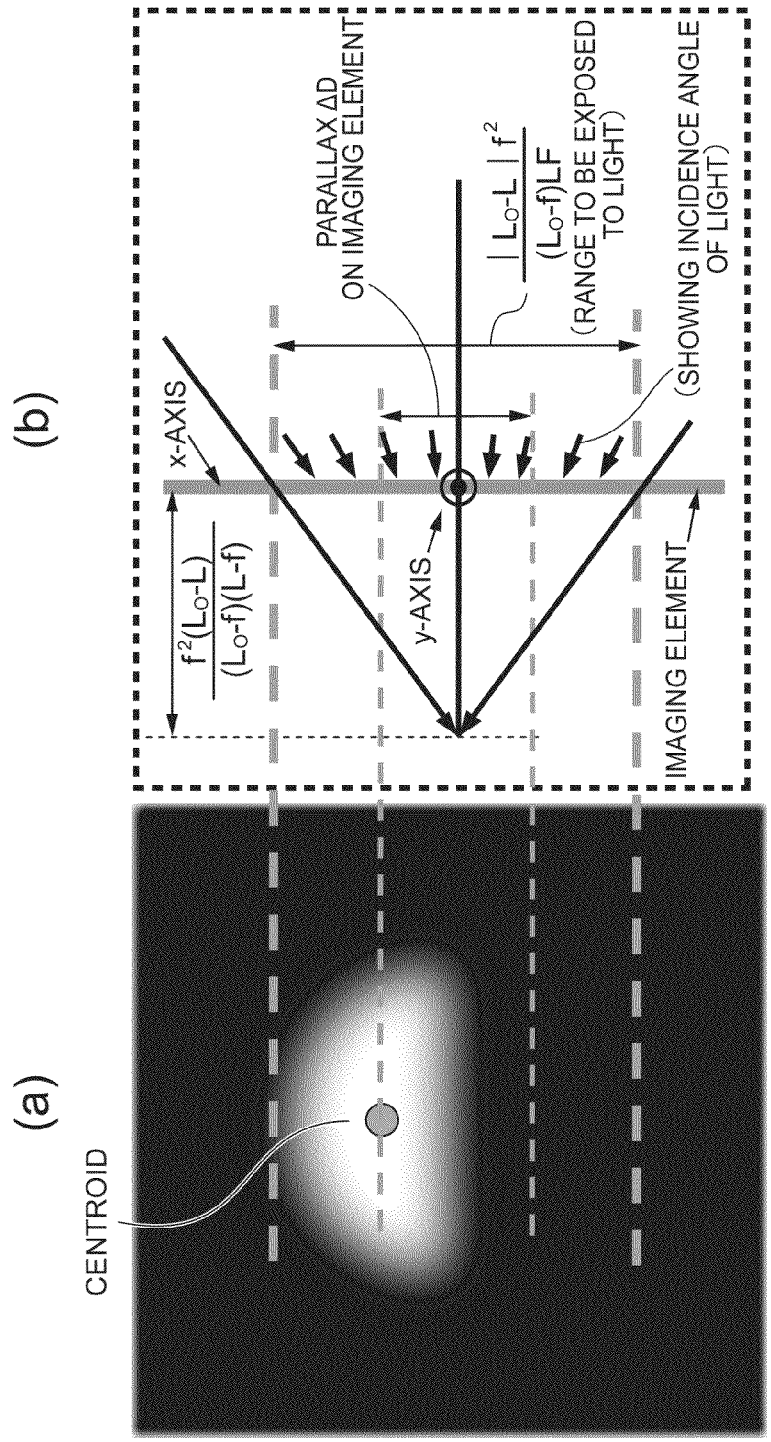
FIG. 7 is an enlarged view of the principal part of FIG. 6 and a diagram showing the semilunar filter.

The (a) portion and (b) portion of FIG. 7 are enlarged views of the semilunar filter and the vicinity of the imaging surface in FIG. 6, respectively. Note that the formulas shown in FIG. 6 and FIG. 7 can be derived from the lens equation and the geometric relation.

Figure 8:
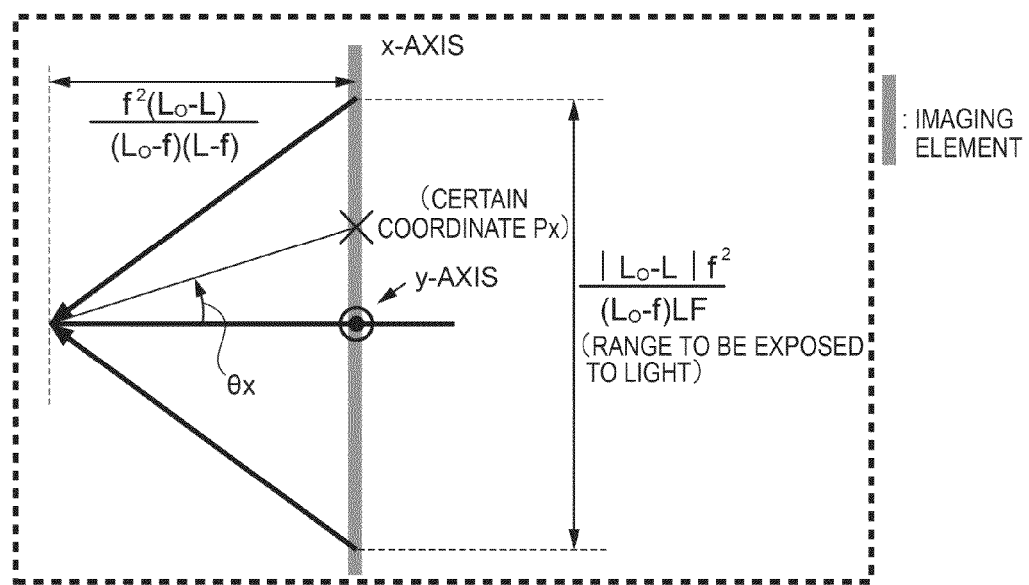
FIG. 8 is an enlarged view of the principal part of FIG. 6 and shows the relationship between the coordinate on the imaging element and the incidence angle.

Further, in the calculation of the filter coefficient of the semilunar filter, as shown in FIG. 8, when certain coordinates are (Px, Py) and the incidence angle of light to the coordinates (Px, Py) is ($\theta$x, $\theta$y), ($\theta$x, $\theta$y) shown in [Formula 4] is determined for (x, y) shown in the following [Formula 3].

$$x^2 + y^2 \leq \left(\frac{|L_o - L|f^2}{2(L_o - f)LF}\right)^2 \quad \text{[Formula 3]}$$

$$(\theta_x, \theta_y) = \left(\frac{180}{\pi}\tan^{-1}\left(\frac{2(L_o - f)(L - f)P_x}{f^2|L_o - L|}\right),\right. \quad \text{[Formula 4]}$$
$$\left.\frac{180}{\pi}\tan^{-1}\left(\frac{2(L_o - f)(L - f)P_y}{f^2|L_o - L|}\right)\right)$$

Based on the incidence angle ($\theta$x, $\theta$y) determined by [Formula 4], the filter coefficient of the semilunar filter is calculated by substituting the sensitivity characteristic for each angle shown in FIG. 5C. On this occasion, it is preferable to divide each filter coefficient by the sum total of the filter coefficients, and thereby normalize the filter coefficient.

In the above way, the left and right semilunar filters are created for each parallax $\Delta D$, and are stored in the ROM (EEPROM) 47, in association with the parallax $\Delta D$. It is preferable that the creation of the semilunar filters be previously performed in the exterior and then the created semilunar filters be stored in the ROM 47. However, they may be created in the digital signal processing unit 24 to be stored in the ROM 47.

Further, although the parallax $\Delta D$ is expressed by an absolute value in [Formula 1], the parallax directions (signs) are opposite between the parallax of an object on the near side of the focusing length $L_0$ and the parallax of an object on the far side of the focusing length $L_0$. Therefore, left and right semilunar filters are created for each magnitude of the parallax and for each parallax direction and are stored in the ROM 47.

Figure 9A:
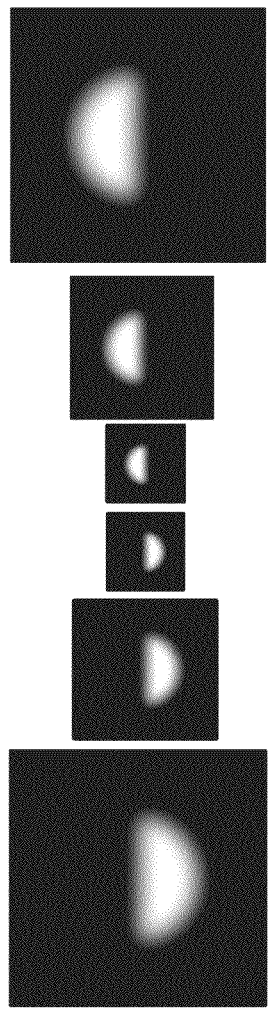
FIG. 9A is a diagram showing an example of first semilunar filters applied to left-eye images of an original monocular 3D image.
Figure 9B:
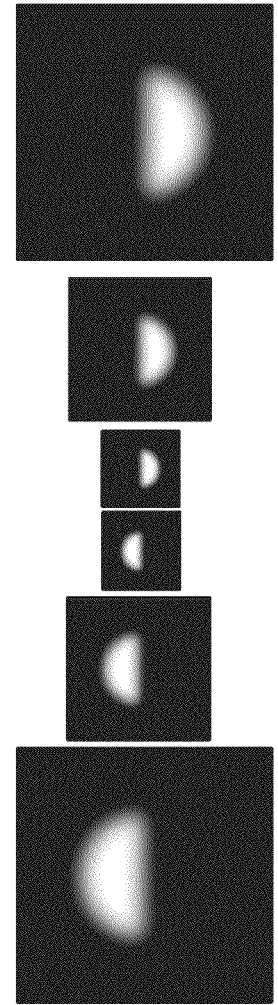
FIG. 9B is a diagram showing an example of second semilunar filters applied to right-eye images of the original monocular 3D image.

FIG. 9A and FIG. 9B show an example of the semilunar filters for each parallax $\Delta D$ (the first and second semilunar filter groups) that are respectively stored in the ROM 47 and that are applied to the left-eye image and the right-eye image.

[Transform Filter]

Next, transform filters for transforming a left-eye image and right-eye image (the first monocular 3D images) that are picked up by the image capturing device 10 and that have a parallax, into an intended left-eye image and right-eye image (the second monocular 3D images), are explained.

Figure 10:
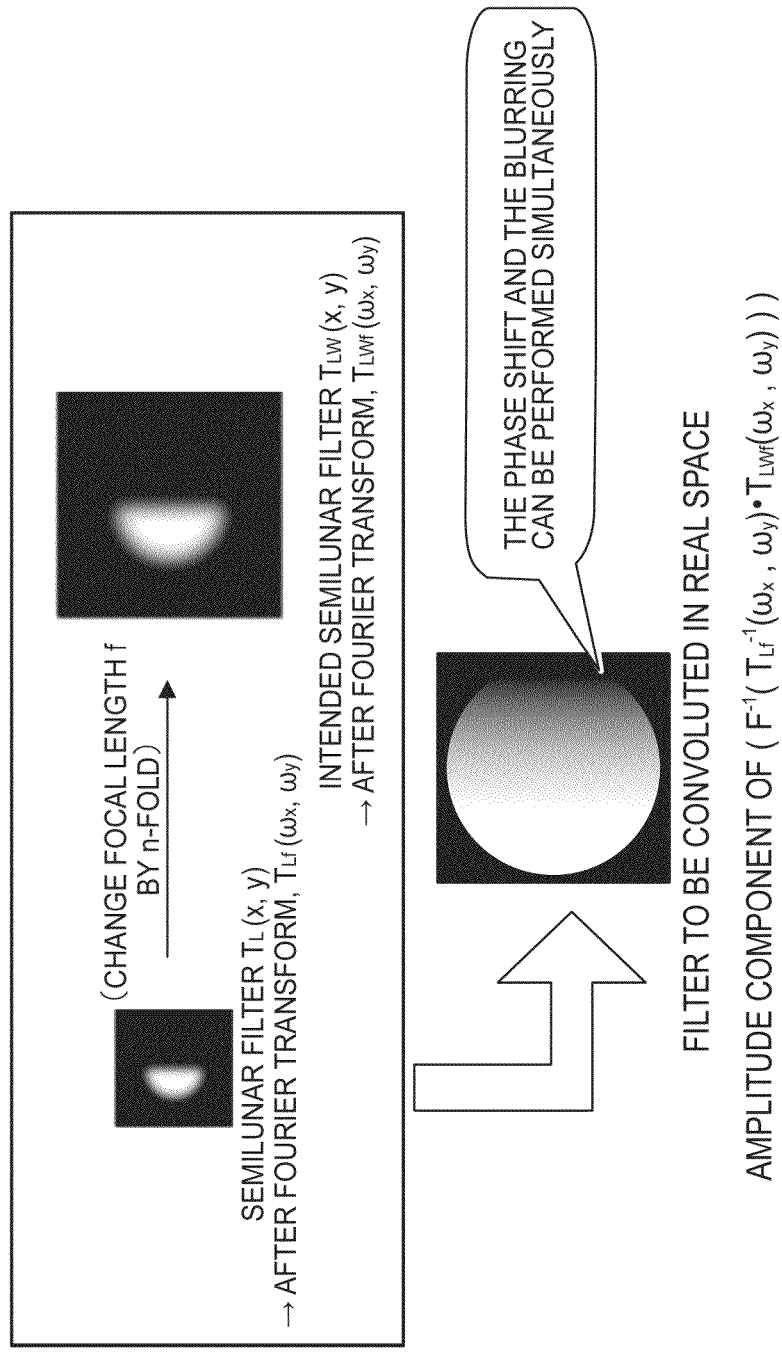
FIG. 10 is a diagram to be used for explaining a filter to be convoluted in real space when an intended monocular 3D image is generated.

As shown in FIG. 10, it is assumed that, when the focal length at the time of the pickup of the first monocular 3D images is f, the second monocular 3D images are obtained by the pickup with an image-taking lens at a focal length (n×f) that is n-fold of the focal length f.

Based on the semilunar filters (the first and second semilunar filters corresponding to the focal length f) previously stored in the ROM 47 and the focal length (n×f), semilunar filters that correspond to the second monocular 3D images (the third and fourth semilunar filters), and in which the parallax ΔD and diameter R shown in the above [Formula 1] and [Formula 2] are each increased by n-squared-fold, are calculated. That is, the third and fourth semilunar filters that have n-squared-fold similar shapes of the first and second semilunar filters are calculated.

Here, suppose that the first semilunar filter applied to the left-eye image of the first monocular 3D images is $T_L(x, y)$ and the first semilunar filter $T_L(x, y)$ to which the Fourier transform has been performed is $T_{Lf}(\omega_x, \omega_y)$, as shown in FIG. 10. On the other hand, suppose that the third semilunar filter to be applied to the left-eye image of the second monocular 3D images is $T_{LW}(x, y)$ and the third semilunar filter $T_{LW}(x, y)$ to which the Fourier transform has been performed is $T_{LWf}(\omega_x, \omega_y)$, a filter to be convoluted in real space (hereinafter, referred to as a "transform filter") is calculated for each pixel of the left-eye image with the parallax ΔD, by the amplitude component of the following formula.

$$F^{-1}(T_{Lf}(\omega_x,\omega_y)^{-1} \cdot T_{LWf}(\omega_x,\omega_y))$$ [Formula 5]

Here, $F^{-1}$: Fourier inverse transform

This transform filter (a first transform filter) is calculated corresponding to the first semilunar filter stored for each parallax. A second transform filter to be used for the transform into the right-eye image of the second monocular 3D images is also calculated in a similar way.

Here, it is preferable that first and second transform filter groups corresponding to the first and second semilunar filter groups be previously calculated depending on the parallax, when intended second monocular 3D images are determined.

Using the first and second transform filter groups calculated in such a way, the first monocular 3D images are transformed into the second monocular 3D images. That is, for each pixel of the left-eye image and right-eye image of the first monocular 3D images, the filtering process is performed using the first transform filter and second transform filter corresponding to the parallax ΔD for the pixel. Thereby, the second monocular 3D images in which both the parallax amount and the blur amount have been transformed in conjunction are generated for each parallax between pixels of the first monocular 3D images.

<Embodiments of Semilunar Filters to be Designed by the Present Invention>

There are various criteria about how to design the semilunar filters to be applied to intended second monocular 3D images depending on the semilunar filters applied to the first monocular 3D images. Embodiments shown below design semilunar filters comparable to the parallax amount and blur amount when changing the focal length by 2-fold, semilunar filters comparable to the parallax amount and blur amount when changing the F-value of the diaphragm to half, and semilunar filters comparable to the parallax amount and blur amount when changing the imaging element size by 1.5-fold.

[Semilunar Filters when Changing Focal Length by 2-Fold]

Figure 11A:
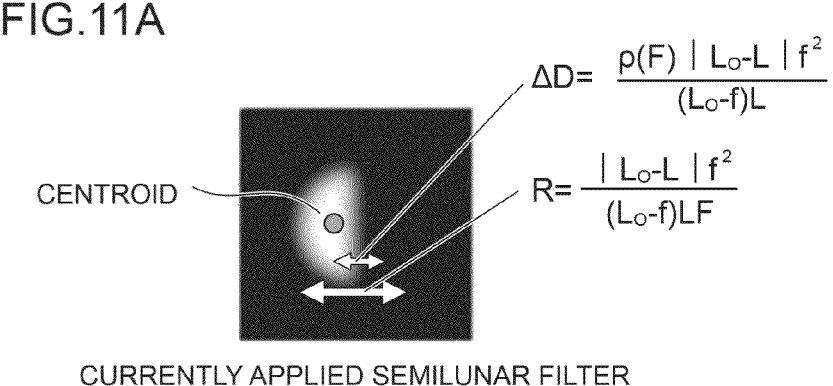
FIG. 11A is a diagram to be used for explaining an example of a semilunar filter to be applied to an intended monocular 3D image.
Figure 11B:
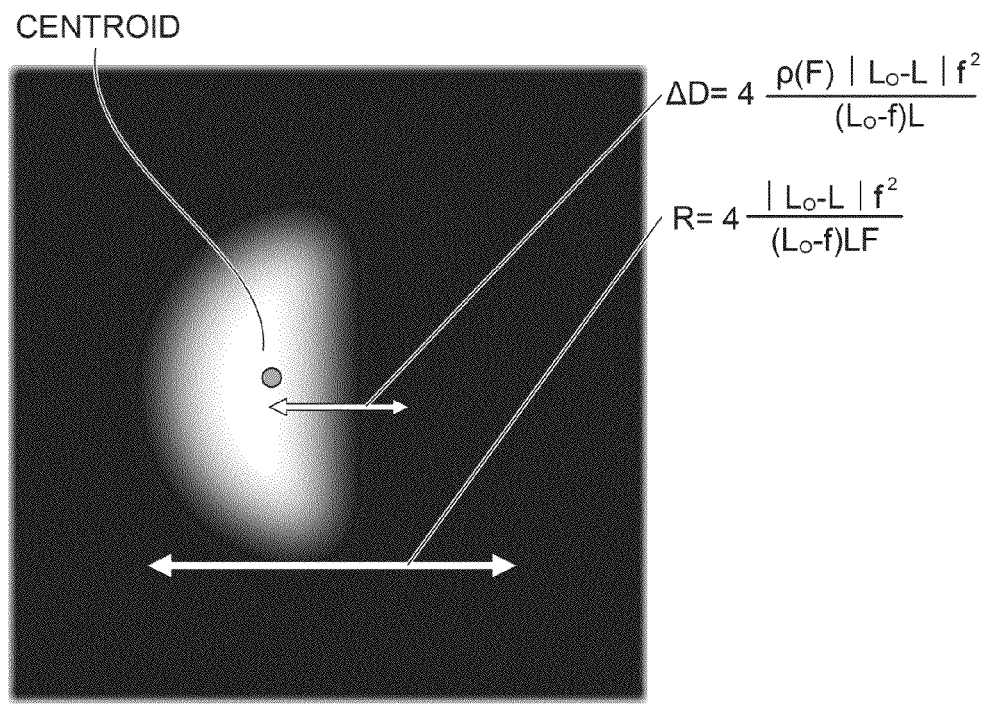
FIG. 11B is a diagram to be used for explaining an example of a semilunar filter to be applied to an intended monocular 3D image.

FIG. 11A shows a first semilunar filter applied to the left-eye pixel of the first monocular 3D images with a certain parallax ΔD. FIG. 11B shows a third semilunar filter for the second monocular 3D images to be obtained when changing the focal length f of the image-taking lens by 2-fold, which corresponds to the above first semilunar filter.

As shown in FIG. 11B, the third semilunar filter is designed as a filter in which the parallax ΔD and the diameter R each are changed by 4-fold and that has a similar shape to the first semilunar filter. This is because, by substituting 2f into f in [Formula 1] and [Formula 2], the parallax ΔD and the diameter R each are changed by 4 (=2×2)-fold.

Thereby, in the intended second monocular 3D images, the parallax ΔD is increased by 4-fold, and simultaneously, the blur amount (the diameter R) depending on the parallax is also increased by 4-fold.

[Semilunar Filters when Changing F-Value of Diaphragm to Half (½)]

Figure 12A:
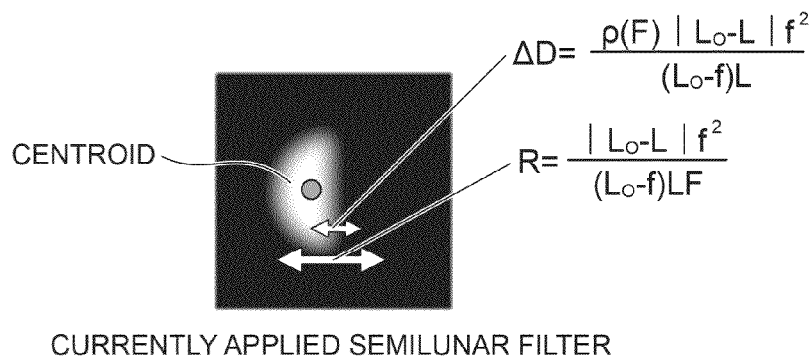
FIG. 12A is a diagram to be used for explaining an alternative example of a semilunar filter to be applied to an intended monocular 3D image.
Figure 12B:
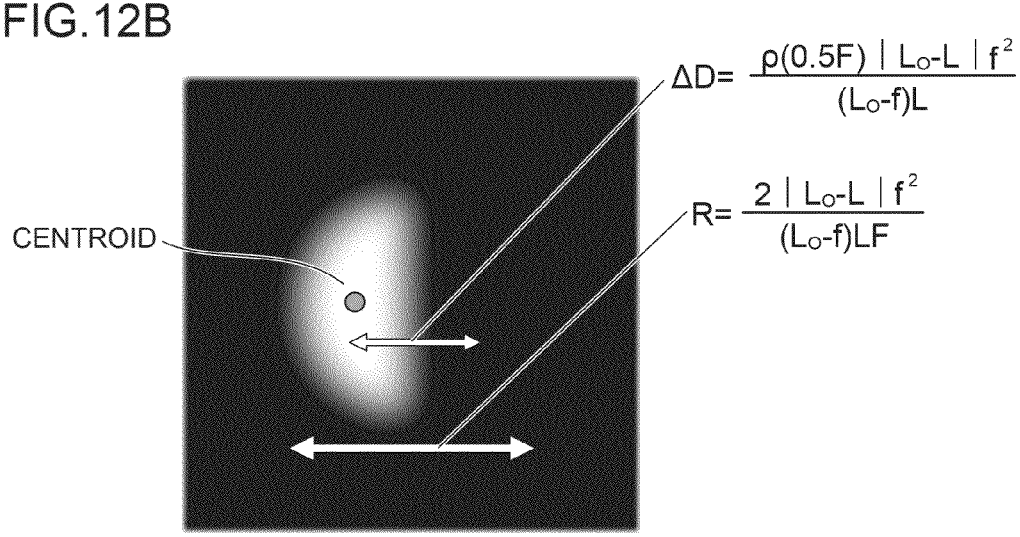
FIG. 12B is a diagram to be used for explaining an alternative example of a semilunar filter to be applied to an intended monocular 3D image.

FIG. 12A shows a first semilunar filter applied to the left-eye pixel of the first monocular 3D images with a certain parallax ΔD, and FIG. 12B shows a third semilunar filter for the second monocular 3D images to be obtained when changing the F-value of the diaphragm 14 to half, which corresponds to the above first semilunar filter.

As shown in FIG. 12B, in the third semilunar filter, the parallax ΔD, which is expressed by the function ρ(F) in terms of the F-value, is changed by ρ(0.5F)/ρ(F)-fold, and the diameter R is changed by 2-fold.

Thereby, in the intended second monocular 3D images, the parallax ΔD is increased by ρ(0.5F)/ρ(F)-fold, and simultaneously, the blur amount (the diameter R) depending on the parallax is increased by 2-fold.

[Semilunar Filters when Changing Image Element Size by 1.5-Fold]

Figure 13A:
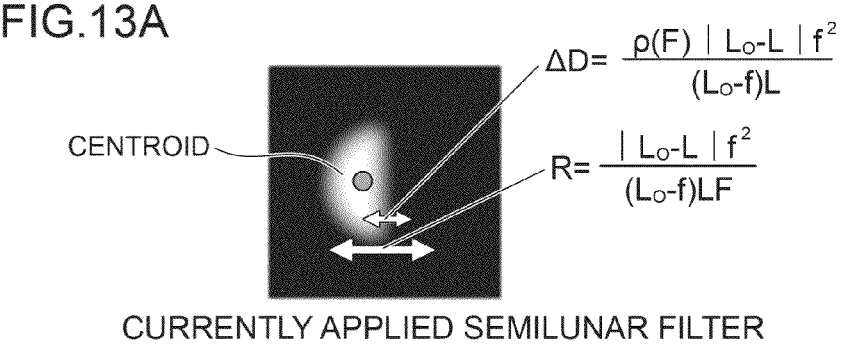
FIG. 13A is a diagram to be used for explaining a further alternative example of a semilunar filter to be applied to an intended monocular 3D image.
Figure 13B:
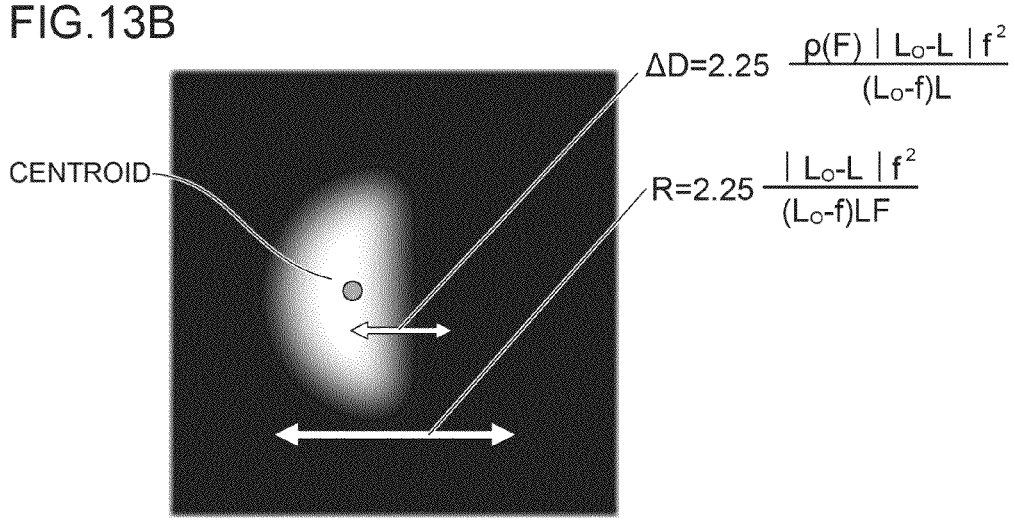
FIG. 13B is a diagram to be used for explaining a further alternative example of a semilunar filter to be applied to an intended monocular 3D image.

FIG. 13A shows a first semilunar filter applied to the left-eye pixel of the first monocular 3D images with a certain parallax ΔD, and FIG. 13B shows a third semilunar filter for the second monocular 3D images to be obtained when changing the imaging element size by 1.5-fold, which corresponds to the above first semilunar filter.

As shown in FIG. 13B, the third semilunar filter is designed as a filter in which the parallax ΔD and the diameter R each are changed by 2.25-fold and that has a similar shape to the first semilunar filter. A 1.5-fold change in the imaging element size is substantially comparable to a 1.5-fold change in the focal length f. Therefore, by substituting 1.5f into f in [Formula 1] and [Formula 2], the parallax ΔD and the diameter R each are changed by 2.25 (=1.5×1.5)-fold.

Thereby, in the intended second monocular 3D images, the parallax ΔD is increased by 2.25-fold, and simultaneously, the blur amount (the diameter R) depending on the parallax is also increased by 2.25-fold.

[Specification Device of Intended Monocular 3D Images (Second Monocular 3D Images)]

Next, a specification device (a user interface) for specifying intended second monocular 3D images when the intended second monocular 3D images are generated from actually picked-up first monocular 3D images, is explained.

When intended second monocular 3D images are generated from actually picked-up first monocular 3D images at the time of the pickup or playback of the monocular 3D images, the MENU/OK button 7 or the like of the image capturing device 10 is operated, and the function to generate the second monocular 3D images from the first monocular 3D images according to the present invention is selected on a menu setting screen of the 3D liquid crystal monitor 30.

Figure 14A:
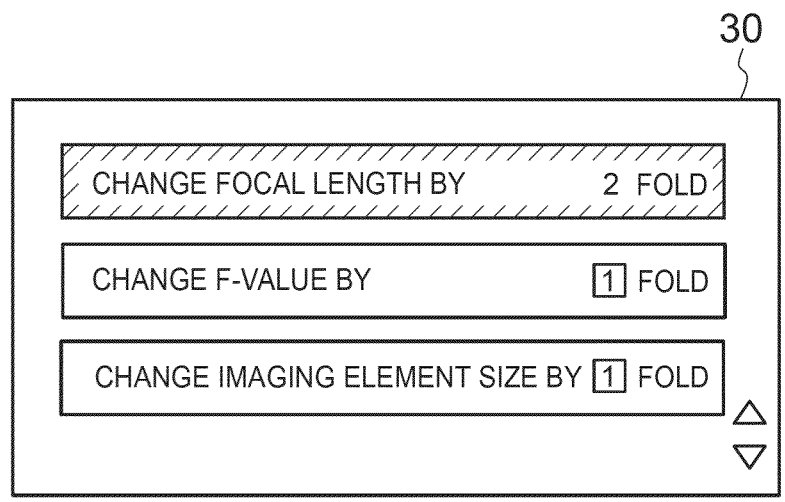
FIG. 14A is a diagram to be used for explaining a user interface for specifying an intended monocular 3D image.

By the selection of this function, the screen of the 3D liquid crystal monitor 30 is transited to a screen for selecting the focal length, the F-value and the imaging element size, as shown in the (a) portion of FIG. 14A. Here, by operating the up and down keys of the cross button 6, it is possible to select any one of the focal length, the F-value and the imaging element size.

Figure 14B:
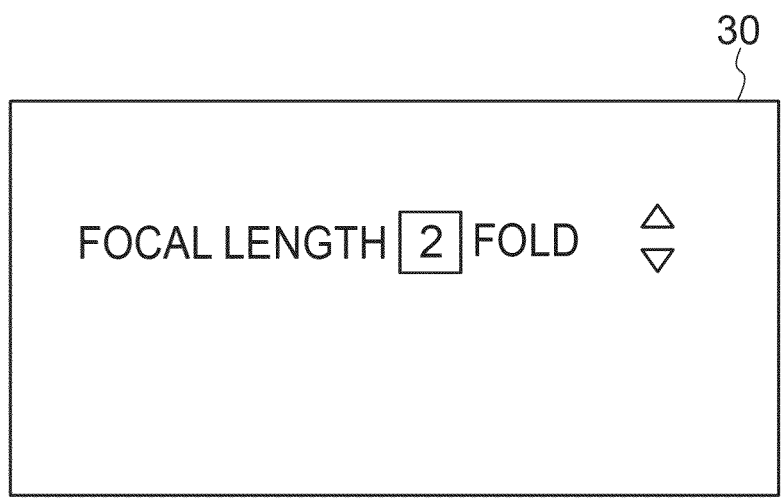
FIG. 14B is a diagram used for explaining a user interface for designating an intended monocular 3D image.

After the selection of any one of the focal length, the F-value and the imaging element size, the screen of the 3D liquid crystal monitor 30, by operating the MENU/OK button 7, is transited to a screen for setting the multiplying factor of the selected item as shown in the (b) portion of FIG. 14B. Here, the (b) portion of FIG. 14B shows a screen for setting what fold focal length f is made from the focal length fat the time of the pickup of the first monocular 3D images.

When this screen is displayed, the up and down keys of the cross button 6 are operated, and the numeral is changed up and down. Thereby, an arbitrary multiplying factor can be selected. When the MENU/OK button 7 is operated after the selection of the multiplying factor, the selected multiplying factor is fixed, and the transition to the screen shown in the (a) portion of FIG. 14A is performed.

Thus, any one or multiple multiplying factors of the focal length, the F-value and the imaging element size are set, and thereby, it is possible to specify intended second monocular 3D images to be generated from the first monocular 3D images.

Here, the user interface for specifying intended second monocular 3D images is not limited to this embodiment, and a variety of user interfaces are possible. For example, in the case where the 3D liquid crystal monitor 30 has a touch panel to receive an instruction input by a touch operation, intended monocular 3D images may be specified by the operation with the touch panel.

<Image Processing Device>

Next, an image processing device (the digital signal processing unit 24, the CPU 40 and the ROM 47 are mainly comparable to this) to generate intended second monocular 3D images from original first monocular 3D images picked-up by the image capturing device 10, or from original first monocular 3D images read from the memory card 54, is explained.

A first embodiment to a third embodiment shown below are the same as each other in the second monocular 3D images to be generated from the first monocular 3D images, but are different in the type of previously stored filters and the operation content.

First Embodiment

Figure 15:
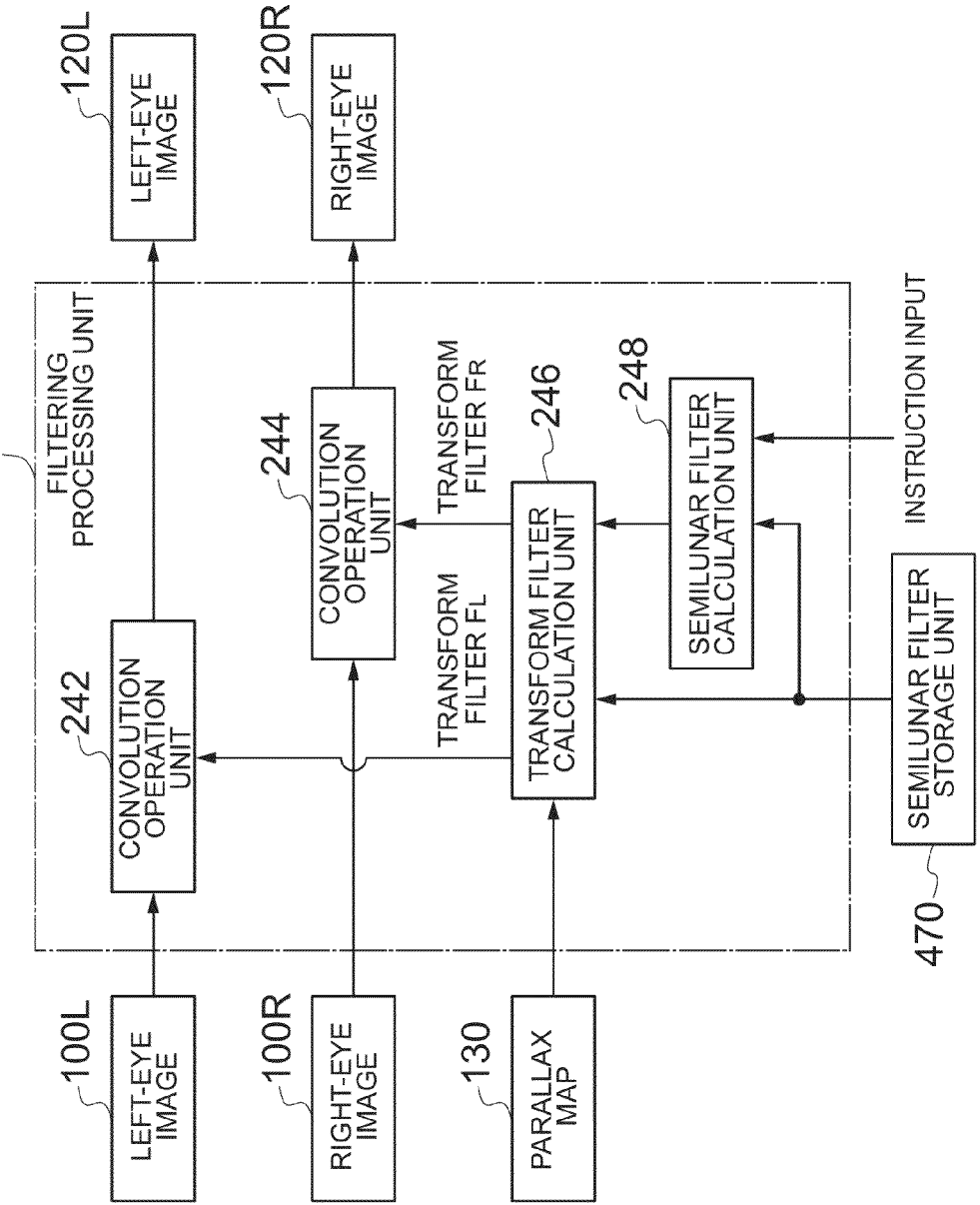
FIG. 15 is a principal part block diagram showing a first embodiment of an image processing device according to the present invention.

FIG. 15 is a principal part block diagram showing a first embodiment of an image processing device according to the present invention.

In FIG. 15, the digital signal processing unit 24 of the image capturing device 10 has a filtering processing unit 240-1. The filtering processing unit 240-1 includes convolution operation units 242, 244, a transform filter calculation unit 246 and a semilunar filter calculation unit 248.

A left-eye image 100L and a right-eye image 100R of original first monocular 3D images are given to the convolution operation units 242, 244, respectively. A first transform filter $F_L$ and a second transform filter $F_R$ calculated by the transform filter calculation unit 246 are given to the other inputs of the convolution operation units 242 and 244, respectively. By performing the convolution operation of the two inputs, the convolution operation units 242, 244 respectively generate two corresponding pixels of a left-eye image 120L and right-eye image 120R of intended second monocular 3D images, in which the parallax amount and blurring amount for two corresponding pixels of the left-eye image 100L and right-eye image 100R have been altered in conjunction.

Here, the transform filter calculation unit 246 calculates the first transform filter $F_L$ and the second transform filter $F_R$ based on the semilunar filter applied to the first monocular 3D image and the semilunar filter designed to be applied to the second monocular 3D image corresponding to the parallax amount of corresponding two pixels of the left-eye image 100L and the right-eye image 100R as shown below and outputs them to the convolution operation units 242 and 244.

The CPU 40 calculates the deviation (parallax) of the pixels between corresponding points of the left-eye image 100L and right-eye image 100R of the original first monocular 3D images, in the whole screen, and creates a parallax map 130 that indicates the parallax depending on the position in the screen.

As the corresponding points (feature points) of the left-eye image 100L and right-eye image 100R, it is preferable to adopt all the points that can uniquely specify the features between the images of the left-eye image 100L and the right-eye image 100R.

To detect the feature points in which the features coincide between the images of the left-eye image 100L and the right-eye image 100R, for example, a block matching method can be applied. In the block matching method, the degree of coincidence between a block in a predetermined block size that is cut out with reference to an arbitrary pixel from one image (left-eye image 100L) of the left-eye image 100L and the right-eye image 100R and a block of the other image (right-eye image 100R) is evaluated. And then, a reference pixel of the block in the right-eye image 100R that maximizes the degree of coincidence between the blocks is set as the pixel of the right-eye image 100R corresponding to the arbitrary pixel of the left-eye image 100L.

As the function for evaluating the degree of coincidence between the blocks in the block matching method, there is a function that uses the sum of squares (SSD) of the luminance difference between pixels in the blocks (the SSD block matching method), for example.

Then, the position of the pixel of the right-eye image 100R and the parallax for the corresponding pixel of the right-eye image 100R, which indicates the deviation amount and deviation direction between the pixels (the deviation direction can be expressed as positive or negative), are determined, and thereby, the parallax map 130 can be created. Here, the creation of the parallax map 130 may be performed in the digital signal processing unit 24.

A semilunar filter storage unit 470 is a part that stores the first semilunar filter and the second semilunar filter corresponding to the parallax (first and second semilunar filter groups shown in FIG. 9 and the like) applied to the original left-eye image 100L and right-eye image 100R. The semilunar filter storage unit 470 corresponds to a part of the storage unit of the ROM 47.

The semilunar filter calculation unit 248 calculates third and fourth semilunar filter groups to be applied to the left-eye image 120L and the right-eye image 120R of the intended second monocular 3D images. The semilunar filter calculation unit 248 inputs the first and second semilunar filter groups from the semilunar filter storage unit 470 and inputs information (multiplying factor of the focal length f, the F-value, or the imaging element size of the second monocular 3D images relative to the focal length f, the F-value, or the imaging element size at the time of the image capturing of the first monocular 3D images) corresponding to the transform characteristics for the intended second monocular 3D images instructed by the user interface including the operation unit 38. The semilunar filter calculation unit 248 calculates the third and fourth semilunar filter groups based on the input first and second semilunar filter groups and the information relevant to the transform characteristics for the second monocular 3D images (see FIG. 11A to FIG. 13B).

The transform filter calculation unit 246 calculates the first and second transform filters for each parallax ΔD by the above-described [Formula 5], based on the first and second semilunar filter groups input from the semilunar filter storage unit 470 and the third and fourth filter groups calculated by the semilunar filter calculation unit 248. Here, it is preferable that the calculated first and second transform filters for each parallax ΔD (the first and second transform filter groups) be temporarily stored in an internal memory not shown in the figure.

The transform filter calculation unit 246 acquires, from the parallax map 130, the parallax between an arbitrary pixel of the left-eye image 100L and a pixel of the right-eye image 100R corresponding to the pixel. The transform filter calculation unit 246 acquires the first and second transform filters corresponding to the acquired parallax from the previously calculated and stored first and second transform filter groups. The transform filter calculation unit 246 outputs the first and second transform filters to the convolution operation units 242 and 244, respectively.

The convolution operation unit 242, with reference to the arbitrary pixel of the left-eye image 100L, performs the convolution operation between multiple pixels having the same kernel size as the first transform filter and the first transform filter, and thereby, calculates the pixel on the left-eye image 120L corresponding to the arbitrary pixel. Similarly, the convolution operation unit 244, with reference to the corresponding pixel of the right-eye image 100R corresponding to the arbitrary pixel of the left-eye image 100L, performs the convolution operation between multiple pixels having the same kernel size as the second transform filter and the second transform filter, and thereby, calculates the pixel on the left-eye image 120L for the corresponding pixel of the right-eye image 100R.

The above filtering process is performed for all corresponding pixels of the left-eye image 100L and right-eye image 100R of the original first monocular 3D images, and thereby, it is possible to generate the left-eye image 120L and right-eye image 120R of the second monocular 3D images.

Second Embodiment

FIG. 16 is a principal part block diagram showing a second embodiment of the image processing device according to the present invention.

Here, in FIG. 16, the same reference numerals are assigned to common parts with FIG. 15, and the detailed explanation thereof is omitted.

In FIG. 16, the digital signal processing unit 24 of the image capturing device 10 has a filtering processing unit 240-2. The filtering processing unit 240-2 includes convolution operation units 242, 244 and a transform filter reading unit 250.

The transform filter storage unit 472 is a part that stores the first and second transform filter groups that are the same as the first and second transform filter groups calculated by the transform filter calculation unit 246 of the first embodiment. The transform filter storage unit 472 corresponds to a part of the storage unit of the ROM 47. It is preferable that the transform filter storage unit 472 previously store multiple kinds (multiple kinds for each information corresponding to the transform characteristic for the intended second monocular 3D images that can be specified by the user interface) of first and second transform filter groups. Further, the first and second transform filter groups can be calculated by an external apparatus or the like comparable to the transform filter calculation unit 246 according to the first embodiment, and the calculation result can be stored in the transform filter storage unit 472.

The transform filter reading unit 250 reads appropriate first and second transform filters $F_L$ and $F_R$ from the transform filter storage unit 472 and outputs them to the convolution operation units 242 and 244, respectively. The transform filter reading unit 250 inputs the information corresponding to the transform characteristics for the intended second monocular 3D images instructed by the user interface including the operation unit 38 and inputs the parallax from the parallax map 130.

The transform filter reading unit 250 determines the first and second filter groups to be used, from the multiple kinds of first and second transform filter groups stored in the transform filter storage unit 472, based on the information corresponding to the transform characteristic for the intended second monocular 3D images. On the other hand, the transform filter reading unit 250 acquires, from the parallax map 130, the parallax between an arbitrary pixel of the left-eye image 100L and a pixel of the right-eye image 100R corresponding to the pixel. The transform filter reading unit 250 reads the first and second transform filters corresponding to the acquired parallax from the determined first and second filter groups. The transform filter reading unit 250 outputs the read first and second transform filters to the convolution operation units 242 and 244, respectively.

According to the second embodiment, the multiple kinds of first and second transform filter groups are previously stored in the transform filter storage unit 472. Therefore, the operation process for calculating the first and second transform filter groups can be omitted, but the transform filter storage unit 472 needs to have a large storage capacity.

Third Embodiment

FIG. 17 is a principal part block diagram showing a third embodiment of the image processing device according to the present invention.

Here, in FIG. 17, the same reference numerals are assigned to common parts with FIG. 15, and the detailed explanation thereof is omitted.

In FIG. 17, the digital signal processing unit 24 of the image capturing device 10 has a filtering processing unit 240-3. The filtering processing unit 240-3 includes first operation units 260, 262 and second operation units 264, 266 to perform convolution operations, an inverse filter reading unit 268, and a semilunar filter calculation unit 248.

As shown in [Formula 5], the transform filter has a filter coefficient of the amplitude component of $F^{-1}(T_{Lf}(\omega_x, \omega_y))^{-1} \cdot T_{LWf}(\omega_x, \omega_y))$. The filtering process by the transform filter can be divided into a convolution operation by $F^{-1}(T_{Lf}(\omega_x, \omega_y)^{-1})$ and a convolution operation by $F^{-1}(T_{LWf}(\omega_x, \omega_y))$.

The former $F^{-1}(T_{Lf}(\omega_x, \omega_y)^{-1})$ is the inverse filter of the first semilunar filter. The latter $F^{-1}(T_{LWf}(\omega_x, \omega_y))$ is the third semilunar filter.

In the third embodiment, for each corresponding pixel of the left-eye image 100L and right-eye image 100R, a first operation to apply first and second inverse filters depending on the parallax is performed, and a second operation to apply the third and fourth semilunar filters to the operation results is performed. The first operation device the generation of blur-cancelled images in which the parallax and blur of the original first monocular 3D images have been cancelled. The second operation device the generation of the left-eye image 120L and right-eye image 120R by applying the third and fourth semilunar filters for each parallax, which correspond to the transform characteristic by which the light entering the image-taking lens 12 is transformed into the intended second monocular 3D images, to the blur-cancelled images.

The inverse filter storage unit 474 is a part that stores the first and second inverse filter groups calculated from the first and second semilunar filter groups stored in the semilunar filter storage unit 470. The inverse filter storage unit 474 corresponds to a part of the storage unit of the ROM 47. The first and second inverse filter groups can be calculated by an external apparatus or the like from the first and second semilunar filter groups, and the calculation result can be stored in the inverse filter storage unit 474.

The inverse filter reading unit 268 acquires, from the parallax map 130, the parallax between an arbitrary pixel of the left-eye image 100L and a pixel of the right-eye image 100R corresponding to the pixel. The inverse filter reading unit 268 reads the first and second inverse filters that are inverse filters of the first and second semilunar filters corresponding to the acquired parallax and outputs them to the first operation units 260 and 262, respectively.

The first operation unit 260, with reference to the arbitrary pixel of the left-eye image 100L, performs the convolution operation between multiple pixels having the same kernel size as the first inverse filter and the first inverse filter. Similarly, the first operation unit 262, with reference to the corresponding pixel of the right-eye image 100R corresponding to the arbitrary pixel of the left-eye image 100L, performs the convolution operation between multiple pixels having the same kernel size as the second inverse filter and the second inverse filter. The first operation units 260 and 262 output the operation results (blur-cancelled images in which the blur and the like are cancelled) to the second operation units 264 and 266, respectively.

The third and fourth semilunar filters corresponding to the current parallax obtained from the parallax map 130 among the third and fourth semilunar filter groups calculated by the semilunar filter calculation unit 248 are given to the other inputs of the second operation units 264 and 266. The second operation units 264 and 266 perform convolution operation between the blur-cancelled images calculated by the first operation units 260 and 262 and the third and fourth semilunar filters to thereby calculate each pixel on the left-eye image 120L and the right-eye image 120R, respectively.

According to the third embodiment, unlike the first embodiment, the calculation of the first and second transform filter groups is unnecessary, allowing for the speed-up of the operation process. Further, the third embodiment, which requires storing the first and second inverse filter groups, can reduce the storage capacity of the inverse filter storage unit 474, compared to the second embodiment, which requires storing the multiple kinds of first and second transform filter groups.

Here, the blur-cancelled images to be calculated by the first operation units 260, 262 are identical. Therefore, it is preferable to generate the blur-cancelled image using only any one of the left-eye image 100L and the right-eye image 100R, and to output the generated blur-cancelled image to the second operation units 264, 266, respectively.

[Alternative Embodiments of Third and Fourth Semilunar Filters]

In the embodiments shown in FIG. 11A to FIG. 13B, the first and second semilunar filters applied to the first monocular 3D images are scaled so as to have similar shapes, and thereby, the third and fourth semilunar filters corresponding to intended second monocular 3D images are designed. However, the third and fourth semilunar filters can be designed independently of the first and second semilunar filters.

Figure 18A:
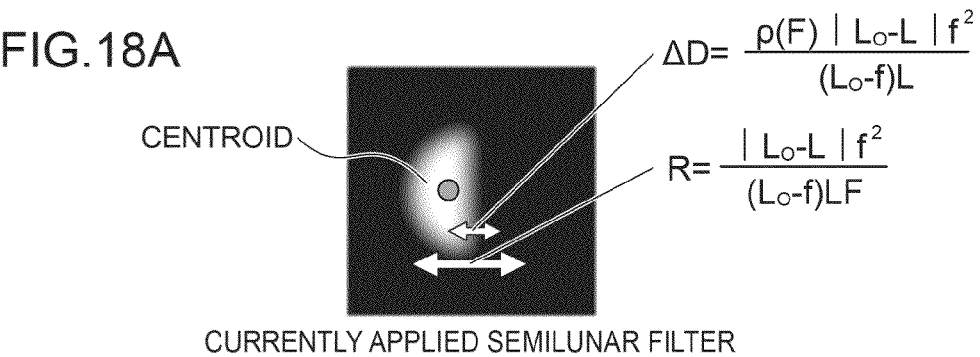
FIG. 18A is a diagram to be used for explaining a further alternative example of a semilunar filter to be applied to an intended monocular 3D image.
Figure 18B:
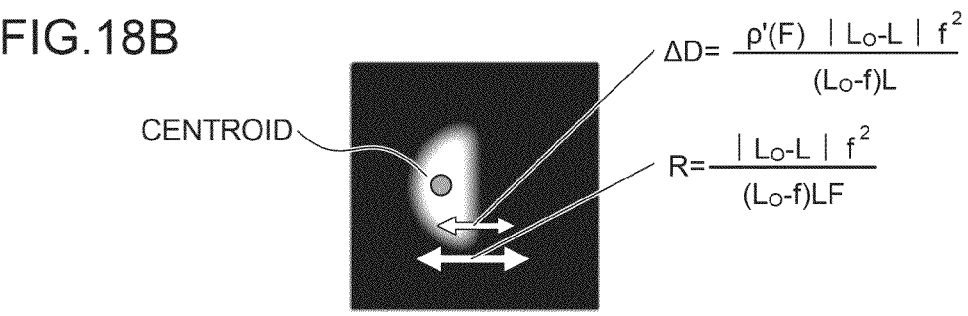
FIG. 18B is a diagram to be used for explaining a further alternative example of a semilunar filter to be applied to an intended monocular 3D image.

FIG. 18A shows a first semilunar filter applied to a left-eye pixel of first monocular 3D images with a certain parallax ΔD. FIG. 18B shows a third semilunar filter corresponding to the first semilunar filter, for second monocular 3D images to be obtained when the sensitivity characteristic of the monocular 3D imaging element is changed.

As shown in FIG. 18B, the blur amount (diameter R) of the third semilunar filter is not changed compared to the first semilunar filter. The third semilunar filter corresponds to an imaging element with different sensitivity characteristics, and the function ρ(F) of F changes to a function ρ'(F). As a result, even though the blur amount (diameter R) is the same as in the first semilunar filter, a different parallax ΔD can be given to the third semilunar filter.

Further, as the imaging element having a different sensitivity characteristic, an ideal imaging element can be assumed. For example, although the sensitivity characteristics of the left-eye image and right-eye image shown in FIG. 5A produce a crosstalk depending on the incidence angle, it is possible to design third and fourth semilunar filters corresponding to an imaging element that has a sensitivity characteristic with no crosstalk.

Figure 19:
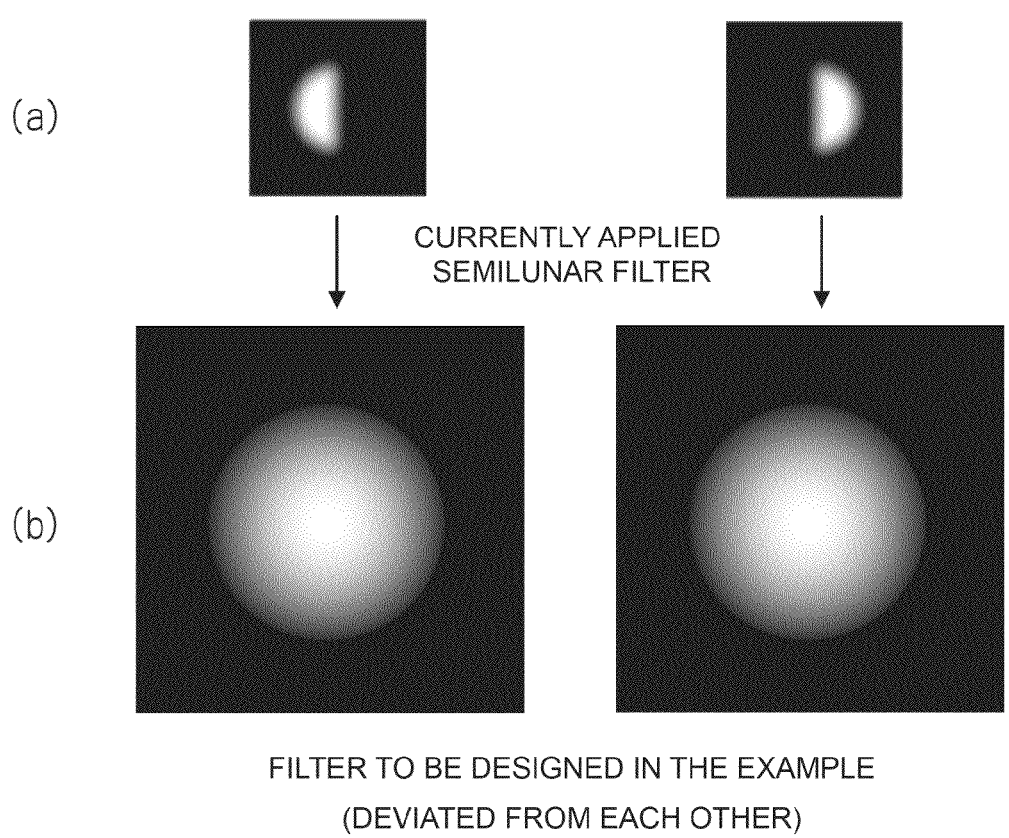
FIG. 19 is a diagram to be used for explaining a further alternative example of a filter to be applied to an intended monocular 3D image.

The (a) portion of FIG. 19 shows first and second semilunar filters applied to a left-eye pixel of a first monocular 3D image with a certain parallax ΔD. The (b) portion of FIG. 19 shows third and fourth filters corresponding to the first and second semilunar filters.

In the embodiments shown in FIG. 11A, FIG. 11B, FIG. 12A, FIG. 12B, FIG. 13A, FIG. 13B, FIG. 18A, and FIG. 18B, the target filters are semilunar filters in order to avoid the appearance of a double image. However, when correspondence between pixels is difficult (when stereovision is difficult) in human eyes, such as when the blur is large, it is preferable to prioritize a natural view for human eyes over the avoidance of the appearance of a double image.

The third and fourth filters shown in the (b) portion of FIG. 19 each have circular shapes, and have point-symmetric filter coefficients in which the filter coefficient is maximized at the center.

As shown in the (b) portion of FIG. 19, when circular third and fourth filters are adopted as the targeted filters, it is possible to circularize the blur, and to generate images allowing for a natural stereovision, for example, even when the aperture of the blur is large. Here, the calculation method and the like are the same as the case where the targeted filters are semilunar filters.

[Technique for Generating Multiple Second Monocular 3D Images from Single First Monocular 3D Image]

Next, an embodiment when multiple second monocular 3D images are generated from a single original first monocular 3D image is explained.

FIG. 20A and FIG. 20B are conceptual diagrams showing two kinds of processes (an ordinary process and a calculation-time shortening process) when multiple second monocular 3D process are generated from an original first monocular 3D process, respectively.

The ordinary process shown in FIG. 20A is comparable to the first embodiment shown in FIG. 15. In the ordinary process, the calculation process (the operation shown by [Formula 5]) of the transform filter to be convoluted with the first monocular 3D image in real space is performed whenever a second monocular 3D image different in the degree of the parallax enhancement or the like is generated. In this ordinary process, the transform filters are calculated according to the multiple intended second monocular 3D images. Therefore, the calculation process of the transform filters needs to be performed multiple times in the ordinary process, and the calculation amount increases.

The calculation-time shortening process shown in FIG. 20B is comparable to the third embodiment shown in FIG. 17. In the calculation-time shortening process, first, a blur-cancelled image in which the parallax and the blur have been cancelled is generated from an original first monocular 3D image. This blur-cancelled image can be generated by applying the first inverse filter or second inverse filter, which is the inverse filter of the first semilunar filter or second semilunar filter, to the left-eye image or right-eye image of the first monocular 3D images.

The first inverse filter is a filter whose filter coefficient is the amplitude component of the former part $F^{-1}(T_{Lf}(\omega_x, \omega_y)^{-1})$ in [Formula 5]. The calculation operation of the inverse filter is needed only one time. Note that the calculation operation of the inverse filter can be omitted by previously operating and storing the inverse filter, because it is specific to the first monocular 3D image.

Subsequently, the third and fourth semilunar filters respectively corresponding to the multiple second monocular 3D images are applied to the single blur-cancelled image. The third semilunar filter is a filter whose filter coefficient is the amplitude component of the latter part $F^{-1}(T_{LWf}(\omega_x, \omega_y))$ in [Formula 5], and that is obtained by enlarging the first semilunar filter to a similar shape.

According to the calculation-time shortening process shown in FIG. 20B, unlike the ordinary process shown in FIG. 20A, the calculation of the transform filter is unnecessary, allowing for the shortening of the calculation time. This is effective, particularly, in the case of generating many second monocular 3D images in which the parallax changes continuously, and displaying them as a 3D moving image in which the parallax changes continuously.

<Frequency Filtering>

Although the space filtering in the real space is performed in the first embodiment to the third embodiment to generate the left-eye image 120L and the right-eye image 120R of the intended second monocular 3D images from the left-eye image 100L and the right-eye image 100R of the original first monocular 3D images, the present invention is not limited to this. For example, the frequency filtering in the frequency space may be performed to generate the left-eye image 120L and the right-eye image 120R of the intended second monocular 3D images from the left-eye image 100L and the right-eye image 100R of the original first monocular 3D images.

Figure 21:
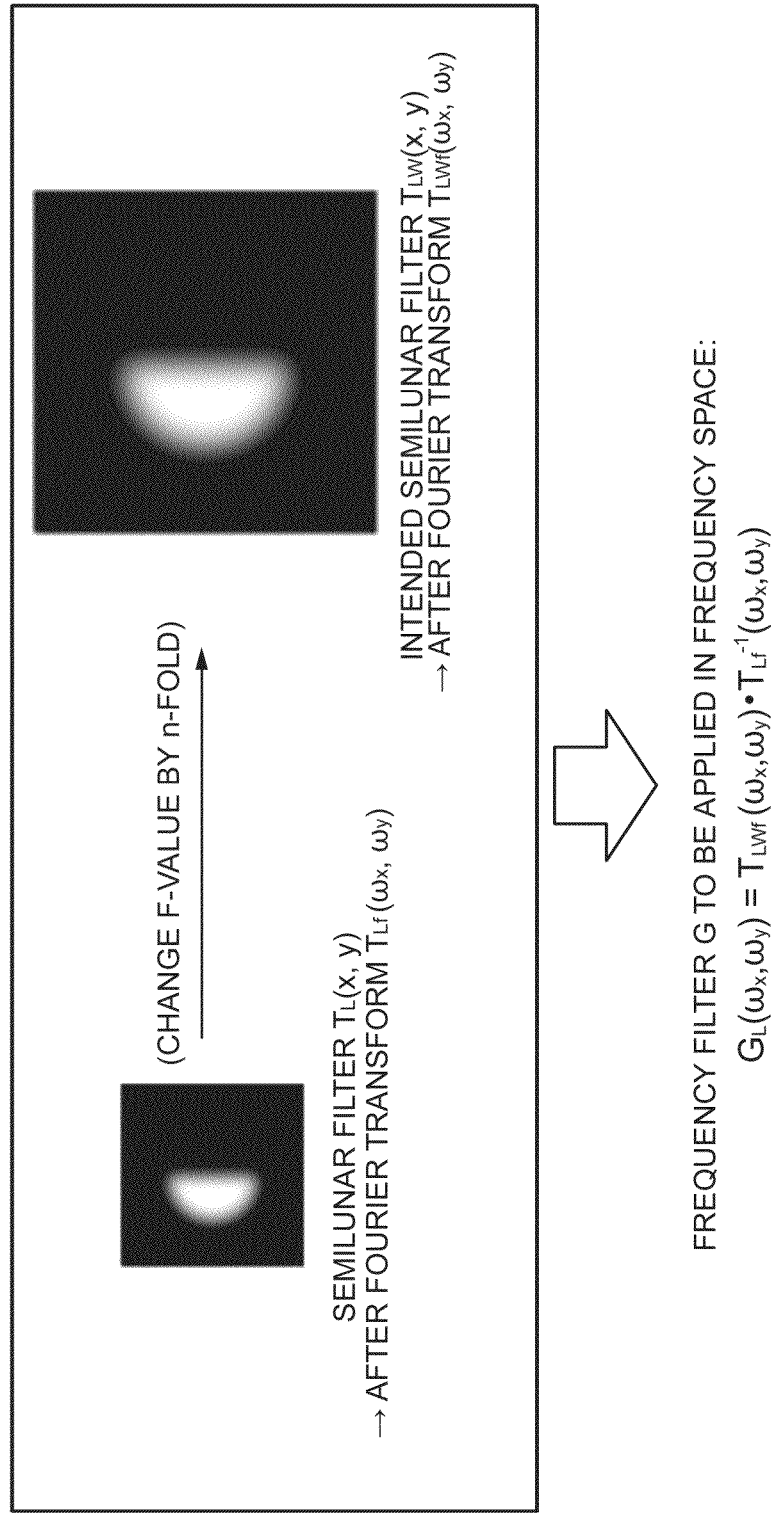
FIG. 21 is a diagram used for explaining a frequency filter to be multiplied in a frequency space when an intended monocular 3D image is generated.

As shown in FIG. 21, the first semilunar filter applied to the left-eye image of the first monocular 3D image is $T_L(x, y)$, and the first semilunar filter $T_L(x, y)$ to which Fourier transform has been performed is $T_{Lf}(\omega_x, \omega_y)$. Meanwhile, the third semilunar filter to be applied to the left-eye image of the second monocular 3D image is $T_{LW}(x, y)$, and the third semilunar filter to $T_{LW}(x, y)$ to which Fourier transform has been performed is $T_{LWf}(\omega_x, \omega_y)$. On this occasion, for each pixel of the left-eye image with the parallax ΔD, a filter (hereinafter, called "frequency filter") $G(\omega_x, \omega_y)$ that is to be applied in the frequency space to frequency component data $U_L(\omega_x, \omega_y)$ of a predetermined region with reference to a pixel of a filtering process target (target pixel) and that is for the transform into frequency component data of a region corresponding to the predetermined region of the left-eye image of the second monocular 3D images is calculated by the following formula.

$$G(\omega_x, \omega_y) = T_{Lwf}(\omega_x, \omega_y) \cdot T_{Lf}(\omega_x, \omega_y)^{-1} \quad \text{[Formula 6]}$$

Here, $T_{Lf}(\omega_x, \omega_y)^{-1}$: inverse filter of $T_{Lf}(\omega_x, \omega_y)$ This frequency filter (first frequency filter) is calculated according to the first semilunar filter stored for each parallax. The second frequency filter used for the transform in the frequency space of the right-eye image of the second monocular 3D images is also calculated in a similar way.

Note that it is preferable to previously calculate the first and second frequency filter groups corresponding to the first and second semilunar filter groups according to the parallax when the intended second monocular 3D images are determined.

The calculated first and second frequency filter groups are used to transform the frequency component data of the first monocular 3D images into the frequency component data of the second monocular 3D images in the frequency space. Then, the frequency component data of the second monocular 3D images is transformed into data on the real space. Thereby, the second monocular 3D images in which both of the parallax amount and the blur amount are transformed in conjunction are generated for each parallax between pixels of the first monocular 3D images.

<Image Processing Device>

Next, an image processing device (the digital signal processing unit 24, the CPU 40, and the ROM 47 are mainly comparable to this) that generates the intended second monocular 3D images from the original first monocular 3D images taken by the image capturing device 10 or from the original first monocular 3D images read from the memory card 54 is explained.

The following fourth to sixth embodiments are embodiments corresponding to the first to third embodiments, respectively. While the space filtering in the real space is mainly performed in the first to third embodiments, the fourth to sixth embodiments are different in that the frequency filtering in the frequency space is performed.

Fourth Embodiment

Figure 22:
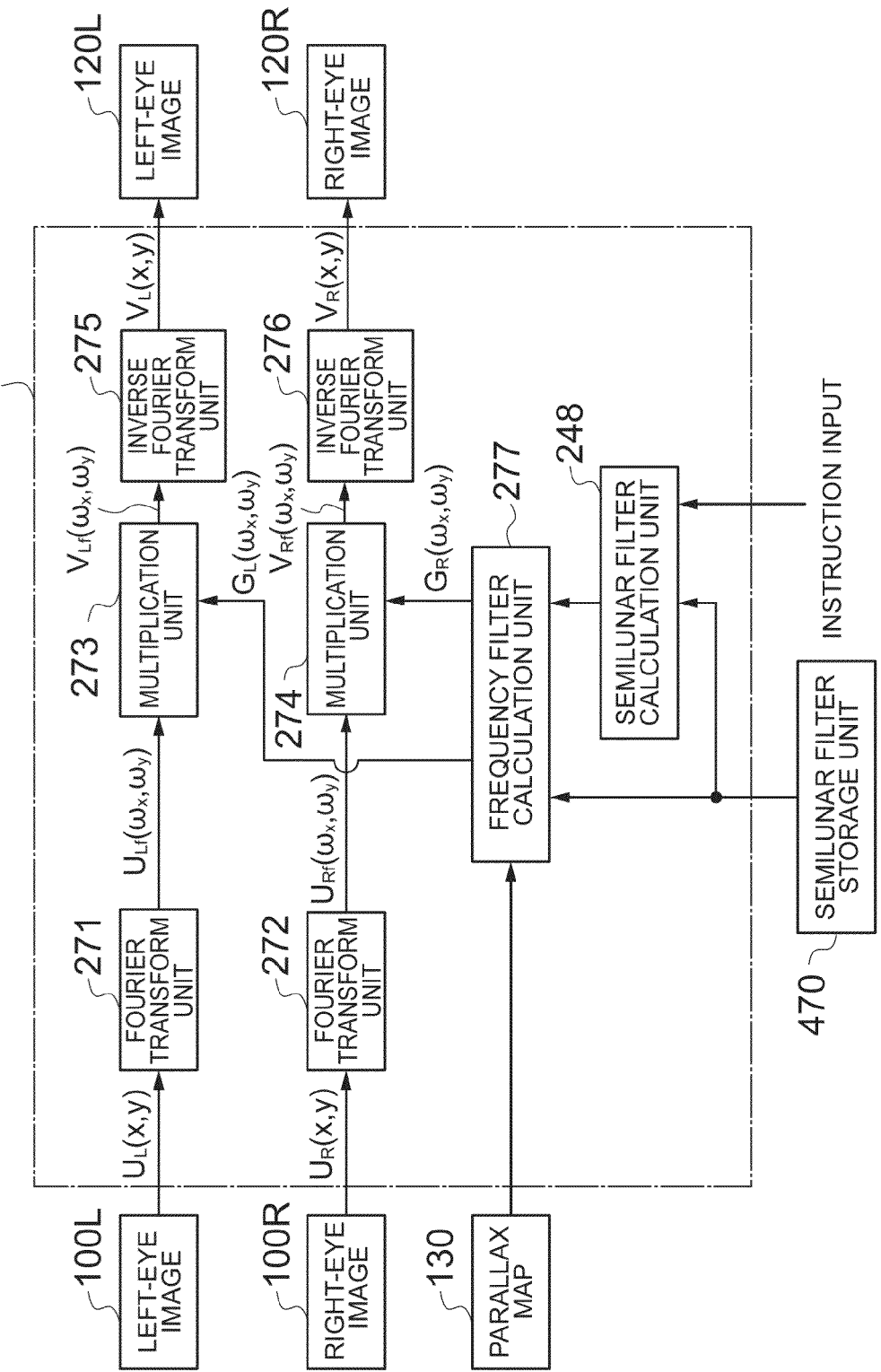
FIG. 22 is a block diagram of the principal part of a fourth embodiment of the image processing device according to the present invention.

FIG. 22 is a block diagram of the principal part of the fourth embodiment of the image processing device according to the present invention. Note that the parts common to the first embodiment shown in FIG. 15 are designated with the same reference numerals, and the detailed description is omitted.

In FIG. 22, the digital signal processing unit 24 of the image capturing device 10 includes a filtering processing unit 240-4. The filtering processing unit 240-4 includes Fourier transform units 271 and 272, multiplication units 273 and 274, inverse Fourier transform units 275 and 276, a frequency filter calculation unit 277, and the semilunar filter calculation unit 248.

The left-eye image 100L and the right-eye image 100R of the original first monocular 3D images are given to the Fourier transform units 271 and 272, respectively. The Fourier transform units 271 and 272 extract predetermined regions (for example, regions of 16×16 pixels) with reference to corresponding two pixels (two target pixels of filtering process) of the left-eye image 100L and the right-eye image 100R, respectively. The Fourier transform units 271 and 272 perform Fourier transform of these predetermined regions ($U_L(x, y)$, $U_R(x, y)$) to transform them into first and second frequency component data (Fourier coefficients of 16×16), respectively. The first and second frequency data ($U_{Lf}(\omega_x, \omega_y)$, $U_{Rf}(\omega_x, \omega_y)$) are given to the multiplication units 273 and 274, respectively.

A first frequency filter $G_L(\omega_x, \omega_y)$ and a second frequency filter $G_R(\omega_x, \omega_y)$ calculated by the frequency filter calculation unit 277 are given to the other inputs of the multiplication units 273 and 274. The multiplication units 273 and 274 multiply the two inputs to calculate third and fourth frequency component data ($V_{Lf}(\omega_x, \omega_y)$, $V_{Rf}(\omega_x, \omega_y)$), respectively.

That is, the multiplication units 273 and 274 calculate the third and fourth frequency component data ($V_{Lf}(\omega_x, \omega_y)$, $V_{Rf}(\omega_x, \omega_y)$) by the following formula.

$$V_{Lf}(\omega_x,\omega_y) = U_{Lf}(\omega_x,\omega_y) \cdot G_L(\omega_x,\omega_y)$$

$$V_{Rf}(\omega_x,\omega_y) = U_{Rf}(\omega_x,\omega_y) \cdot G_R(\omega_x,\omega_y) \quad \text{[Formula 7]}$$

The calculated third and fourth frequency component data are frequency component data in which the parallax amount and the blur amount of corresponding two pixels of the left-eye image 100L and the right-eye image 100R have been altered in conjunction, and Fourier transform has been performed for the predetermined regions including corresponding two pixels of the left-eye image 120L and the right-eye image 120R of the intended second monocular 3D images.

Here, the frequency filter calculation unit 277 acquires, from the semilunar filter storage unit 270, the semilunar filter applied to the first monocular 3D images corresponding to the parallax amount of the corresponding two pixels of the left-eye image 100L and the right-eye image 100R. The frequency filter calculation unit 277 acquires, from the semilunar filter calculation unit 248, the semilunar filter designed to be applied to the second monocular 3D images. The frequency filter calculation unit 277 performs Fourier transform of the acquired semilunar filter as described in FIG. 21. The frequency filter calculation unit 277 uses the results of the Fourier transform to calculate frequency filters $G_L$ and $G_R$ to be applied in the frequency space by [Formula 6] described above.

Note that the frequency filters $G_L$ and $G_R$ are constituted by the same number of Fourier coefficients (16×16) as the first and second frequency component data. Further, it is preferable that the frequency filter calculation unit 277 calculate the first and second frequency filters for each parallax ΔD. It is preferable to temporarily store the calculated first and second frequency filters (first and second transform filter groups) for each parallax ΔD in an internal memory not shown.

The frequency filter calculation unit 277 acquires, from the parallax map 130, the parallax between an arbitrary target pixel of the left-eye image 100L and a target pixel of the right-eye image 100R corresponding to the target pixel. The frequency filter calculation unit 277 acquires the first and second frequency filters corresponding to the acquired parallax from the previously calculated and stored first and second frequency filter groups and outputs the first and second frequency filters to the multiplication units 273 and 274, respectively.

The inverse Fourier transform units 275 and 276 perform inverse Fourier transform of the third and fourth frequency component data ($V_{Lf}(\omega_x, \omega_y)$, $V_{Rf}(\omega_x, \omega_y)$) respectively calculated by the multiplication units 273 and 274 as shown in the following formula to calculate data ($V_L(\omega_x, \omega_y)$, $V_R(x, y)$) on the real space.

$$V_L(x,y) = F^{-1}(V_{Lf}(\omega_x,\omega_y))$$

$$V_R(x,y) = F^{-1}(V_{Rf}(\omega_x,\omega_y)) \quad \text{[Formula 8]}$$

The data ($V_L(x, y)$, $V_R(x, y)$) transformed on the real space by the inverse Fourier transform units 275 and 276 indicate images in the same size as the predetermined regions (16×16 pixels) after the Fourier transform by the Fourier transform units 271 and 272. Only the pixels at the same position as the target pixel are selected from the data ($V_L(x, y)$, $V_R(x, y)$) transformed on the real space, and the selected pixels are output as pixels of the left-eye image 120L and the right-eye image 120R.

Then, in the transform process from the left-eye image 100L and the right-eye image 100R to the left-eye image 120L and the right-eye image 120R, predetermined regions (16×16 regions) are first cut out from the position (0, 0) on the images and processed, then 16×16 regions are cut off from the position (0, 1) and processed, then from (0, 2), . . . . In this way, the process is repeated while the 16×16 region is scanned pixel by pixel. Thereby, the left-eye image 120L and the right-eye image 120R of the second monocular 3D images are generated.

Fifth Embodiment

Figure 23:
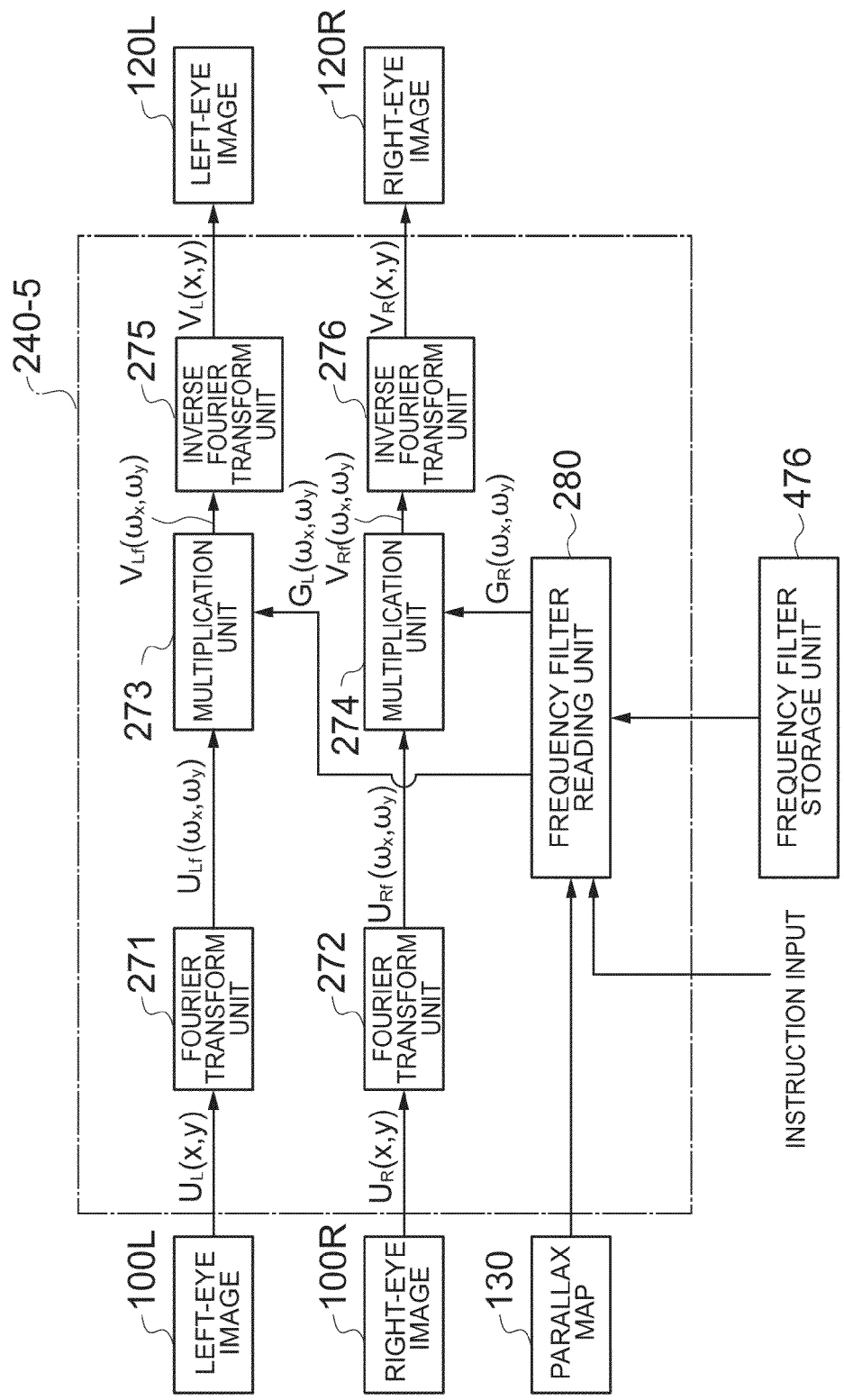
FIG. 23 is a block diagram of the principal part of a fifth embodiment of the image processing device according to the present invention.

FIG. 23 is a block diagram of the principal part of the fifth embodiment of the image processing device according to the present invention.

Note that the parts common to FIG. 22 are designated with the same reference numerals in FIG. 23, and the detailed description is omitted.

In FIG. 23, the digital signal processing unit 24 of the image capturing device 10 includes a filtering processing unit 240-5. The filtering processing unit 240-5 includes the Fourier transform units 271 and 272, the multiplication units 273 and 274, the inverse Fourier transform units 275 and 276, and a frequency filter reading unit 280.

The frequency filter storage unit 476 is a part that stores the first and second frequency filter groups that are the same as the first and second frequency filter groups calculated by the frequency filter calculation unit 277 of the fourth embodiment. The frequency filter storage unit 476 corresponds to a part of the storage unit of the ROM 47. It is preferable that the frequency filter storage unit 476 previously store multiple types (multiple types for information corresponding to the transform characteristics for the intended second monocular 3D images that can be designated by the user interface) of first and second frequency filter groups. Further, the first and second frequency filter groups can be calculated by an external apparatus or the like comparable to the frequency filter calculation unit 277 of the fourth embodiment, and the calculation result can be stored in the frequency filter storage unit 476.

The frequency filter reading unit 280 appropriately reads the first and second frequency filters $G_L$ and $G_R$ from the frequency filter storage unit 476 and outputs them to the multiplication units 273 and 274, respectively. The frequency filter reading unit 280 inputs the information corresponding to the transform characteristics for the intended 30 second monocular 3D images instructed by the user interface including the operation unit 38 and inputs the parallax from the parallax map 130.

The frequency filter reading unit 280 determines the first and second frequency filter groups to be used from the multiple types of first and second frequency filter groups stored in the frequency filter storage unit 476 based on the information corresponding to the transform characteristics for the intended second monocular 3D images. Meanwhile, the frequency filter reading unit 280 acquires, from the parallax map 130, the parallax between an arbitrary target pixel of the left-eye image 100L and a target pixel of the right-eye image 100R corresponding to the target pixel. The frequency filter reading unit 280 reads the first and second frequency filters corresponding to the acquired parallax from the determined first and second frequency filter groups. The frequency filter reading unit 280 outputs the read first and second frequency filters to the multiplication units 273 and 274, respectively.

According to the second embodiment, a multiple types of first and second frequency filter groups are previously stored in the frequency filter storage unit 476. Therefore, although the operation process for calculating the first and second frequency filter groups can be omitted, a large storage capacity is necessary for the frequency filter storage unit 476.

Sixth Embodiment

Figure 24:
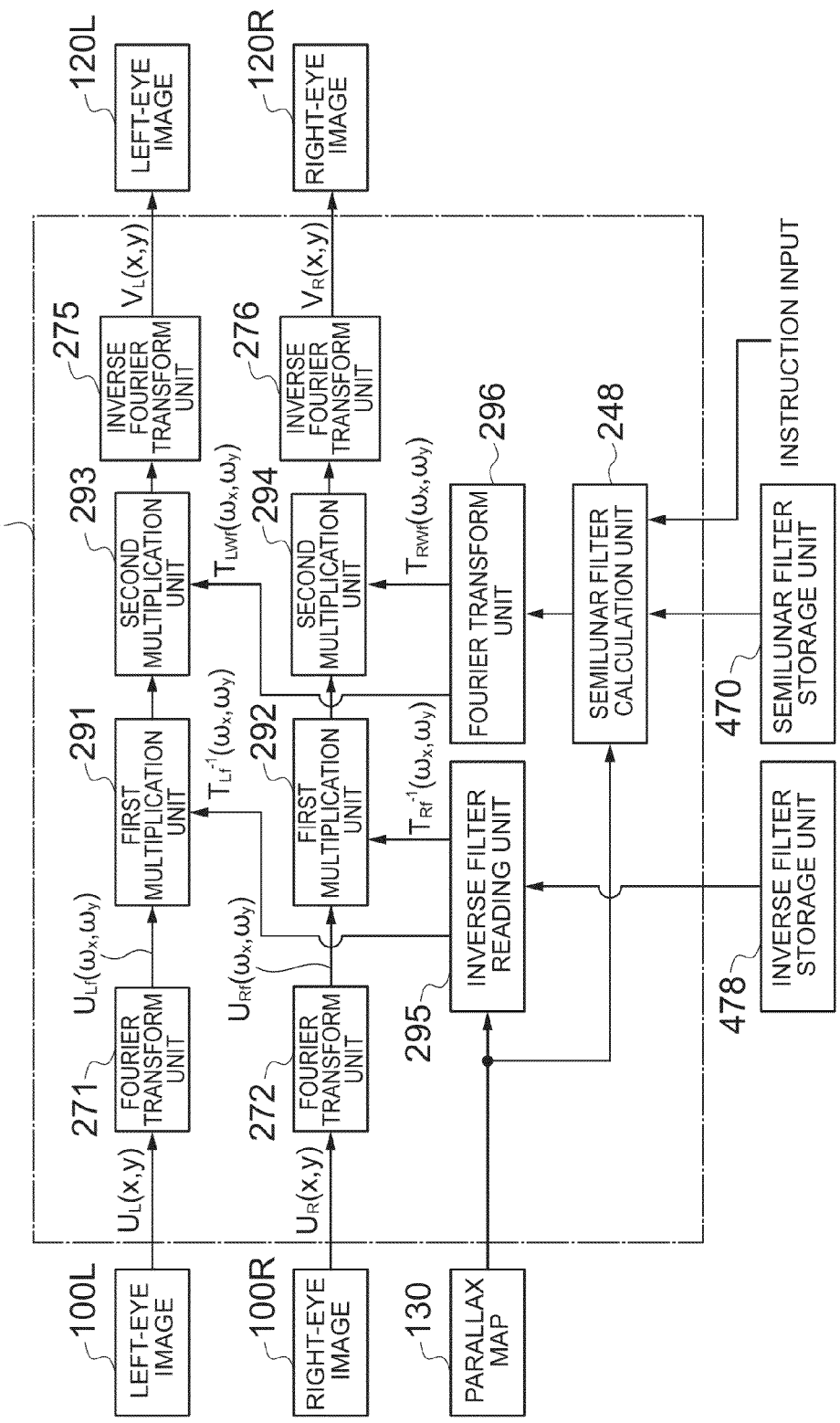
FIG. 24 is a block diagram of the principal part of a sixth embodiment of the image processing device according to the present invention.

FIG. 24 is a block diagram of the principal part of the sixth embodiment of the image processing device according to the present invention.

Note that the parts common to FIG. 22 are designated with the same reference numerals in FIG. 24, and the detailed description is omitted.

In FIG. 24, the digital signal processing unit 24 of the image capturing device 10 includes a filtering processing unit 240-6. The filtering processing unit 240-6 includes the Fourier transform units 271 and 272, first multiplication units 291 and 292, second multiplication units 293 and 294, the inverse Fourier transform units 275 and 276, an inverse filter reading unit 295, the semilunar filter calculation unit 248, and a Fourier transform unit 296.

The frequency filter G includes Fourier coefficients of the frequency space of $T_{Lf}(\omega_x, \omega_y)^{-1} \cdot T_{LWf}(\omega_x, \omega_y)$ as shown in [Formula 6]. The filtering process by the frequency filter can be divided into multiplication by $T_{Lf}(\omega_x, \omega_y)^{-1}$ and the multiplication by $T_{LWf}(\omega_x, \omega_y)$.

The former $T_{Lf}(\omega_x, \omega_y)^{-1}$ is an inverse filter of the frequency component data of the first semilunar filter. The latter $T_{LWf}(\omega_x, \omega_y)$ is the frequency component data of the third semilunar filter.

In the sixth embodiment, a first operation of applying the first and second inverse filters of the frequency component data of the first and second semilunar filters corresponding to the parallax is performed for each corresponding pixel of the left-eye image 100L and the right-eye image 100R. Then, a second operation of applying the frequency component data of the third and fourth semilunar filters to the operation result is performed. In the first operation, a blur-cancelled image is generated in which the parallax and the blur of the original first monocular 3D images are cancelled on the frequency space. In the second operation, the frequency component data of the third and fourth semilunar filters for each parallax corresponding to the transform characteristics by which the light entering the image-taking lens 12 is transformed into the intended second monocular 3D images is applied to the blur-cancelled image to generate the left-eye image 120L and the right-eye image 120R on the frequency space.

The inverse filter storage unit 478 is a part that stores the first and second inverse filter groups that are inverse filters of the frequency component data that can be calculated from the first and second semilunar filter groups stored in the semilunar filter storage unit 470. The inverse filter storage unit 478 corresponds to a part of the storage unit of the ROM 47. The first and second inverse filter groups can be calculated by an external apparatus or the like from the first and second semilunar filter groups, and the calculation results can be stored in the inverse filter storage unit 478.

The inverse filter reading unit 295 acquires, from the parallax map 130, the parallax between an arbitrary target pixel of the left-eye image 100L and a target pixel of the right-eye image 100R corresponding to the target pixel. The inverse filter reading unit 295 reads, from the inverse filter storage unit 478, the first and second inverse filters that are inverse filters of the frequency component data of the first and second semilunar filters corresponding to the acquired parallax and outputs them to the first multiplication units 291 and 292, respectively.

The first multiplication unit 291 multiplies the frequency component data $U_{Lf}(\omega_x, \omega_y)$ of a predetermined region (for example, 16×16 pixels) with reference to the target pixel of the left-eye image 100L by the first inverse filter $T_{Lf}(\omega_x, \omega_y)^{-1}$. Similarly, the first multiplication unit 292 multiplies the frequency component data $U_{Rf}(\omega_x, \omega_y)$ of a predetermined region (for example, 16×16 pixels) with reference to the corresponding pixel of the right-eye image 100R corresponding to the arbitrary pixel of the left-eye image 100L by the second inverse filter $T_{Rf}(\omega_x, \omega_y)^{-1}$. The first multiplication units 291 and 292 output the operation results (blur-cancelled images in which the blur and the like are cancelled on the frequency space) to the second multiplication units 293 and 294, respectively.

The Fourier transform unit 296 transforms the third and fourth semilunar filters of the real space regions corresponding to the current parallax obtained from the parallax map 130 among the third and fourth semilunar filter groups calculated by the semilunar filter calculation unit 248 into frequency component data $(T_{LWf}(\omega_x, \omega_y), T_{RWf}(\omega_x, \omega_y))$ of the frequency space. The Fourier transform unit 296 outputs the frequency component data to the other inputs of the second multiplication units 293 and 294, respectively.

The second multiplication units 293 and 294 multiply the two inputs and output the multiplication results to the inverse Fourier transform units 275 and 276, respectively. The multiplication results output from the second multiplication units 293 and 294 are third and fourth frequency component data $(V_{Lf}(\omega_x, \omega_y), V_{Rf}(\omega_x, \omega_y))$ as in the multiplication units 273 and 274 of the fourth embodiment.

According to the sixth embodiment, the calculation of the first and second frequency filter groups is not necessary compared to the fourth embodiment, and the operation process can be speeded up. Further, although the first and second inverse filter groups need to be stored, the storage capacity of the inverse filter storage unit 478 can be smaller than in the fifth embodiment in which multiple types of first and second frequency filter groups need to be stored.

Note that the blur-cancelled images on the frequency space calculated by the first multiplication units 291 and 292 are the same. Therefore, it is preferable to use only one of the left-eye image 100L and the right-eye image 100R to generate blur-cancelled images and output the generated blur-cancelled images to the second multiplication units 293 and 294, respectively.

<Accurate Comprehension of First and Second Semilunar Filters>

In the first and second semilunar filters applied to original monocular 3D images, the filter sizes are different depending on the parallax, as shown in FIG. 9A and FIG. 9B, and depend on various parameters other than the parallax.

Embodiments shown below, in which the first and second semilunar filters are accurately comprehended, achieve the improvement of the image quality of intended images to be generated based on them.

[First and Second Semilunar Filters Depending on Image Height]

Figure 25:
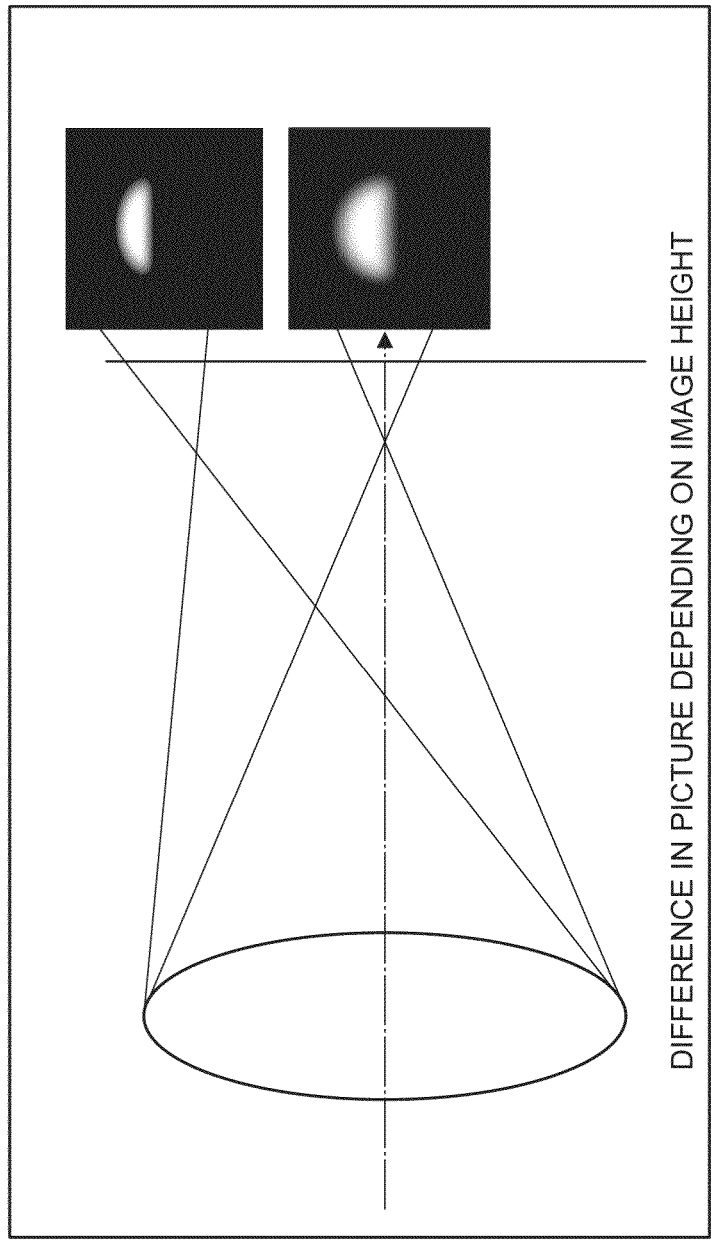
FIG. 25 is a diagram to be used for explaining the first and second semilunar filters depending on the image height.

As shown in FIG. 25, the shape of the semilunar filter is different depending on the image height. That is, the first and second semilunar filters applied to original monocular 3D images are left-right symmetric at an image height of zero (at the center of the image), as shown in FIG. 9A and FIG. 9B, if the sensitivity characteristic of the imaging element has a left-right symmetry. At a position where the image height is great in the pupil-division direction, the left-right symmetry of the first and second semilunar filters changes, and the shapes of the first and second semilunar filters are, for example, shapes into which a circle is two-divided by a straight line through a position that is deviated from the center of the circle in the left-right direction.

In the following, the reason for the change in the first and second semilunar filters depending on the image height is explained.

Figure 26A:
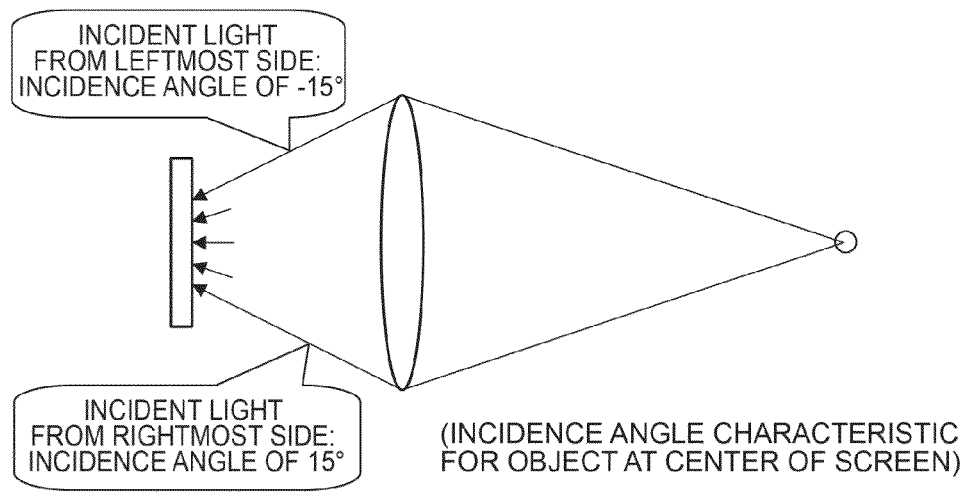
FIG. 26A is a diagram to be used for explaining a difference in incidence angle characteristic depending on the position in a screen.
Figure 26B:
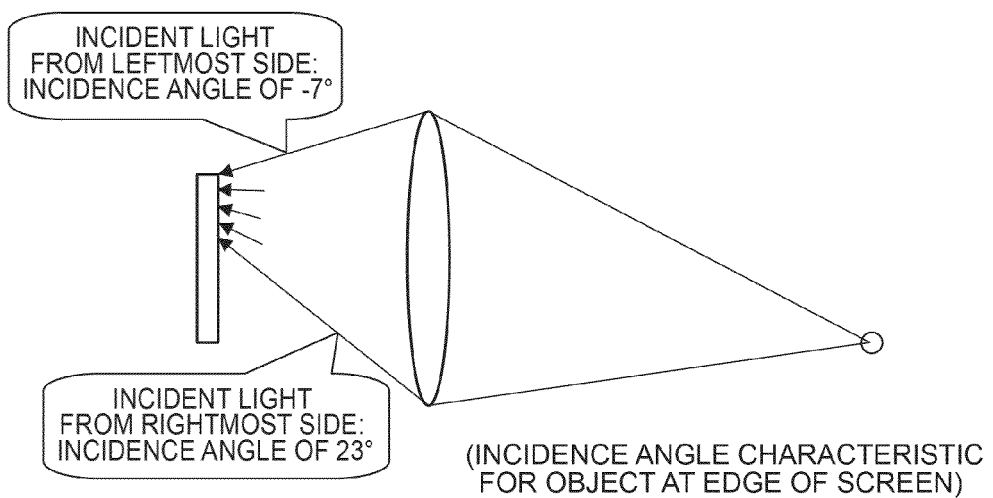
FIG. 26B is a diagram to be used for explaining the difference in incidence angle characteristic depending on the position in a screen.

As shown in FIG. 26A and FIG. 26B, the incidence angle for an object at the center of the screen and the incidence angle for an object at the edge of the screen are different. For example, the incidence angle for the object at the center of the screen is −15° to 15°, while the incidence angle for the object at the edge of the screen is −7° to 23°.

Figure 27:
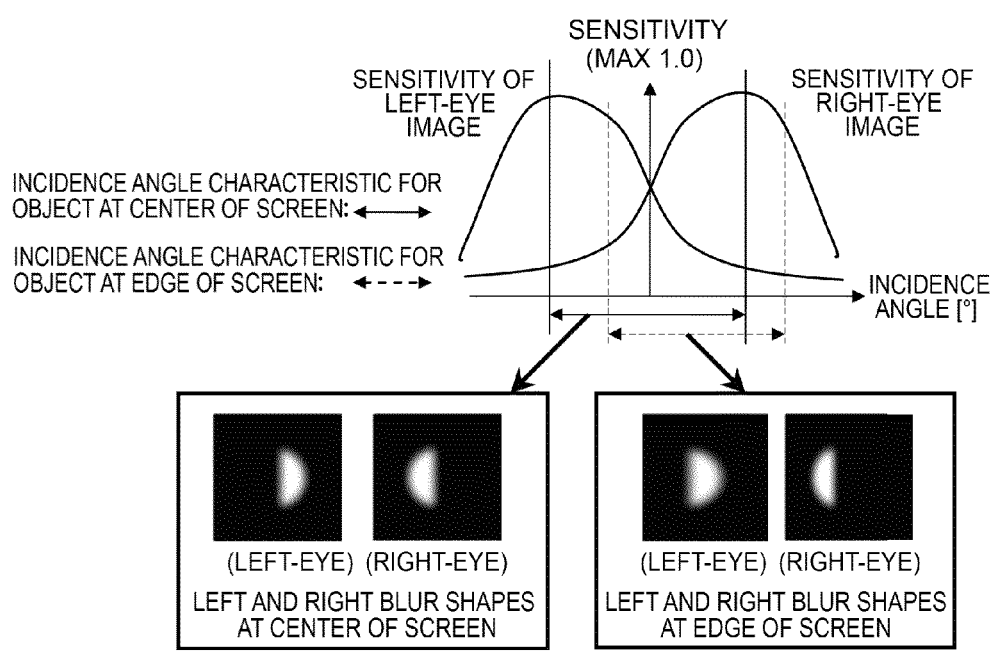
FIG. 27 is a diagram showing a difference in semilunar filters by the difference in incidence angle characteristic shown in FIG. 26A and FIG. 26B.

Thereby, as shown in FIG. 27, the incidence angle characteristics for the left-eye image and right-eye image of an object at the center of the screen are left-right symmetric, while the incidence angle characteristics for the left-eye image and right-eye image of an object at the edge of the screen are not left-right symmetric. As a result, the first and second semilunar filters for the object at the center (the image height is zero) of the screen are left-right symmetric, while the first and second semilunar filters for the object at the edge (the position where the image height is great) of the screen are different in shape.

Therefore, it is preferable to previously determine first and second semilunar filters depending on the image height. Then, when original first monocular 3D images are transformed into intended second monocular 3D images, first and second semilunar filters corresponding to the image height for a target pixel of the filtering process are used.

Thereby, it is possible to eliminate the influence of the difference in the picture shape depending on the image height, and to achieve the improvement of the image quality.
[First and Second Semilunar Filters Depending on Opening Shape of Diaphragm]

Figure 28A:
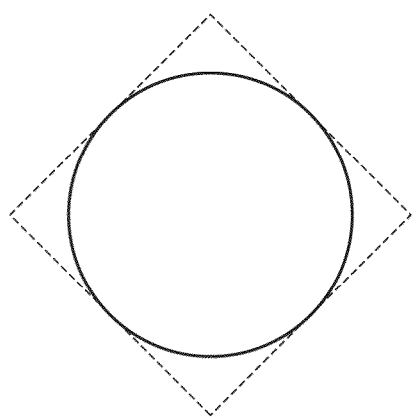
FIG. 28A is a diagram showing an example of an opening shape of a diaphragm of a lens.
Figure 28B:
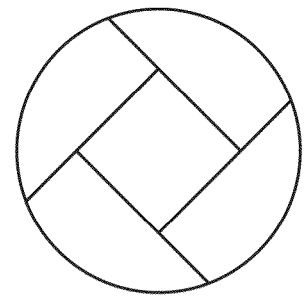
FIG. 28B is a diagram showing an example of an opening shape of a diaphragm of a lens.
Figure 28C:
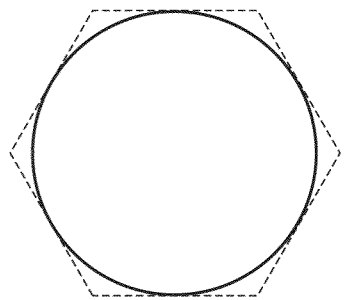
FIG. 28C is a diagram showing an example of an opening shape of a diaphragm of a lens.
Figure 28D:
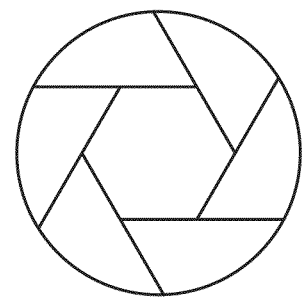
FIG. 28D is a diagram showing an example of an opening shape of a diaphragm of a lens.

FIG. 28A and FIG. 28B show a diaphragm of a lens that includes four diaphragm blades, and FIG. 28C and FIG. 28D show a diaphragm of a lens that includes six diaphragm blades.

FIG. 28A and FIG. 28C show states of open diaphragms in which the diaphragms of the lenses are fully opened, respectively, and the shapes of the diaphragm openings are circular shapes. Then, when the diaphragm of the lens shown in FIG. 28A is narrowed down from the open diaphragm, the diaphragm opening becomes a tetragonal shape as shown in FIG. 28B. When the diaphragm of the lens shown in FIG. 28C is narrowed down from the open diaphragm, the diaphragm opening becomes a hexagonal shape as shown in FIG. 28D.

The shape of the blur depends on the shape of the diaphragm. In the case where the diaphragm opening has a circular shape, for example, in the case of the open diaphragm, a point image is blurred in a circular shape, and is blurred in a semilunar shape on a monocular 3D image after it is pupil-divided into left and right (see FIG. 4).

Therefore, it is preferable that the first and second semilunar filters be adapted to the opening shape of the diaphragm at the time of the pickup of the monocular 3D images. That is, in the case where the shape of the diaphragm opening is a circular shape as shown in FIG. 28A and FIG. 28C, the first and second semilunar filters are made so as to have semilunar shapes. In the case where the shape of the diaphragm opening is a tetragonal shape as shown in FIG. 28B, the first and second semilunar filters are made so as to have trigonal shapes. In the case where the shape of the diaphragm opening is a hexagonal shape as shown in FIG. 28D, they are made so as to have shapes after the hexagonal shape is two-divided into left and right.

That is, the shape of the diaphragm is comprehended for each diaphragm level, and a first and second semilunar filters adapted to the opening shape of the diaphragm at the time of the pickup of the monocular 3D images are applied. Here, the opening shape of the diaphragm of a lens includes various shapes without being limited to this embodiment, and a star-shaped diaphragm is also possible.

By using the first and second semilunar filters adapted to the opening shape of the diaphragm in this way, it is possible to eliminate the influence of the difference in the picture shape depending on the opening shape of the diaphragm, and to achieve the improvement of the image quality.
[First and Second Semilunar Filters Corresponding to Colors of Three Primary Colors]

Figure 29A:
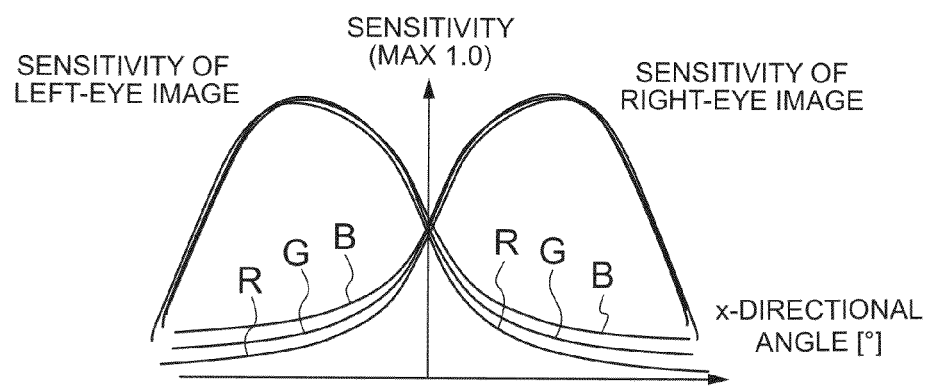
FIG. 29A is a graph showing an example of the sensitivities of a left-eye image and right-eye image for the x-directional angle [°] of the light entering a monocular 3D imaging element.
Figure 29B:
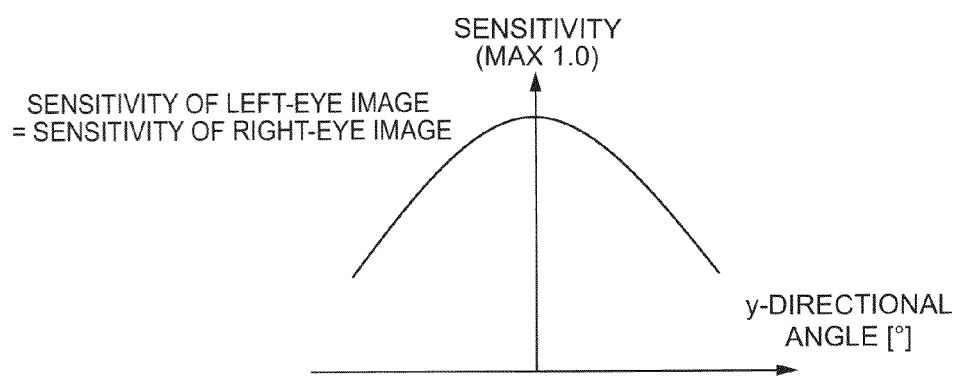
FIG. 29B is a graph showing an example of the sensitivities of the left-eye image and right-eye image for the y-directional angle [°] of the light entering the monocular 3D imaging element.

FIG. 29A is a graph showing an example of the sensitivities of the left-eye image and the right-eye image relative to the x-directional angle [°] of the light entering the monocular 3D imaging element. FIG. 29B is a graph showing an example of the sensitivities of the left-eye image and the right-eye image relative to the y-directional angle [°] of the light entering the monocular 3D imaging element.

The sensitivities of the left-eye image and right-eye image for the x-directional angle [°] are different for each color of three primary colors: red (R), green (G) and blue (B).

As explained in FIGS. 5A to 5D, the first and second semilunar filters are determined depending on the sensitivities of the left-eye image and right-eye image for the angle of the light entering the monocular 3D imaging element. However, since the sensitivities are different for each of RGB, it is preferable to determine the first and second semilunar filters for each of RGB.

The digital signal processing unit 24 (the filtering processing unit) generates intended monocular 3D images for each of RGB, from original monocular 3D images, using the first and second semilunar filters determined for each of RGB, respectively. The above filtering process for each of RGB may be performed at the stage of RGB data (RAW data) corresponding to the color filter arrangement of the imaging element 16, or may be performed to RGB data after the demosaic process.

Thereby, it is possible to eliminate the influence of the difference in the picture shape for each of RGB, and to achieve the improvement of the image quality.

Further, in the case where the first and second semilunar filters applied to original monocular 3D images are determined for each of RGB as described above, it is preferable that the third and fourth semilunar filters to be applied to intended monocular 3D images be third and fourth semilunar filters common to RGB (for example, for G-pixels), instead of similar-shaped filters to which the first and second semilunar filters for each of RGB are enlarged.

Thereby, it is possible to correct the deviation of the centroids (parallaxes) among the colors. Further, it is possible to eliminate the influence of the difference in the picture shape for each of RGB and to achieve the improvement of the image quality.
[Image Process Depending on Chromatic Aberration]

Figure 30:
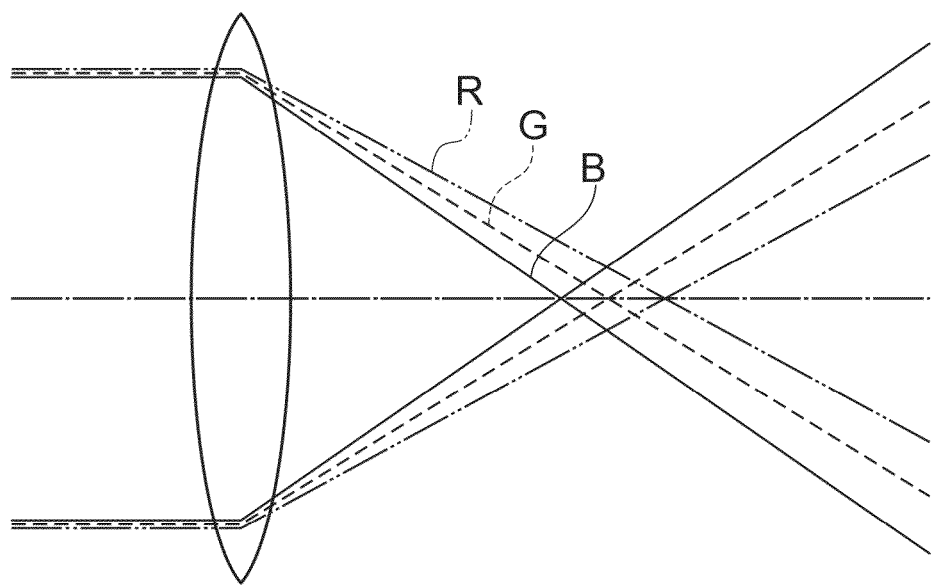
FIG. 30 is a diagram showing an example of the chromatic aberration for each of RBG.

Typically, a lens has an aberration called an axial chromatic aberration. FIG. 30 shows an example of the chromatic aberration for each of RGB.

In the case of a lens with a great chromatic aberration, when the parallax ΔD for original monocular 3D images is calculated from luminance signals that are generated from one particular color of RGB or from RGB signals, the result that the parallax ΔD is different for each color is produced even if the subjects are at the same length.

Hence, the parallax ΔD is comprehended for each of RGB, and the parallax map is created for each of RGB. The digital signal processing unit 24 (the filtering processing unit) processes the respective original monocular 3D images for each color signal of RGB. Parallax maps generated for each color are used as the parallax maps used to generate the intended monocular 3D images for enlarging the parallax. Then, the corresponding parallax map is used for each of RGB to generate the intended monocular 3D images.

Thereby, it is possible to eliminate the influence of the chromatic aberration for each of RGB when the intended monocular 3D images are generated, and to achieve the improvement of the image quality.

Further, it is preferable to use the first and second semilunar filters of each of RGB as described above to perform processing of the original monocular 3D images for each color signal of RGB. It is preferable that the third and fourth semilunar filters to be applied to the intended monocular 3D images be the third and fourth semilunar filters common to RGB (for example, for G-pixels).

As an alternative embodiment of the image capturing device 10, for example, there are a portable telephone, a smart phone having a camera function, a PDA (Personal Digital Assistants), and a portable game machine. In the following, to take a smart phone as an example, the details are explained with reference to the drawings.

<Configuration of Smart Phone>

Figure 31:
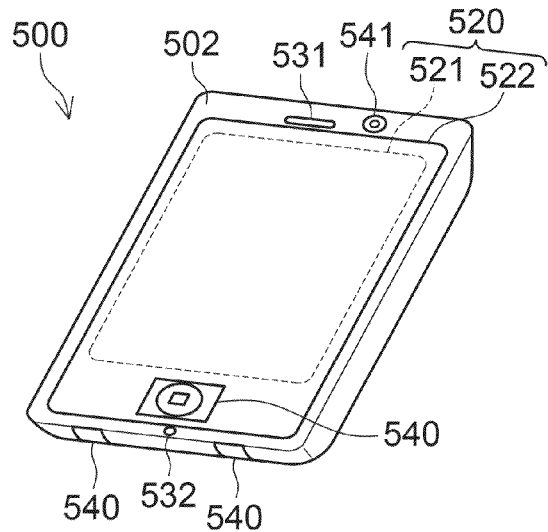
FIG. 31 is an external view of a smart phone that is an alternative embodiment of the image capturing device.

FIG. 31 shows an external view of a smart phone 500 that is an alternative embodiment of the image capturing device 10. The smart phone 500 shown in FIG. 31 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 32:
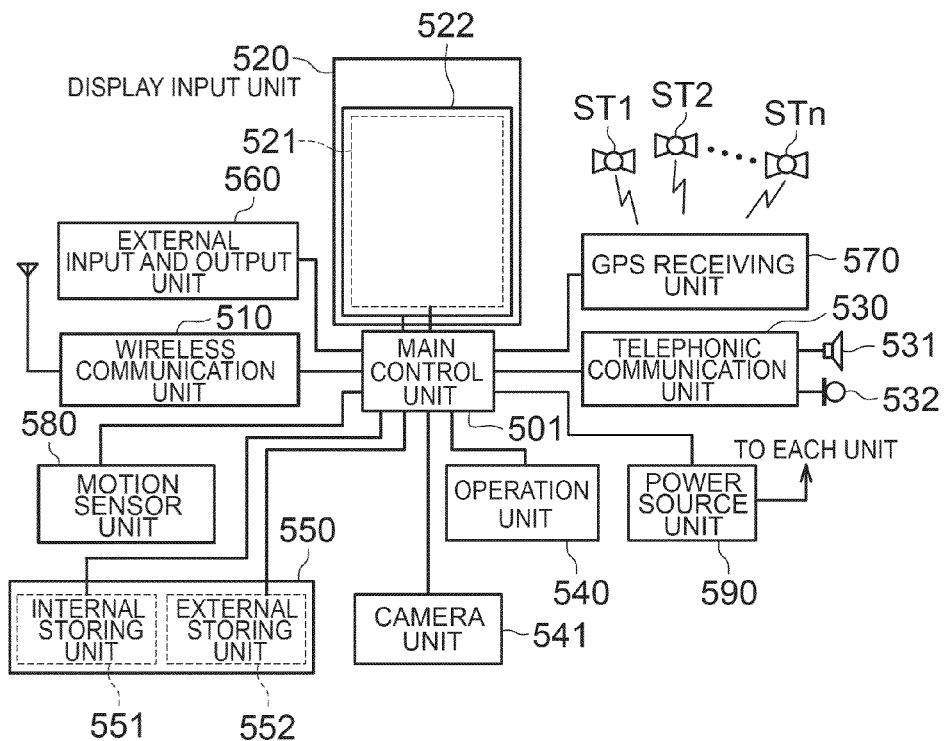
FIG. 32 is a block diagram showing the configuration of the principal part of the smart phone.

FIG. 32 is a block diagram showing the configuration of the smart phone 500 shown in FIG. 31. As shown in FIG. 32, the smart phone 500 includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501. Further, the smart phone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called touch panel that, by the control from the main control unit 501, displays an image (a still image and a moving image), character information or the like to visually transmit the information to a user, and therewith, detects the user operation to the displayed information, and includes the display panel 521 and the operation panel 522. In the case of viewing a generated 3D image, it is preferable that the display panel 521 be a 3D display panel.

The display panel 521 is an LCD (Liquid Crystal Display), an OELD (Organic Electro-Luminescence Display) or the like that is used as a display device. The operation panel 522 is placed such that the images displayed on the display screen of the display panel 521 can be visually recognized. The operation panel 522 is a device that detects one or multiple coordinates operated by a finger of the user or a stylus. When the device is operated by the finger of the user or the stylus, the operation panel 522 outputs a detection signal generated by the operation to the main control unit 501. Next, the main control unit 501 detects the operation position (coordinates) on the display panel 521 based on the received detection signal.

As shown in FIG. 31, the display panel 521 and the operation panel 522 of the smart phone 500 are unified to constitute the display/input unit 520, and the operation panel 522 is disposed to completely cover the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530 includes the speaker 531 and the microphone 532. The telephone call unit 530 converts a user voice input through the microphone 532 into audio data capable of being processed in the main control unit 501, to output it to the main control unit 501, and decodes audio data received by the wireless communication unit 510 or the external input/output unit 560, to output it from the speaker 531. Further, as shown in FIG. 31, for example, the speaker 531 can be mounted on the same surface as a surface on which the display/input unit 520 is provided, and the microphone 532 can be mounted on the side surface of the case 502.

The operation unit 540 is a hardware key using a key switch or the like, and receives an instruction from a user. For example, as shown in FIG. 32, the operation unit 540 is mounted on the lower surface below the display unit of the case 502 of the smart phone 500. The operation unit 540 is a push-button switch that is turned on when being pushed by a finger or the like and becomes the off state by the restring force of a spring or the like when the finger is released.

The storage unit 550 stores a control program and control data of the main control unit 501, application software including the image process program for generating intended parallax-scaled monocular 3D images according to the present invention, the first and second semilunar filter groups, the first and second transform filter groups, the first and second frequency filter groups, the first and second inverse filter groups (inverse filter groups on the real space and the frequency space), address data associated with the name, the phone number, and the like of a communication partner, data of transmitted or received e-mail, Web data downloaded by Web browsing, and downloaded content data and temporarily stores streaming data and the like. Further, the storage unit 550 is constituted by an internal storage unit 551 built in the smart phone 500, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD (R) memory or the like), a RAM (Random Access Memory), or a ROM (Read Only Memory).

The external input/output unit 560 plays a role as an interface to all external apparatuses that is linked with the smart phone 500, and is directly or indirectly connected with another external apparatus, through a communication (for example, the universal serial bus (USB), IEEE1394 or the like), or a network (for example, the internet, a wireless LAN, Bluetooth) (R), RFID (Radio Frequency Identification), the infrared communication (Infrared Data Association: IrDA) (R), UWB (Ultra Wideband) (R), ZigBee (R), or the like).

Examples of the external apparatus to be linked with the smart phone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wirelessly, a personal computer to be connected by wire or wirelessly, a PDA to be connected by wire or wirelessly, a personal computer to be connected by wire or wirelessly, an earphone, and the like. The external input/output unit 560 allows data transferred from such an external apparatus to be transmitted to each constituent element in the interior of the smart phone 500, and allows data in the interior of the smart phone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smart phone 500 by the latitude, longitude and altitude. When the position information can be acquired from the wireless communication unit 510 or the external input/output unit 560 (for example, a wireless LAN), the GPS receiving unit 570 can detect the position using the position information.

The motion sensor unit 580 includes, for example, a three-axis acceleration sensor and the like. The motion sensor unit 580 detects the physical motion of the smart phone 500 in accordance with an instruction of the main control unit 501. The detection of the physical motion of the smart phone 500 leads to the detection of the moving direction and acceleration of the smart phone 500. This detection result is output to the main control unit 501.

The power unit 590 supplies the electric power stored in a battery (not shown in the figure), to each unit of the smart phone 500, in accordance with an instruction of the main control unit 501.

The main control unit 501, which includes a microprocessor, operates in accordance with the control program and control data stored in the storage unit 550, and integrally controls each unit of the smart phone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, a function to generate a 3D image from a 2D image according to the present invention, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 520.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 521, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation touch panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation device not a conventional simple touch operation, but an operation to draw a track from at least one of multiple positions by drawing the track by a finger or the like, by designating multiple positions simultaneously, or by combining them.

The camera unit 541 is a digital camera that performs an electronic image-taking using an imaging element such as a CMOS (Complementary Metal Oxide Semiconductor) or a CCD (Charge-Coupled Device), and includes functions equivalent to the functions shown in the block diagram in FIG. 3. Further, by the control of the main control unit 501, the camera unit 541 can transform image data obtained by the pickup, into compressed image data such as JPEG (Joint Photographic Coding Experts Group), for example, and can record them in the storage unit 550, or output them through the external input/output unit 560 or the wireless communication unit 510. In the smart phone 500 shown in FIG. 31, the camera unit 541 is mounted on the same surface as the display/input unit 520. However, the mount position of the camera unit 541 is not limited to this. The camera unit 541 may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smart phone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smart phone 500, and to decide the current usage environment without using a three-axis acceleration sensor or using a three-axis acceleration sensor together. Naturally, it is possible to utilize an image from the camera unit 541 within the application software.

In addition, it is possible to add the position information acquired by the GPS receiving unit 570, the voice information acquired by the microphone 532 (it may be the text information after the voice-text conversion by the main control unit 501 or the like), the attitude information acquired by the motion sensor unit 580, or the like, to image data of still image or moving image, to store them in the storage unit 550, and to output them through the external input/output unit 560 or the wireless communication unit 510.

[Addition]

The present invention is not limited to the case of creating intended 3D still images from original monocular 3D still images, and can be applied to the case of generating intended 3D moving images from monocular 3D moving images, also.

Further, the image capturing device 10 and the smart phone 500 includes the image processing device according to the present invention that picks up a 2D image and monocular 3D images, and generates intended 3D images from the actually picked-up original monocular 3D images. However, the present invention is not limited to this. For example, the present invention can be applied also to an image processing device (for example, a personal computer, a tablet PC or the like) that acquires original monocular 3D images through an external apparatus or communications, and generates intended 3D images from the acquired monocular 3D images. In this case, it is necessary to separately acquire the information of the first and second semilunar filter groups applied to the original monocular 3D images, and the like.

Moreover, needless to say, the present invention is not limited to the above embodiments, and various modifications are possible in a range without departing from the spirit of the present invention.

What is claimed is:

1. An image processing device comprising:
   an image acquisition device acquiring a first image and a second image that are captured through a single image-taking optical system and that have a parallax to each other after a pupil division by a pupil-division device;
   a parallax acquisition device acquiring a parallax between corresponding pixels of the acquired first image and second image;
   a first data transform device transforming, for each of a plurality of target pixels of processing of image data of the acquired first image and image data of the acquired second image, predetermined regions based on the target pixel into first frequency component data and second frequency component data, respectively;
   an operation processing device performing a multiplication process for each of the frequency component data of the acquired first image and second image by using a first frequency filter group and a second frequency filter group for respectively transforming the transformed first frequency component data and second frequency component data in a frequency space and for respectively transforming the acquired first image and second image to a third image and a fourth image in which a parallax amount and a blur amount of the acquired first image and second image have been altered, the first frequency filter and the second frequency filter corresponding to the parallax of the target pixels acquired by the parallax acquisition device; and
   a second data transform device transforming third frequency component data and fourth frequency component data respectively corresponding to the third image and the fourth image calculated by the operation processing device into data on a real space and for respectively selecting pixels at positions corresponding to the target pixels as one pixel of the third image and one pixel of the fourth image.

2. The image processing device according to claim 1, wherein
   the operation processing device uses a first frequency filter and a second frequency filter that increase the blur amount with an increase in the parallax of the target pixels acquired by the parallax acquisition device.

3. The image processing device according to claim 1, further comprising:
   a digital filter storage device storing a first digital filter group and a second digital filter group for each parallax respectively corresponding to transform characteristics by which light entering the single image-taking optical system is transformed into the first image and the second image; and
   a frequency filter calculation device calculating the first frequency filter group and the second frequency filter group based on the stored first digital filter group and second digital filter group and based on a third digital filter group and a fourth digital filter group for each parallax respectively corresponding to transform characteristics by which light entering the single image-taking optical system is transformed into the third image and the fourth image, wherein
   for each pixel of the acquired first image and second image, the operation processing device selects the first frequency filter and the second frequency filter corresponding to the parallax from the calculated first frequency filter group and second frequency filter group, respectively, based on the parallax of the pixels acquired by the parallax acquisition device and uses the selected first frequency filter and second frequency filter to perform the multiplication process.

4. The image processing device according to claim 3, wherein
the frequency filter calculation device calculates the first and second frequency filters G(ωx, ωy) by using the following formula $$G(\omega x, \omega y) = Twf(\omega x, \omega y) \cdot Tf(\omega x, \omega y) - 1,$$

wherein any one digital filter of the first digital filter group and the second digital filter group stored in the digital filter storage device is T(x, y), the digital filter T(x, y) to which Fourier transform has been performed is Tf(ωx, ωy), a digital filter corresponding to the digital filter T(x, y) of the third digital filter group and the fourth digital filter group is Tw(x, y), and the digital filter Tw(x, y) to which Fourier transform has been performed is Twf(ωx, ωy).

5. The image processing device according to claim 3, further comprising:
a designation device designating the transform characteristics for the transform into the third image and the fourth image; and
a digital filter calculation device calculating the third digital filter group and the fourth digital filter group corresponding to the designated transform characteristics, wherein
the frequency filter calculation device uses the first digital filter group and the second digital filter group stored in the digital filter storage device and the third digital filter group and the fourth digital filter group calculated by the digital filter calculation device to calculate the first frequency filter group and the second frequency filter group.

6. The image processing device according to claim 1, further comprising
a frequency filter storage device storing the first frequency filter group and the second frequency filter group for each parallax calculated based on the first digital filter group and the second digital filter group for each parallax respectively corresponding to the transform characteristics by which the light entering the single image-taking optical system is transformed into the first image and the second image and based on the third digital filter group and the fourth digital filter group for each parallax respectively corresponding to the transform characteristics by which the light entering the single image-taking optical system is transformed into the third image and the fourth image, wherein
for each pixel of the acquired first image and second image, the operation processing device reads the first frequency filter and the second frequency filter corresponding to the parallax from the stored first frequency filter group and second frequency filter group based on the parallax of the pixels acquired by the parallax acquisition device and uses the read first frequency filter and second frequency filter to perform the multiplication process.

7. The image processing device according to claim 6, wherein
the frequency filter storage device stores the first and second frequency filters G(ωx, ωy) calculated by the following formula $$G(\omega x, \omega y) = Twf(\omega x, \omega y) \cdot Tf(\omega x, \omega y) - 1,$$

wherein any one digital filter of the first digital filter group and the second digital filter group is T(x, y), the digital filter T(x, y) to which Fourier transform has been performed is Tf(ωx, ωy), the digital filter corresponding to the digital filter T(x, y) of the third digital filter group and the fourth digital filter group is Tw(x, y), and the digital filter Tw(x, y) to which Fourier transform has been performed is Twf(ωx, ωy).

8. The image processing device according to claim 6, further comprising
a designation device designating the transform characteristics for the transform into the third image and the fourth image, wherein
the frequency filter storage device stores the first frequency filter group and the second frequency filter group for each transform characteristic calculated based on the first digital filter group and the second digital filter group for each parallax corresponding to the transform characteristics by which the light entering the single image-taking optical system is transformed into the first image and the second image and based on the third digital filter group and the fourth digital filter group for each parallax corresponding to the transform characteristics by which the light entering the single image-taking optical system is transformed into the third image and the fourth image, the third digital filter group and the fourth digital filter group corresponding to multiple transform characteristics that can be designated by the designation device, and
the operation processing device reads the first frequency filter group and the second frequency filter group corresponding to the transform characteristics designated by the designation device from the frequency filter storage device and uses the first frequency filter group and the second frequency filter group.

9. The image processing device according to claim 1, further comprising
an inverse filter storage device storing a first inverse filter group and a second inverse filter group that are inverse filters of frequency component data of the first digital filter group or the second digital filter group for each parallax respectively corresponding to the transform characteristics by which the light entering the single image-taking optical system is transformed into the first image or the second image, wherein
the operation processing device uses, as the first frequency filter group and the second frequency filter group, the stored first and second inverse filter groups and a third frequency filter group and a fourth frequency filter group that are frequency component data of the third digital filter group and the fourth digital filter group for each parallax respectively corresponding to the transform characteristics by which the light entering the single image-taking optical system is transformed into the third image and the fourth image.

10. The image processing device according to claim 9, further comprising:
a designation device designating the transform characteristics for the transform into the third image and the fourth image; and
a digital filter calculation device calculating the third digital filter group and the fourth digital filter group corresponding to the designated transform characteristics, wherein
the operation processing device uses the third digital filter group and the fourth digital filter group calculated by the digital filter calculation device.

11. The image processing device according to claim 5, wherein
the transform characteristics for the third image and the fourth image designated by the designation device are at least one of a focal length of the image-taking optical system, a diaphragm value, a size of an imaging element, and a sensitivity characteristic that are different from those of the first image and the second image.

12. The image processing device according to claim 5, wherein
the third digital filter group and the fourth digital filter group are obtained by scaling the first digital filter group and the second digital filter group to similar shapes.

13. The image processing device according to claim 3, wherein
the third digital filter group and the fourth digital filter group are digital filter groups having circular shapes and including point-symmetric filter coefficients.

14. The image processing device according to claim 9, wherein
to acquire the third image and the fourth image with multiple transform characteristics, the operation processing device performs a first operation of applying an inverse filter of frequency component data of a first filter digital filter or a second digital filter corresponding to the parallax of each pixel to each pixel of the acquired first image or second image and applies frequency component data of a third digital filter and a fourth digital filter corresponding to the third image and the fourth image with multiple transform characteristics to the result of the first operation, respectively.

15. The image processing device according to claim 3, wherein
a first digital filter group and a second digital filter group having left-right symmetry to each other at the center of an image, in which the left-right symmetry changes according to an image height in a pupil-division direction, are used as the first digital filter group and the second digital filter group.

16. The image processing device according to claim 3, wherein
a first digital filter group and a second digital filter group having shapes obtained by dividing an opening shape of a diaphragm included in the image-taking optical system when the first image and the second image are acquired are used as the first digital filter group and the second digital filter group.

17. The image processing device according to claim 3, wherein
the first image and the second image are color images of three primary colors output from a color imaging element, and
a first digital filter group and a second digital filter group that are different for each color according to the sensitivity characteristics of each color of the color imaging element are used as the first digital filter group and the second digital filter group.

18. The image processing device according to claim 17, wherein
a third digital filter group and a fourth digital filter group corresponding to a particular color of the color images of three primary colors are used as the third digital filter group and the fourth digital filter group.

19. The image processing device according to claim 1, wherein
the first image and the second image are color images of three primary colors output from the color imaging element,
the parallax acquisition device calculates the parallax between corresponding pixels of the acquired first image and second image for each color, and
the operation processing device performs the operation process for the acquired first image and second image for each color.

20. An image capturing device comprising:
a single image-taking optical system;
an imaging element that pupil-divides and forms subject images passed through different first and second regions of the image-taking optical system and that photoelectrically converts the subject images passed through the first and second regions to output a first image and a second image, respectively;
an image acquisition device acquiring the first image and the second image output from the imaging element; and
the image processing device according to claim 1.

21. An image processing method comprising:
acquiring a first image and a second image that are captured through a single image-taking optical system and that have a parallax to each other after a pupil division by a pupil-division device;
executing a parallax acquisition of acquiring a parallax between corresponding pixels of the acquired first image and second image;
executing a first data transform of transforming, for each of a plurality of target pixels of processing of image data of the acquired first image and image data of the acquired second image, predetermined regions based on the target pixel into first frequency component data and second frequency component data, respectively;
executing an operation processing of performing a multiplication process for each of the frequency component data of the acquired first image and second image by using a first frequency filter group and a second frequency filter group for respectively transforming the transformed first frequency component data and second frequency component data in a frequency space and for transforming the acquired first image and second image to a third image and a fourth image in which a parallax amount and a blur amount of the acquired first image and second image have been altered, the first frequency filter and the second frequency filter corresponding to the parallax of the target pixels acquired in the parallax acquisition; and
executing a second data transform of transforming third frequency component data and fourth frequency component data respectively corresponding to the third image and the fourth image calculated in the operation processing into data on a real space and for respectively selecting pixels at positions corresponding to the target pixels as one pixel of the third image and one pixel of the fourth image, wherein
the first data transform, the operation processing, and the second data transform are repeatedly executed for each pixel while shifting the positions of the target pixels.

22. The image processing method according to claim 21, further comprising:
preparing a digital filter storage device storing a first digital filter group and a second digital filter group for each parallax respectively corresponding to transform characteristics by which light entering the single image-taking optical system is transformed into the first image and the second image; and
executing a frequency filter calculation of calculating the first frequency filter group and the second frequency filter group based on the stored first digital filter group and second digital filter group and based on a third digital filter group and a fourth digital filter group for each parallax respectively corresponding to transform characteristics by which light entering the single image-taking optical system is transformed into the third image and the fourth image, wherein in the operation processing, for each pixel of the acquired first image and second image, the first frequency filter and the second frequency filter corresponding to the parallax are selected from the calculated first frequency filter group and second frequency filter group, respectively, based on the parallax of the pixels acquired in the parallax acquisition and uses the selected first frequency filter and second frequency filter to perform the multiplication process.

23. The image processing method according to claim 21, further comprising preparing a frequency filter storage device storing the first frequency filter group and the second frequency filter group for each parallax calculated based on the first digital filter group and the second digital filter group for each parallax respectively corresponding to the transform characteristics by which the light entering the single image-taking optical system is transformed into the first image and the second image and based on the third digital filter group and the fourth digital filter group for each parallax respectively corresponding to the transform characteristics by which the light entering the single image-taking optical system is transformed into the third image and the fourth image, wherein in the operation processing, for each pixel of the acquired first image and second image, the first frequency filter and the second frequency filter corresponding to the parallax are read from the stored first frequency filter group and second frequency filter group based on the parallax of the pixels acquired in the parallax acquisition, and the read first frequency filter and second frequency filter are used to perform the multiplication process.

24. The image processing method according to claim 21, further comprising preparing an inverse filter storage device storing a first inverse filter group and a second inverse filter group that are inverse filter groups of frequency component data of the first digital filter group or the second digital filter group for each parallax respectively corresponding to the transform characteristics by which the light entering the single image-taking optical system is transformed into the first image or the second image, wherein in the operation processing, the stored inverse filter groups and a third frequency filter group and a fourth frequency filter group that are frequency component data of the third digital filter group and the fourth digital filter group for each parallax respectively corresponding to the transform characteristics by which the light entering the single image-taking optical system is transformed into the third image and the fourth image are used as the first frequency filter group and the second frequency filter group.

* * * * *